US012692133B2

(12) United States Patent
Schafer

(10) Patent No.: US 12,692,133 B2
(45) Date of Patent: Jul. 28, 2026

(54) DAMPER SYSTEMS FOR SUSPENDED LOADS

(71) Applicant: Innovative Minds, LLC, Enfield, CT (US)

(72) Inventor: George Schafer, Enfield, CT (US)

(73) Assignee: INNOVATIVE MINDS, LLC, Enfield, CT (US)

( * ) Notice: Subject to any disclaimer, the term of this patent is extended or adjusted under 35 U.S.C. 154(b) by 578 days.

(21) Appl. No.: 18/165,708

(22) Filed: Feb. 7, 2023

(65) Prior Publication Data

US 2023/0257236 A1 Aug. 17, 2023

Related U.S. Application Data

(63) Continuation-in-part of application No. 17/672,267, filed on Feb. 15, 2022, now Pat. No. 11,608,252.

(51) Int. Cl.
*B66C 13/06* (2006.01)
*B66C 13/22* (2006.01)

(52) U.S. Cl.
CPC ............ *B66C 13/063* (2013.01); *B66C 13/22* (2013.01)

(58) Field of Classification Search
CPC ....... B66C 13/06; B66C 13/063; B66C 13/22; B66C 13/04; B66C 13/08
See application file for complete search history.

(56) References Cited

U.S. PATENT DOCUMENTS

| | | | |
|---|---|---|---|
| 422,399 | A | 3/1890 | Graham, Jr. et al. |
| 456,360 | A | 7/1891 | Graves |

(Continued)

FOREIGN PATENT DOCUMENTS

| | | | |
|---|---|---|---|
| CN | 102602838 | A | 7/2012 |
| CN | 107867650 | A | 4/2018 |

(Continued)

OTHER PUBLICATIONS

Cicolani, L.S. et al., "Modeling and Simulation of a Helicopter Slung Load Stabilization Device" Presented at the American Helicopter Society 58th Annual Forum, Montreal, Canada, Jun. 11-13, 2002. 12 pages.

(Continued)

*Primary Examiner* — Robert W Hodge
*Assistant Examiner* — Juan J Campos, Jr.
(74) *Attorney, Agent, or Firm* — CANTOR COLBURN LLP

(57) ABSTRACT

Load lifting systems include a first flexible suspension member configured to attach to a load lifting structure at a first fixed connection at a first end of the first flexible suspension member and attach to the load lifting structure at a first adjustable connection at a second end of the first flexible suspension member and a second flexible suspension member configured to attach to the load lifting structure at a second fixed connection at a first end of the second flexible suspension member and attach to the load lifting structure at a second adjustable connection at a second end of the second flexible suspension member. An interconnect member extends between and connecting the first adjustable connection and the second adjustable connection. A carriage is movingly suspended on both the first flexible suspension member and the second flexible suspension member.

20 Claims, 26 Drawing Sheets

(56) References Cited

U.S. PATENT DOCUMENTS

| | | | | |
|---|---|---|---|---|
| 2,164,128 | A | 6/1939 | Medenwald | |
| 2,743,024 | A | 4/1956 | Schmitt et al. | |
| 3,536,298 | A | 10/1970 | Deslierres | |
| 3,567,040 | A | 3/1971 | Thomson | |
| 3,591,022 | A | 7/1971 | Polyakov et al. | |
| 3,756,543 | A | 9/1973 | Fowler et al. | |
| 3,801,070 | A * | 4/1974 | Piasecki | B66C 13/08 254/312 |
| 3,828,940 | A * | 8/1974 | Cooper | B66C 13/06 294/81.4 |
| 3,838,836 | A | 10/1974 | Asseo et al. | |
| 3,842,986 | A * | 10/1974 | Hupkes | B66C 13/06 294/81.4 |
| 3,874,514 | A | 4/1975 | Wilson | |
| 3,874,516 | A * | 4/1975 | Watanabe | B66C 13/06 212/87 |
| 3,887,080 | A | 6/1975 | Wilson | |
| 3,899,083 | A * | 8/1975 | Flessner | B66C 13/06 212/274 |
| 3,904,156 | A | 9/1975 | Smith | |
| 3,945,503 | A * | 3/1976 | Cooper | B66C 13/06 294/81.1 |
| 4,076,127 | A | 2/1978 | Hupkes | |
| 4,138,078 | A | 2/1979 | Hester et al. | |
| 4,327,596 | A | 5/1982 | Simon | |
| 4,524,520 | A | 6/1985 | Levy | |
| 4,553,675 | A | 11/1985 | Kirk | |
| 4,718,667 | A | 1/1988 | Shoemaker, Jr. | |
| 4,778,176 | A | 10/1988 | Shoremaker, Jr. | |
| 4,784,420 | A * | 11/1988 | Makino | B66C 13/08 294/81.4 |
| 4,883,184 | A | 11/1989 | Albus | |
| 5,018,631 | A * | 5/1991 | Reimer | B66C 13/06 212/250 |
| 5,150,799 | A | 9/1992 | Long, Jr. | |
| 5,257,891 | A * | 11/1993 | Baumann | B66C 13/06 294/81.4 |
| 5,451,032 | A | 9/1995 | Rhoads | |
| 5,573,465 | A | 11/1996 | Kitchen et al. | |
| 5,642,822 | A * | 7/1997 | Monzen | B66C 13/063 340/685 |
| 5,769,250 | A * | 6/1998 | Jussila | B66C 13/08 294/81.4 |
| 5,816,098 | A | 10/1998 | Kanki et al. | |
| 5,819,962 | A * | 10/1998 | Okubo | B66C 13/06 294/81.4 |
| 5,965,994 | A | 10/1999 | Seo | |
| 6,250,486 | B1 * | 6/2001 | Enoki | B66C 19/002 212/87 |
| 6,826,452 | B1 | 11/2004 | Holland et al. | |
| 7,014,172 | B2 | 3/2006 | Kataoka | |
| 7,080,825 | B1 | 7/2006 | George et al. | |
| 7,172,385 | B2 | 2/2007 | Khajepour et al. | |
| 7,284,744 | B1 | 10/2007 | Lerchenmueller et al. | |
| 8,042,425 | B2 | 10/2011 | Dujardin | |
| 8,185,259 | B2 | 5/2012 | Omar | |
| 8,511,645 | B2 | 8/2013 | Taddei | |
| 8,938,325 | B1 | 1/2015 | Mcginnis et al. | |
| 9,132,995 | B2 | 9/2015 | Schafer | |
| 9,223,008 | B1 | 12/2015 | Hartman et al. | |
| 9,758,353 | B2 | 9/2017 | Schafer | |
| 9,908,750 | B2 | 3/2018 | Sturm, Jr. et al. | |
| 9,950,910 | B2 | 4/2018 | Sorensen et al. | |
| 10,016,891 | B2 | 7/2018 | Reid | |
| 10,654,695 | B1 | 5/2020 | Lopes et al. | |
| 10,676,327 | B2 * | 6/2020 | Staudecker | B66C 13/04 |
| 10,737,915 | B2 | 8/2020 | Mohr | |
| 11,247,881 | B2 | 2/2022 | Shin | |
| 11,313,443 | B1 | 4/2022 | Shoremaker, Jr. | |
| 11,331,789 | B2 | 5/2022 | Penn | |
| 2004/0094497 | A1 | 5/2004 | Oja et al. | |
| 2004/0251455 | A1 | 12/2004 | Mangin | |
| 2006/0054581 | A1 | 3/2006 | Sorsa | |
| 2007/0114505 | A1 | 5/2007 | Reyes et al. | |
| 2008/0121601 | A1 | 5/2008 | Ehrenleitner | |
| 2016/0332843 | A1 | 11/2016 | Schafer | |
| 2018/0029849 | A1 | 2/2018 | Beer | |
| 2018/0339888 | A1 * | 11/2018 | Staudecker | B66C 13/063 |
| 2019/0241267 | A1 | 8/2019 | Sikora et al. | |
| 2020/0207592 | A1 | 7/2020 | Hall et al. | |
| 2020/0222257 | A1 | 7/2020 | Sikora et al. | |
| 2020/0231415 | A1 | 7/2020 | Sikora et al. | |
| 2020/0271270 | A1 | 8/2020 | Sikora et al. | |

FOREIGN PATENT DOCUMENTS

| | | | |
|---|---|---|---|
| CN | 110451418 | A | 11/2019 |
| DE | 4005194 | A | 8/1990 |
| EP | 3981730 | A1 | 4/2022 |
| GB | 953382 | A | 3/1964 |
| GB | 1393512 | A | 5/1975 |
| JP | 2003246582 | A | 9/2003 |
| PH | 22019500014 | U1 | 8/2020 |
| PL | 128562 | U1 | 9/2020 |
| WO | 2018024904 | A1 | 2/2018 |
| WO | 2020167867 | A1 | 8/2020 |

OTHER PUBLICATIONS

Innovative Minds LLC, "ACH-100 Brochure", Retrieved in 2021, 3 pages.

John, How Many Helicopters in the World? posted on Dec. 20, 2014, updated Aug. 14, 2016, 2 pages.

Lancashire, T. et al., "USAAVLABS Technical Report 66-63—Investigation OE the Mechanics of Cargo Handling By Aerial Crane-Type Aircraft", U. S. Army Aviation Materiel Laboratories, Aug. 1966, 207 pages.

Tracy, K. "Helicopter stabilization startup raises $1.3M", Jan. 24, 2019, 3 pages.

International Search Report and Written Opinion; International Application No. PCT/US23/12506; Date of Mailing Jul. 3, 2023; 28 pages.

* cited by examiner

DAMPER SYSTEMS FOR SUSPENDED LOADS

CROSS-REFERENCE TO RELATED APPLICATIONS

This application is a Continuation-in-Part of U.S. patent application Ser. No. 17/672,267, filed Feb. 15, 2022, the disclosure of which is incorporated herein by reference in its entirety.

BACKGROUND

The subject matter disclosed herein generally relates to load suspension and, more particularly, to damping of oscillations, swings, rotations, and movements of loads that are suspended from a lifting or support structure.

The crane, aircraft, and related industries often carry loads suspended by a load bearing line attached to a lifting vehicle, lifting structure, or support structure for moving of materials, equipment, cargo, personnel, and other objects or the like, as will be appreciated by those of skill in the art. In the helicopter and related industries, loads suspended from the vehicle may be referred to as external loads. Such external loads may be used for logistical support for resupply of personnel and/or operations, asset retrieval, emergency response, rescue operations, construction, asset insertion, firefighting, and others. Typically, the external loads are carried by a single cable attached to a cargo hook which may be attached or fixed to the outside of an aircraft (e.g., helicopter). The cargo hook may be located directly under the center of gravity or rotor system on the underside of the fuselage to ensure that a carried or suspended load does not negatively impact flight operations. Similar single cable suspension may also be used for crane operations, which may be subject to winds and the like that can move a carried load, and movement of such loads should be minimized for accurate load placement, structural reasons (e.g., damage to crane or cargo) and to prevent impacts between the cargo or carried load and personnel, a nearby building, or other structure and surrounding equipment (e.g., during construction of a building within a city).

Physically, the single cable configuration is a simple pendulum and exerts moments on the lifting structure (e.g., aircraft, crane, etc.) when the load swings. When this occurs, control inputs by an operator are required to control the oscillations and swinging. Particularly in aircraft applications, pilot induced oscillation amplification is a risk due to human control in efforts to minimize swinging of a load. Currently, carrying external loads requires experienced external load pilots/operators, or very sophisticated software when used on an unmanned aircraft, to carry the loads safely and efficiently to avoid dangerous oscillations. In rescue operations, where a litter can be lowered and raised from a helicopter to rescue an injured person, the litter can spin uncontrollably due to the rotorwash swirl and negatively impact the health of the patient. Accordingly, it may be advantageous to have improved damping of suspended load movements (e.g., swinging, oscillations, spin, etc.).

SUMMARY

According to some embodiments, load lifting systems are provided. The load lifting systems include a load lifting structure configured with at least two attach points defining at least one axis between two attach points of the at least two attach points, a flexible suspension member suspended from the load lifting structure at the at least two attach points, and a carriage having at least one guide element arranged along the at least one axis and configured to move relative to and along the suspension member along the at least one axis such that the carriage follows a curved path having a continuously varying radius of curvature based on the at least two attach points. The carriage is configured to have a load suspended therefrom.

In addition to one or more of the features described herein, or as an alternative, further embodiments of the load lifting systems may include that at least one attach point comprises a connection configured to enable extension and retraction of a length of the suspension member.

In addition to one or more of the features described herein, or as an alternative, further embodiments of the load lifting systems may include that the carriage is configured with a load release means.

In addition to one or more of the features described herein, or as an alternative, further embodiments of the load lifting systems may include that the carriage is configured to directly carry the load.

In addition to one or more of the features described herein, or as an alternative, further embodiments of the load lifting systems may include that the load is a litter.

In addition to one or more of the features described herein, or as an alternative, further embodiments of the load lifting systems may include that the load lifting structure is configured with two first attach points defining a first axis and two second attach points defining a second axis, wherein one attach point on each axis comprises a fixed connection and the other comprises a redirect element such that the suspension member passes along the first axis from the a first fixed connection through a first suspension member redirect element toward the second axis and through a second suspension member redirect element along the second axis and to a second fixed connection.

In addition to one or more of the features described herein, or as an alternative, further embodiments of the load lifting systems may include that at least one suspension member redirect element is a crank and wherein the suspension member comprises two elements and each element of the suspension member is connected to the crank.

In addition to one or more of the features described herein, or as an alternative, further embodiments of the load lifting systems may include that the suspension member is configured to extend along two axial directions with a first axis non-parallel with a second axis, and the carriage includes a first pair of guide elements configured to direct the carriage along the suspension member along the first axis and a second pair of guide elements configured to direct the carriage along the suspension member along the second axis.

In addition to one or more of the features described herein, or as an alternative, further embodiments of the load lifting systems may include a motor operably coupled to the at least one carriage guide element and configured to rotationally drive the at least one carriage guide element.

In addition to one or more of the features described herein, or as an alternative, further embodiments of the load lifting systems may include an electronics package configured to control rotational operation of the at least one carriage guide element by controlling the motor.

In addition to one or more of the features described herein, or as an alternative, further embodiments of the load lifting systems may include that the electronics package comprises a power supply, a controller, and one or more sensors configured to monitor at least one of (i) position and movement of the carriage and (ii) relative motion of a load attached thereto.

In addition to one or more of the features described herein, or as an alternative, further embodiments of the load lifting systems may include a clutch arranged between the motor and at least one carriage guide element.

In addition to one or more of the features described herein, or as an alternative, further embodiments of the load lifting systems may include a controllable capture device connected to the carriage.

In addition to one or more of the features described herein, or as an alternative, further embodiments of the load lifting systems may include that the carriage has a lower member and an upper member arranged parallel to each other and separated by a carriage separation distance, wherein the carriage includes at least one lower guide element arranged on the lower member and at least one upper guide element arranged at respective ends of the upper member, and the suspension member passes through the upper guide elements and the one or more lower guide elements, and a length of the upper member is greater than a length of the lower member.

In addition to one or more of the features described herein, or as an alternative, further embodiments of the load lifting systems may include that the load lifting system is a vehicle.

According to some embodiments, load lifting systems are provided. The load lifting systems include a first attach point configured to connect to a load lifting structure, a second attach point configured to connect to the load lifting structure, a suspension member attached at a first end to the first attach point and at a second end to the second attach point, wherein the suspension member is a continuous member between the first end and the second end, and a carriage having at least one guide element configured to move relative to the suspension member such that the carriage is movable along a curved path having a continuously varying radius of curvature movement path based on the first attach point and the second attach point, and the carriage is configured to have a load suspended therefrom.

In addition to one or more of the features described herein, or as an alternative, further embodiments of the load lifting systems may include that the first attach point is a hoist connection configured to enable extension or retraction of a length of the suspension member.

In addition to one or more of the features described herein, or as an alternative, further embodiments of the load lifting systems may include that the suspension member is a flexible member.

In addition to one or more of the features described herein, or as an alternative, further embodiments of the load lifting systems may include a load hook attached to the carriage.

In addition to one or more of the features described herein, or as an alternative, further embodiments of the load lifting systems may include a load pendant releasably attached to the load hook.

In addition to one or more of the features described herein, or as an alternative, further embodiments of the load lifting systems may include that the first attach point and the second attach point are arranged to define a single axis.

In addition to one or more of the features described herein, or as an alternative, further embodiments of the load lifting systems may include that the first attach point is a first fixed connection, and the second attach point is a first adjustable connection, and a first axis is defined therebetween. The load lifting system further includes a second fixed connection and a second adjustable connection with a second axis is defined therebetween, the second axis being non-parallel to the first axis and the suspension member passes through each of the first and second fixed connections and the first and second adjustable connections.

In addition to one or more of the features described herein, or as an alternative, further embodiments of the load lifting systems may include that the first adjustable connection includes a respective first suspension member redirect element configured to turn the suspension member from the first axis toward the second axis, and the second adjustable connection includes a respective second suspension member redirect element configured to turn the suspension member to align with the second axis.

In addition to one or more of the features described herein, or as an alternative, further embodiments of the load lifting systems may include that the first and second suspension member redirect elements are rotating elements.

In addition to one or more of the features described herein, or as an alternative, further embodiments of the load lifting systems may include that the first axis and the second axis are perpendicular to each other.

In addition to one or more of the features described herein, or as an alternative, further embodiments of the load lifting systems may include that the first axis and the second axis are neither perpendicular to each other nor parallel with each other.

In addition to one or more of the features described herein, or as an alternative, further embodiments of the load lifting systems may include that the first fixed connection is a connection configured to enable extension or retraction of a length of the suspension member.

In addition to one or more of the features described herein, or as an alternative, further embodiments of the load lifting systems may include that the suspension member is configured to extend along two axial directions with a first axis non-parallel with a second axis, and the at least one guide element of the carriage comprises a first guide element configured to direct the carriage along the suspension member and the first axis, and a second guide element configured to direct the carriage along the suspension member and the second axis.

In addition to one or more of the features described herein, or as an alternative, further embodiments of the load lifting systems may include that the suspension member is configured to extend along two axial directions with a first axis non-parallel with a second axis, and the carriage comprises a first pair of guide elements configured to direct the carriage along the suspension member along the first axis and a second pair of guide elements configured to direct the carriage along the suspension member along the second axis.

In addition to one or more of the features described herein, or as an alternative, further embodiments of the load lifting systems may include that the at least one guide element is operably coupled to a motor to be rotationally driven thereby.

In addition to one or more of the features described herein, or as an alternative, further embodiments of the load lifting systems may include an electronics package configured to control rotational operation of the at least one guide element.

In addition to one or more of the features described herein, or as an alternative, further embodiments of the load lifting systems may include that the electronics package comprises a power supply, a carriage controller, and one or more sensors configured to monitor at least one of position and movement of the carriage.

In addition to one or more of the features described herein, or as an alternative, further embodiments of the load lifting systems may include a clutch arranged between the motor and the at least one guide element.

In addition to one or more of the features described herein, or as an alternative, further embodiments of the load lifting systems may include that the load lifting structure is part of an aircraft.

In addition to one or more of the features described herein, or as an alternative, further embodiments of the load lifting systems may include that the load lifting structure is part of a crane.

In addition to one or more of the features described herein, or as an alternative, further embodiments of the load lifting systems may include a controllable capture device connected to the carriage.

In addition to one or more of the features described herein, or as an alternative, further embodiments of the load lifting systems may include that at least one of the first attach point and the second attach point comprises a crank.

In addition to one or more of the features described herein, or as an alternative, further embodiments of the load lifting systems may include that the load is a litter for carrying a person.

According to some embodiments, load lifting systems including a first attach point configured to connect to a load lifting structure, a second attach point configured to connect to the load lifting structure, a suspension member attached at a first end to the first attach point and at a second end to the second attach point, wherein the suspension member is a continuous member between the first end and the second end, and a stabilization system comprising a litter having a first guide element and a second guide element, wherein the suspension member passes through each of the first guide element and the second guide element and at least one load pendant connects each the first guide element and the second guide element to the litter are provided. The first and second attach points define a first axis therebetween and the first and second guide elements define a second axis therebetween, wherein the first axis is parallel to the second axis.

In addition to one or more of the features described herein, or as an alternative, further embodiments of the load lifting systems may include that the first attach point comprises a hoist connection configured to control a length of the suspension member.

In addition to one or more of the features described herein, or as an alternative, further embodiments of the load lifting systems may include that the load lifting structure is an aircraft.

According to some embodiments, load lifting systems including a first attach point configured to connect to a load lifting structure, a second attach point configured to connect to the load lifting structure, a suspension member attached at a first end to the first attach point and at a second end to the second attach point, wherein the suspension member is a continuous member between the first end and the second end, and a stabilization system comprising a carriage having a first guide element, a second guide element and a hook for connecting to a load, wherein the suspension member passes through each of the first guide element and the second guide element, wherein the hook is part of the carriage are provided. The first and second attach points define a first axis therebetween and the first and second guide elements define a second axis therebetween, wherein the first axis is parallel to the second axis.

In addition to one or more of the features described herein, or as an alternative, further embodiments of the load lifting systems may include that the first guide element and the second guide element define a first guide element pair, wherein the carriage comprises a second guide element pair, wherein the first guide element pair and the second guide element pair are arranged non-parallel to each other, and the suspension member passes through the first guide element pair and the second guide element pair.

In addition to one or more of the features described herein, or as an alternative, further embodiments of the load lifting systems may include that the load lifting structure is an aircraft.

In addition to one or more of the features described herein, or as an alternative, further embodiments of the load lifting systems may include that the load lifting structure is part of a crane.

The foregoing features and elements may be combined in various combinations without exclusivity, unless expressly indicated otherwise. These features and elements as well as the operation thereof will become more apparent in light of the following description and the accompanying drawings. It should be understood, however, that the following description and drawings are intended to be illustrative and explanatory in nature and non-limiting.

BRIEF DESCRIPTION OF THE DRAWINGS

The subject matter is particularly pointed out and distinctly claimed at the conclusion of the specification. The foregoing and other features, and advantages of the present disclosure are apparent from the following detailed description taken in conjunction with the accompanying drawings in which:

DETAILED DESCRIPTION

Figure 1B:
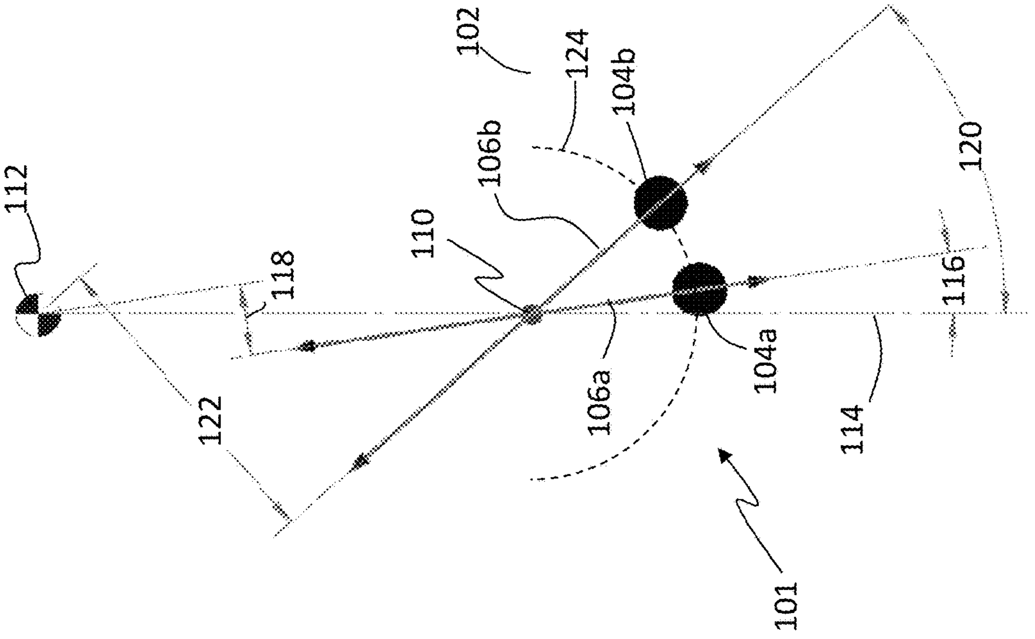
FIG. 1B Prior Art
FIG. 1B is a force diagram of the conventional load lifting system of FIG. 1A

As shown and described herein, various features of the disclosure will be presented. Various embodiments may have the same or similar features and thus the same or similar features may be labeled with similar reference numerals. Although similar reference numbers may be used in a generic sense, various embodiments will be described and various features may include changes, alterations, modifications, etc. as will be appreciated by those of skill in the art, whether explicitly described or otherwise would be appreciated by those of skill in the art.

Embodiments of the present disclosure are directed to systems and mechanisms configured to dampen or reduce the swing, oscillations, spin, or unwanted movements of a load that is suspended from a load lifting structure. In some embodiments, the load may be attached to a device that is suspended from the load lifting structure. The load lifting structures of the present disclosure can include, without limitation, helicopters and other aircraft and cranes. The systems described herein incorporate one or more flexible elements configured to replace the conventional single cable. Embodiments of the present disclosure are directed to systems for attaching a load bearing line to a load lifting device, to substantially dampen oscillation of pendulum-like motions of a suspended load. Further, embodiments of the present disclosure may decrease destabilizing moments on an air vehicle by focusing a line of action of the load bearing line through, or nearly through, the center of gravity of the air vehicle. Further, embodiments of the present disclosure may significantly reduce the spin of the suspended load.

Embodiments of the present disclosure provide for a relatively simple, light weight, and low cost system that will naturally (e.g., passively), and can actively, dampen load oscillations and reduce moments imparted to a load lifting structure by external load swinging. As such, embodiments of the present disclosure may simplify external load operations and reduce the skill level required of the pilot or operator to perform lifting/carrying operations with a suspended load. Furthermore, some embodiments of the present disclosure may be employed with unmanned aircraft or other unmanned lift operations. As such, the design of autopilot systems for unmanned operations of external loads can be significantly simpler, as such autopilot systems may not be required to account for active swinging as the systems described herein may reduce or eliminate such swinging. Such systems, as described herein, can allow for accurate load placement for delivery of a load, whether from a manned or unmanned load lifting structure (e.g., unmanned aircraft, helicopters, cranes, etc.).

Advantageously, embodiments of the present disclosure provide for an external load system that can passively and/or actively stabilize a suspended load and thus may address many of the external load problems and challenges from existing lift systems and allow for safer and more efficient load carrying operations. Furthermore, embodiments of the present disclosure can reduce the burden on air vehicle designers, load stabilization systems, and can reduce the required piloting skills necessary for such load lifting operations, while improving load placement accuracy. Systems as disclosed herein can dampen oscillations and mitigate spinning of suspended loads.

In the example of helicopters with suspended loads, such aircraft may be used to provide logistical support (e.g., equipment and/or supplies). It may be advantageous to eliminate ground personnel during load hookup processes to avoid dangers of injury to such ground personnel. During rescue operations that employ aircraft (e.g., helicopters), where a winch and cable system are used on a helicopter for extraction, pendulum oscillations and spinning of the litter or other rescue platforms can present a challenge for the operator (e.g., pilot) and danger for the occupant of such rescue platform. In the crane industry, load oscillations are difficult to control because the crane cannot move in multiple directions at once like an air vehicle to stabilize the swinging load. Further, the speed of the movement of the crane may be inhibited by the mass of the crane and cable movement systems thereof. In view of this, embodiments of the present disclosure are directed to systems that automatically stabilize the cable load thus making crane operations and aircraft operations that include a suspended load simpler and safer.

Figure 1A:
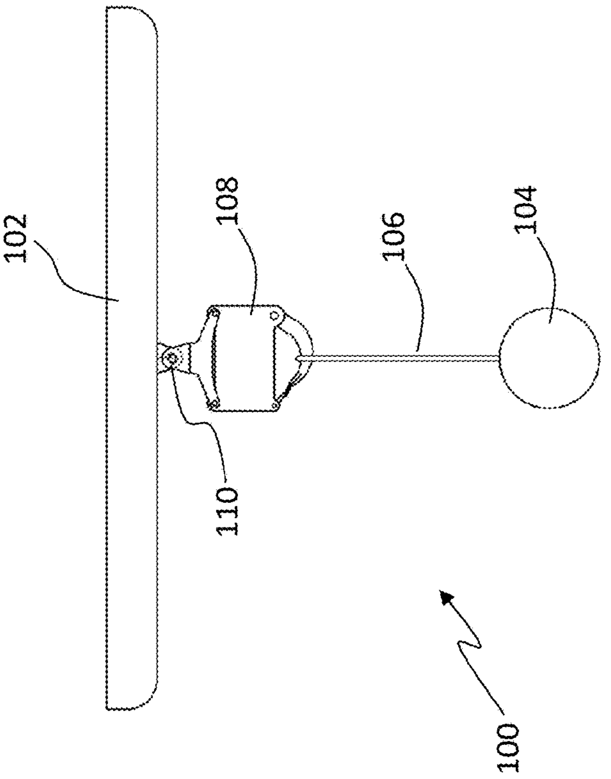
FIG. 1A Prior Art
FIG. 1A is a schematic illustration of a conventional load lifting system.

Turning now to FIGS. 1A-1B, a schematic illustration of a load lifting system 100 is shown in FIG. 1A and a vector plot 101 of forces in the load lifting system 100 is shown in FIG. 1B. The load lifting system 100 of FIGS. 1A-1B is a conventional load lifting system. The load lifting system 100 includes a load lifting structure 102 that can suspend (e.g., lift, carry, move, etc.) a load 104 therefrom. The load lifting structure 102 may be a vehicle. The vehicle, or portion thereof, from which the load lifting system may be suspended may be an aircraft (e.g., fuselage), a crane or portion of a crane, or other load carrying structure that is configured to move with a load suspended therefrom and/or have a load move while suspended therefrom. The load 104 is connected to the load lifting structure 102 through a load pendant 106 (e.g., cable, wiring, roping, bands, rod, etc.). The load pendant 106 is connected to the load lifting structure 102 through a cargo hook 108 and a cargo hook attachment 110. The cargo hook 108 may be a selectively releasable hook which can be remotely controlled to release the load 104.

Referring to FIGS. 1A-1B, the load lifting structure 102 has a center of gravity 112 (shown in FIG. 1B). In the case of a crane, the center of gravity 112 may represent a structural shear center of a lifting beam. As used herein, the term "center of gravity" refers to a vehicle or structures center of gravity or to a structural shear center, such as for cranes and beams. FIG. 1B illustrates a swing of the load 104 (FIG. 1A) between a first position 104*a* and a second position 104*b* (FIG. 1B) as suspended from the load pendant 106 (106*a*, 106*b* representative of the change in position of the load 104). In a static position, the load 104 is attached to the load lifting structure 102 at the cargo hook attachment 110 which is below the center of gravity 112 along the gravitational vertical 114 of the system (FIG. 1B).

In the first position 104*a*, the load 104 is offset from the gravitational vertical 114 by a first angle 116 which results in a first moment arm 118 relative to the center of gravity 112. In the second position 104*b*, the load 104 is offset from the gravitational vertical 114 by a second angle 120 which results in a second moment arm 122 relative to the center of gravity 112. As shown, in this simple, single-point attachment at the cargo hook attachment 110, the change in angle (first angle 116 to second angle 120) of the load 104 results in a significant increase in the moment arm relative to the center of gravity 112 (first moment arm 118 to second moment arm 122). Due to the single point connection at the cargo hook attachment 110, the resulting movement path 124 of the load 104 is a circular arc. Such movement along the circular movement path 124 causes the offset of the moment arms 118, 122. This can result in a significant force applied to the load lifting structure 102. Such forces can provide imbalance that must be corrected to ensure that the movement of the load 104 is not too great. As illustrated, the load lifting system 100 is simple pendulum and exerts moments on the load lifting structure 102 when the load 104 swings, requiring control input by an operator of the load lifting system 100 to control the oscillations of the load 104. Due to wind, movement, or even operator induced oscillations, amplification of the swinging of the load 104 may occur. Currently, carrying external loads requires experienced external load pilots/operators, or very sophisticated software for unmanned aircraft and/or aided flight/operation, to carry loads safely and efficiently to avoid dangerous oscillations.

Figure 2B:
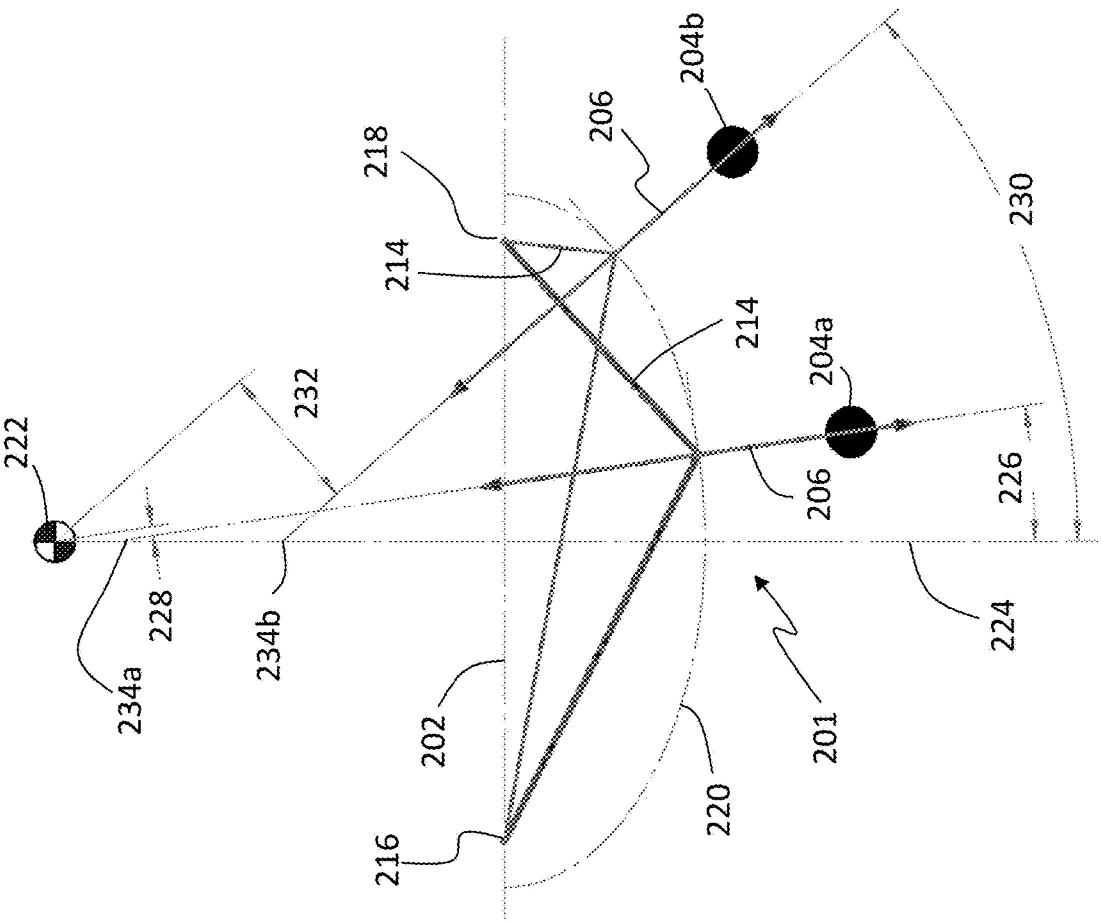
FIG. 2B is a force diagram of the load lifting system of FIG. 2A.
Figure 2A:
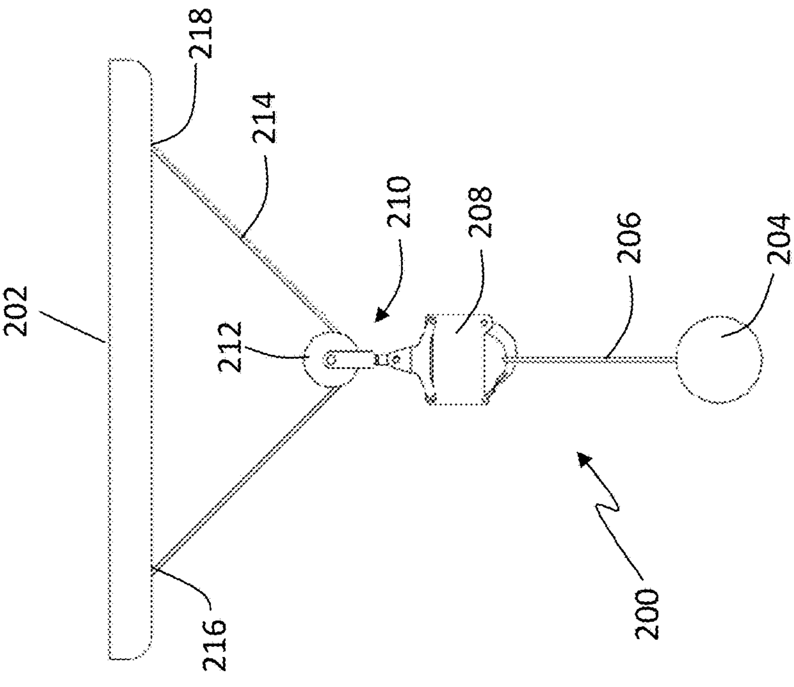
FIG. 2A is a schematic illustration of a load lifting system in accordance with an embodiment of the present disclosure.

Turning now to FIGS. 2A-2B, schematic illustrations of a load lifting system 200 in accordance with an embodiment of the present disclosure is shown in FIG. 2A and a vector plot 201 of forces in the load lifting system 200 is shown in FIG. 2B. The load lifting system 200 includes a load lifting structure 202 that can suspend (e.g., lift, carry, move, etc.) a load 204 therefrom. The load lifting structure 202 may be a vehicle. The vehicle, or portion thereof, from which the load lifting system may be suspended may be an aircraft (e.g., fuselage), a crane or portion of a crane, or other load carrying structure that is configured to move with a load suspended therefrom and/or have a load move while suspended therefrom. The load 204 is connected to the load lifting structure 202 through a load pendant 206 (e.g., cable, wiring, roping, bands, rod, etc.). The load pendant 206 is connected to the load lifting structure 202 through a cargo hook 208. In this embodiment, the cargo hook 208 is not directly mounted to the load lifting structure 202 (e.g., as done in the load lifting system 100 of FIGS. 1A-1B). Similar to the embodiment of FIGS. 1A-1B, the cargo hook 208 may be a selectively releasable hook which can be remotely controlled to release the load 204. In this embodiment, the cargo hook 208 is attached to the load lifting structure 202 through a stabilization system 210. The stabilization system 210, in this embodiment, includes a guide element 212 that is configured to slide, run, or move along a suspension member 214. In this particular non-limiting embodiment, the guide element 212 is a pulley and the suspension member 214 is a cable or the like that is attached to the load lifting structure 202 at two distinct and separate fixed connections 216, 218. The suspension member 214, in accordance with embodiments of the present disclosure, is a flexible structure or element, such as a cable, rope, belt, or the like.

As shown in FIG. 2B, the two fixed attach points 216, 218 of the suspension member 214 results in an elliptical movement path 220 of the load 204 (e.g., movement from a first position 204*a* to a second position 204*b* shown in FIG. 2B). Similar to FIGS. 1A-1B, the load lifting structure 202 has a center of gravity 222 (shown in FIG. 2B). FIG. 2B illustrates a swing of the load 204 (FIG. 2A) between the first position 204*a* and the second position 204*b* (FIG. 2B) as suspended from the load pendant 206. In a static position, the load 204 is attached to the load lifting structure 202 through the stabilization system 210 which results in the load 204 being below the center of gravity 222 along a gravitational vertical 224 of the system (FIG. 2B).

In the first position 204*a*, the load 204 is offset from the gravitational vertical 224 by a first angle 226 which results in a first moment arm 228 relative to the center of gravity 222. In the second position 204*b*, the load 204 is offset from the gravitational vertical 224 by a second angle 230 which results in a second moment arm 232 relative to the center of gravity 222. Although the change in angle (first angle 226 to second angle 230) of the load 204 results in an increase in the moment arm relative to the center of gravity 222 (first moment arm 228 to second moment arm 232), such change in moment arm is less than that experienced in the configuration of FIGS. 1A-1B.

The vector plot 201 of FIG. 2B illustrates the vector mechanics of the load lifting system 200, and illustrates how the destabilizing moment arm (228, 232) about the center of gravity 222 is significantly reduced as compared to the load lifting system 100 of FIGS. 1A-1B. For example, up to ten times or greater reduction may be achieved for smaller angular displacements and up to two times or greater reduction for larger angular displacements may be achieved. In these examples, small angular displacements may be between 0° and 15° and large angular displacements may be between 35° and 45°. These angles and improvements in reduction are merely for explanatory purposes and those of skill in the art will appreciate that such reduced moment arm is dependent on the vertical position of the center of gravity relative to the attach points of the system. The arrangement of the attach points and cable length can be tailored to focus the line of action as desired relative to the center of gravity of the load lifting structure. Such reductions may be based, in part, on compromises between available vehicle structural real estate for system attachment, ground clearance, and system space requirements. This is achieved because of the curvilinear movement path 220 and load vector focal point location 234*a*, 234*b* being closer to the center of gravity 222 as compared to cargo hook attachment 110 shown in FIG. 1B which defines the load vector focal point location of the load lifting system 100.

As the guide element 212 moves along the suspension member 214 in response to a swing of the load 204, the line of action of the load 204 is normal to the elliptical movement path 220 established by the suspension member 214 and the fixed attach points 216, 218 thereof. As the load 204 moves further away from the gravitational vertical 224, the load line of action moves further down and away from the center of gravity 222 (e.g., change from point 234*a* to point 234*b*), providing a gradually increasing moment arm about the center of gravity 222 (e.g., change from moment arm 228 to moment arm 232). As such, the gradual increase in moment arm results in a gradually increasing destabilizing force which in turn may be more easily controlled by an operator and/or autonomous program. For a given amount of kinetic energy present in a moving (e.g., swinging/swaying) load (as may be present from an initiated movement of that load), by providing a moving fulcrum of the pendulum (e.g., change from point 234*a* to point 234*b*), the angle between the pendulum and the gravitational vertical 224 is reduced as compared to a fixed fulcrum. This is due to a portion of the kinetic energy being composed of translational energy as the guide element 212 moves along the suspension member 214, which is dissipated through friction in the guide element 212. As such, the angular momentum may be reduced and the resultant potential energy may be stored in the swing, thereby reducing the swing with each swing cycle and dampen oscillations to near zero. Such oscillation damping may occur at durations that are thirty times, or more, faster than that of conventional systems (e.g., as shown in FIGS. 1A-1B). That is, advantageously, embodiments of the present disclosure may improve swing and oscillation damping by orders of magnitude faster than conventional pendant systems.

In some embodiments, the engagement between the guide element 212 and the suspension member 214 may be further controlled. For example, the addition of controlled friction in the guide element 212 can provide an active load stabilization as compared to a passive system where the guide element 212 is free to move along the suspension member 214. Further, in some embodiments, a motorized control or assist of the guide element 212 can be used to move the load 204 ahead of the pendulum angular vertical position to further minimize the angular displacement, thereby further reducing the stored angular potential energy with each swing cycle.

Figure 3A:
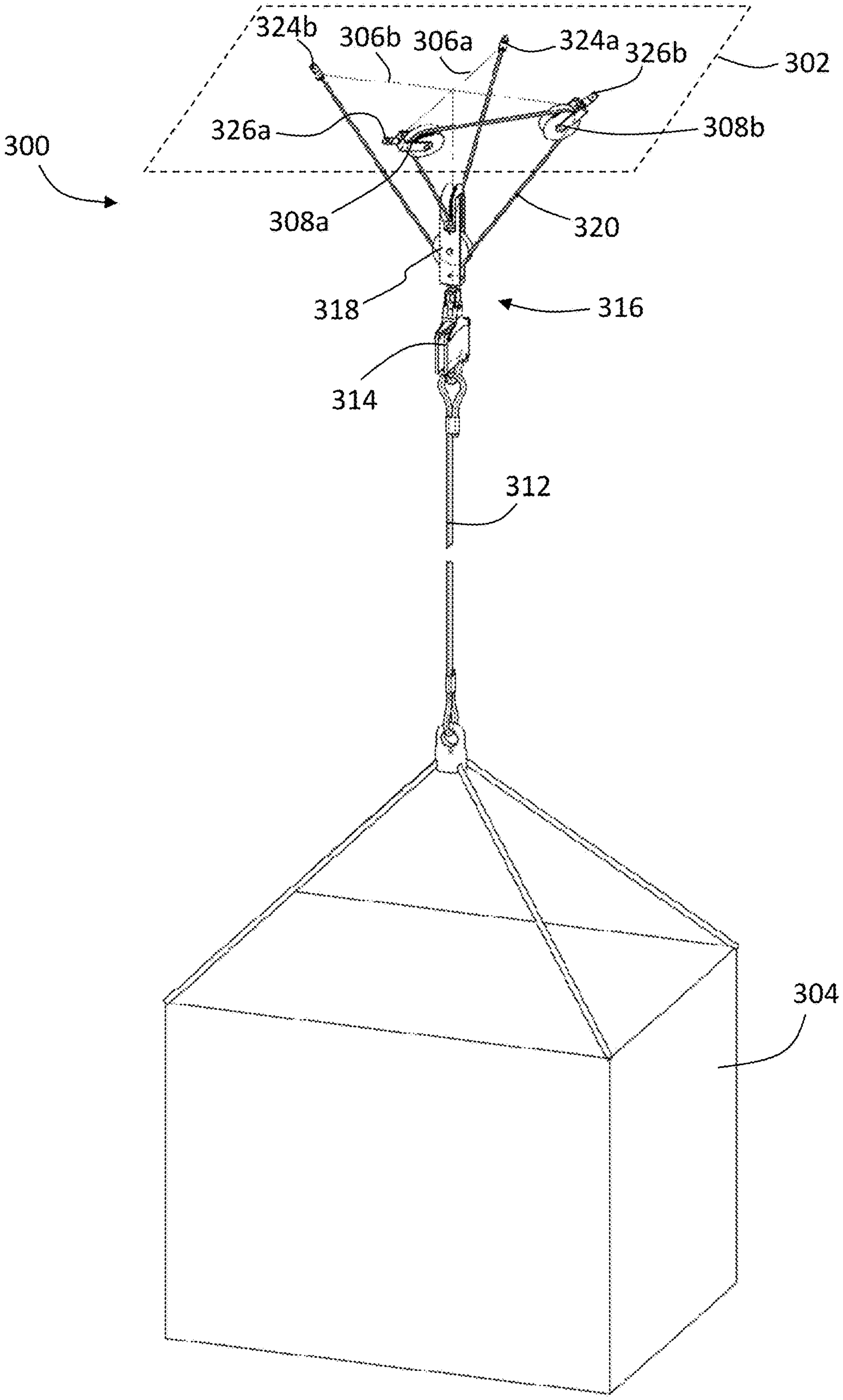
FIG. 3A is a schematic illustration of a load lifting system in accordance with an embodiment of the present disclosure.
Figure 3B:
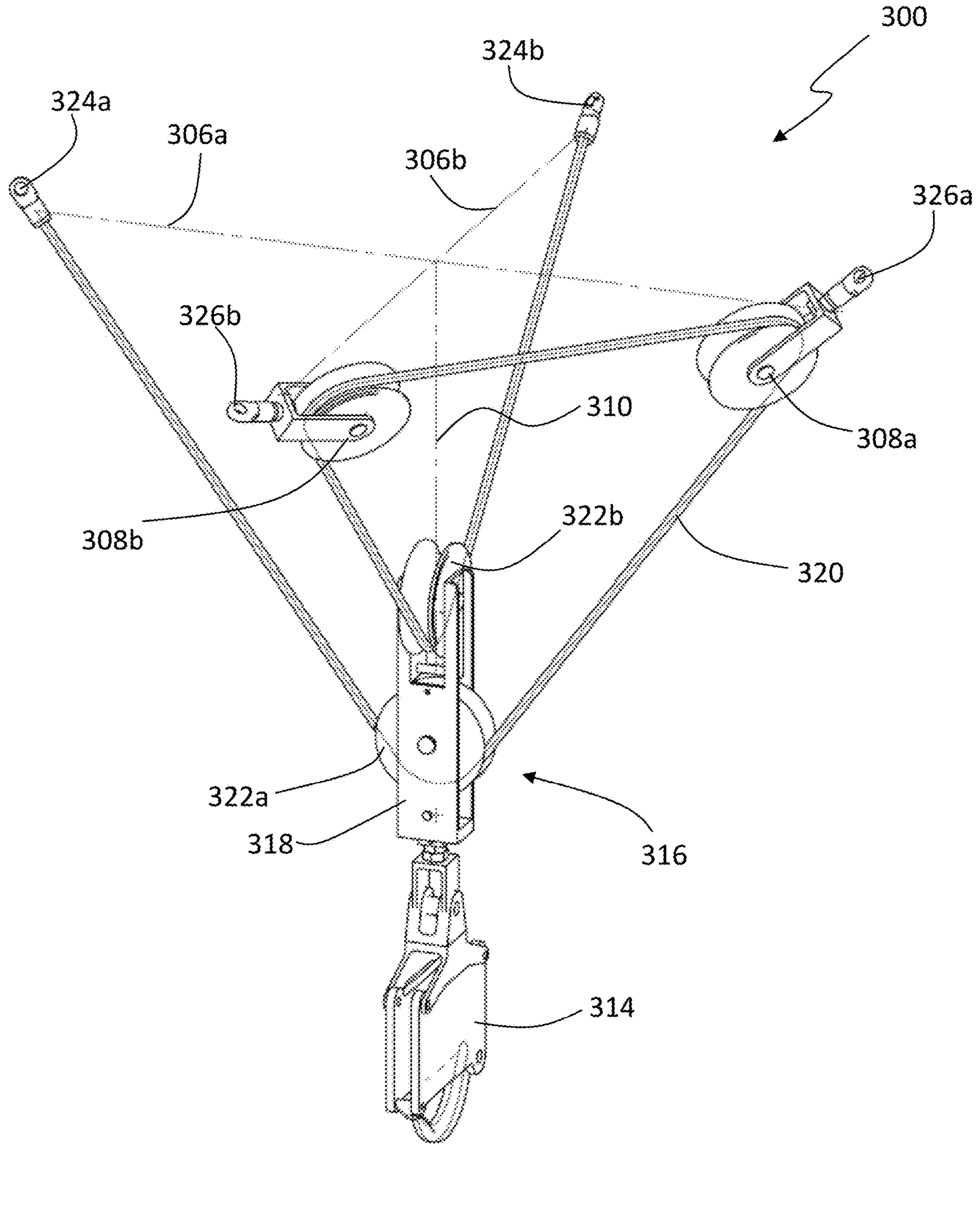
FIG. 3B is an enlarged illustration of a portion of the load lifting system of FIG. 3A.

Turning now to FIGS. 3A-3B, schematic illustrations of a load lifting system 300 in accordance with an embodiment of the present disclosure are shown. FIG. 3A illustrates the load lifting system 300 attached to a load lifting structure 302 and suspending a load 304. The load lifting system 300 of FIGS. 3A-3B is a 2-axis (306*a*, 306*b*) system using suspension member redirect elements 308*a*, 308*b* aligned with each axis 306*a*, 306*b*. By employing one or more suspension member redirect elements per axis, the load lifting system 300 can provide the same benefits, previously described, in two axis/directions, thus providing for damping in all relevant directions for a suspended load. In this embodiment, an intersection of a first axis 306*a* with a second axis 306*b* intersects with a gravitational vertical 310 (FIG. 3B).

The load lifting system 300 includes the load lifting structure 302 that can suspend (e.g., lift, carry, move, etc.) the load 304 therefrom. The load lifting structure 302 may be a portion of an aircraft (e.g., fuselage), a portion of a crane, or the like. The load 304 is connected to the load lifting structure 302 through a load pendant 312 (e.g., cable, wiring, roping, bands, rod, etc.). The load pendant 312 is connected to the load lifting structure 302 through a cargo hook 314. In this embodiment, the cargo hook 314 is not directly mounted to the load lifting structure 302. The cargo hook 314 may be a selectively releasable hook which can be remotely controlled to release the load 304. In this embodiment, the cargo hook 314 is attached to the load lifting structure 302 through a stabilization system 316. The stabilization system 316, in this embodiment, includes a carriage 318 that is configured to slide, run, or move along a suspension member 320 in a three-dimensional movement about the first and second axes 306*a*, 306*b*.

In this non-limiting embodiment, the carriage 318 includes a first guide element 322*a* and a second guide element 322*b* and the suspension member 320 is a cable, roping, belt, band, or the like that is attached to the load lifting structure 302. In this embodiment, the suspension member 320 is supported on the load lifting structure 302 at four distinct locations. As shown in FIGS. 3A-3B, the attachment of the stabilization system 316 to the load lifting structure 302 includes four attach points arranged as two fixed connections 324*a*, 324*b* and two adjustable connections 326*a*, 326*b* (e.g., redirect elements). As used herein, adjustable connections are connections or attachment mechanisms for adjustably connecting the suspensions member to a load lifting structure and that such adjustable connections are movably operable to adjust angles, positions, or orientations to permit changes in position of a suspended load. The adjustable connections provide for self-aligning of the components during operation. The suspension member redirect elements 308*a*, 308*b* are provided at the adjustable connections 326*a*, 326*b* to enable a sliding or adjustable engagement of the suspension member 320 between the load 304 and the load lifting structure 302. The first fixed connection 324*a* and the first adjustable connection 326*a* are arranged along (and define) the first axis 306*a* and the second fixed connection 324*b* and the second adjustable connection 326*b* are arranged along (and define) the second axis 306*b*.

In the configuration of FIGS. 3A-3B, the suspension member 320 is a flexible member having a length that extends from the first fixed connection 324*a* along the first axis 306*a* through the first guide element 322*a* to the first adjustable connection 326*a*. The suspension member 320 is then shifted to the second axis 306*b* as the suspension member 320 extends from the first adjustable connection 326*a* to the second adjustable connection 326*b*. The transition from the first axis 306*a* to the second axis 306*b* is achieved through use of a first suspension member redirect element 308*a* that enables a change in direction of the suspension member 320. At the second adjustable connection 326*b*, the suspension member 320 passes through the second suspension member redirect element 308*b*. The suspension member 320 passes from the second adjustable connection 326*b* through the second guide element 322*b* to the second fixed connection 324*b*.

The carriage 318 is movable along both the first axis 306*a* and the second axis 306*b* as the first and second guide elements 322*a*, 322*b* are movable along the suspension member 320. Because the suspension member 320 is flexible and continuous from the first fixed connection 324*a* to the second fixed connection 324*b*, through the adjustable connections 326*a*, 326*b* and the guide elements 322*a*, 322*b* of the carriage 318, the stabilization system 316 is movable in three dimensions relative to the gravitational vertical 310. Further, each axis 306*a*, 306*b* provides similar functionality along the respective axis as the load lifting system 200 of FIGS. 2A-2B. The end result is a non-circular, non-spherical movement path, and specifically, due to the placement of the attach points 324*a*, 324*b*, 326*a*, 326*b* a quasi-ellipsoid movement path is achieved. Due to this quasi-ellipsoid movement path, the load vector focal point locations through the movement is closer to the center of gravity (or equivalent thereof) of the load lifting structure 302, and thus moments about the center of gravity will be naturally reduced, as previously described.

In accordance with embodiments of the present disclosure, the suspension member (e.g., suspension members 214, 320) may be continuous. In a multi-axis configuration, the suspension member redirect elements provide points to enable a continuous suspension member that spans two or more axes. Such configurations provide for load stabilization on two different axes and continuous load sharing among sections of the suspension member 320 emanating from the carriage 318 to each of the attach points 324*a*, 324*b*, 326*a*, 326*b*. As such, and as discussed above, such a configuration can provide a near-3D elliptical surface pathway that the carriage 318 can follow.

It is noted that if the sections of cables for each axis were separate and mounted to a load lifting structure along their respective axis at separate attachment points, the two resultant loops (e.g., two separate and orthogonal suspension members similar to that shown in FIGS. 2A-2B) would provide elliptical paths for the carriage along their respective axis. However, in such configurations, when the carriage moves opposite an axis (i.e., normal to the axis), the loop would pivot about the axis, forcing a circular path for the carriage that would be unable to follow the elliptical path of the opposing axis' loop. Thus, the load on the carriage would be borne by only a single loop, and the circular path that it followed would cause larger destabilizing moments about the center of gravity of the load lifting structure and the effectiveness of the system would result in a similar system as that shown and described in FIGS. 1A-1B. The pendulum oscillation damping effect would also be significantly diminished because the path followed by the load would be essentially the same as a simple pendulum with a pivot axis coincident with the axis created by the attach points of the loop, thus the opposing loop would go slack as the load moved away from center/vertical, contributing little to dampen the load oscillation and nothing to sharing the load. As such, the continuous suspension member that extends across multiple axes provides continuous load sharing on both axis and improved movement damping of a suspended load.

The continuous load sharing also helps distribute the total load to the various attach points on the load lifting structure. This enables distributing the load to possible strategic attach points on the load lifting structure and reducing large loads being imposed on one single point (e.g., contra FIGS. 1A-1B). This can be a significant advantage for aircraft where weight is critical and structural modifications can be more easily accommodated when the load requirement is reduced at each attach point. Further the load may be directed to locations on the load lifting structure where the load may be carried more efficiently (e.g., less structural weight required for a given carried load).

In the load lifting system 300 of FIGS. 3A-3B, the suspension member 320 is substantially fixed length, although it may be partially flexible. The length of the suspension member 320 does not significantly deviate from the length of the path along the first axis 306*a*, transition to the second axis 306*b*, and then along the second axis 306*b*. However, in some embodiments, the suspension member may not be fixed length between the start and end fixed points. In some embodiments, only one end of the suspension member may be fixed to the load lifting structure, and all other connection or attachment points may be adjustable.

In accordance with embodiments of the present disclosure, the adjustable connections arranged at various attach points are configured to provide not only a redirection or change of orientation of the suspension member, but to also provide a self-aligning functionality. That is, as the adjustable connections may rotate or move due to a suspended load changing position, the adjustable connections, in combination with the suspension member, will apply force to return a state of the system to a rest state. As such, the combination of the fixed connections, adjustable connections, and flexible suspension member all act in concert to apply a correction force to return the system to the rest state (e.g., when a load is suspended from a load lifting structure and no other external forces are applied to the load).

Figure 4:
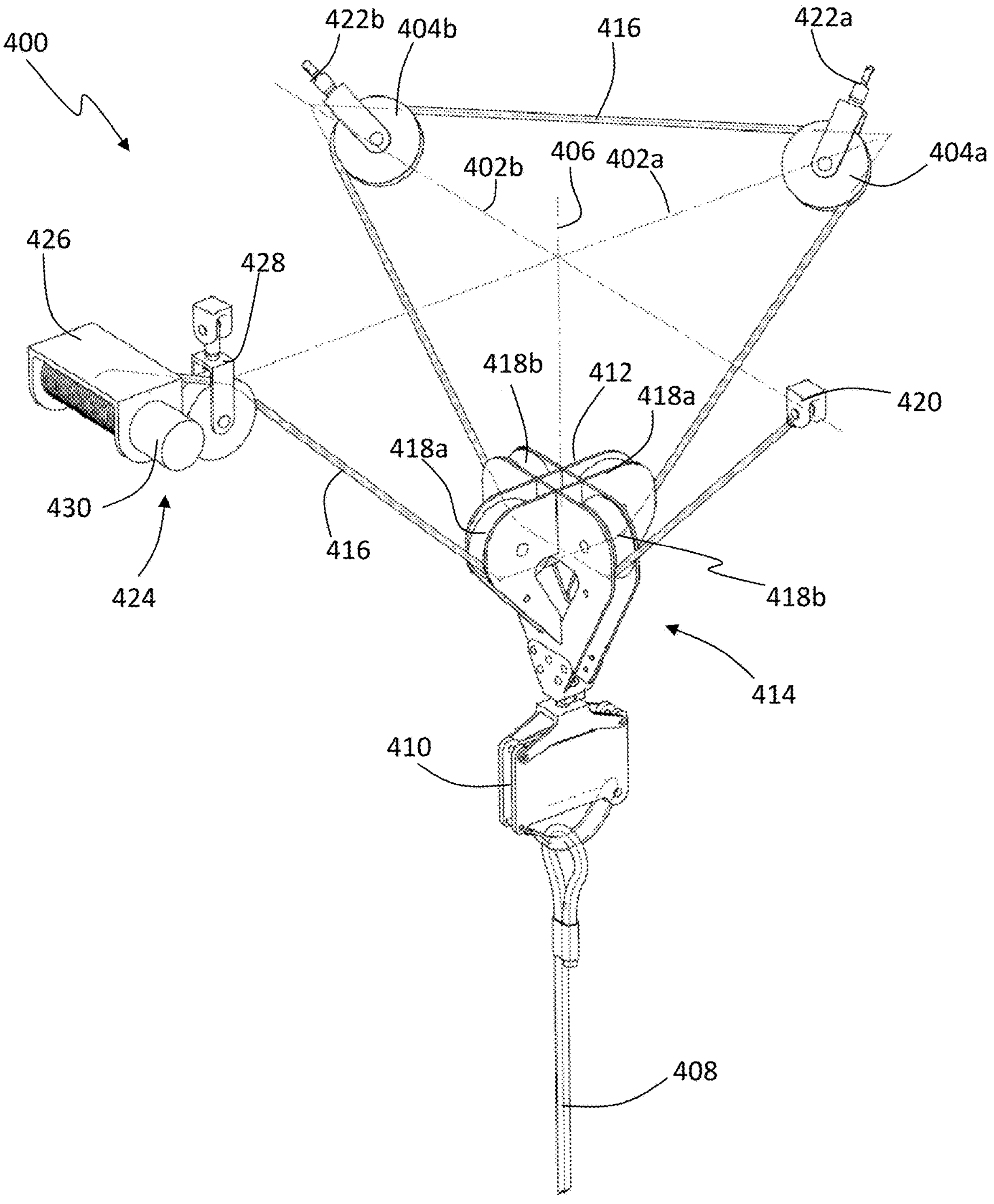
FIG. 4 is a schematic illustration of a load lifting system in accordance with an embodiment of the present disclosure.

For example, now referring to FIG. 4, a schematic illustration of a load lifting system 400 in accordance with an embodiment of the present disclosure is shown. The load lifting system 400 is attached to a load lifting structure and configured to suspend a load therefrom (load lifting structure and load not shown for clarity). The load lifting system 400 of FIG. 4 is a 2-axis (402*a*, 402*b*) system using a suspension member redirect element 404*a*, 404*b* aligned with each axis 402*a*, 402*b*, similar to the embodiment shown in FIGS. 3A-3B. In this embodiment, an intersection of a first axis 402*a* with a second axis 402*b* intersects with a gravitational vertical 406. A load pendant 408 (e.g., cable, wiring, roping, bands, rod, etc.) is releasably suspended or attached to a cargo hook 410, which in turn is attached to a carriage 412 of a stabilization system 414. The stabilization system 414, in this embodiment, includes the carriage 412 that is configured to slide, run, or move along a suspension member 416 in a three-dimensional movement about the first and second axes 402*a*, 402*b*.

In this non-limiting embodiment, the carriage 412 includes a first set of guide elements 418*a* and a second set of guide elements 418*b*. The suspension member 416 is a cable, roping, belt, band, or the like that is attached to the load lifting structure. In this embodiment, the suspension member 416 is supported on the load lifting structure at four distinct locations. As shown in FIG. 4, the attachment of the stabilization system 414 to the load lifting structure by the suspension member 416 includes four attach points including a fixed connection 420, two adjustable connections 422*a*, 422*b*, and a hoist connection 424. The suspension member redirect elements 404*a*, 404*b* are provided at the adjustable connections 422*a*, 422*b* to enable a sliding or adjustable engagement of the suspension member 416 between the load and the load lifting structure. The hoist connection 424 includes a spool 426 and a suspension member guide 428. A portion, section, or length of the suspension member 416 may be wound about the spool 426 to allow for additional length of the suspension member 416 to be included (i.e., not a fixed length suspension member). As such, the length of the suspension member 416 may be adjustable within the load lifting system 400. Such length adjustment can enable change of the vertical position of the stabilization system 414 and thus a suspended load relative to a load lifting structure.

In this illustrative configuration, the suspension member guide 428 and the first adjustable connection 422*a* are arranged along (and define) the first axis 402*a* and the second adjustable connection 422*b* and the fixed connection 420 are arranged along (and define) the second axis 402*b*. The adjustable connections 422*a*, 422*b* are configured to operate similar to that described above. In this configuration, the hoist connection 424 provides for allowing the length of the suspension member 416 to be adjusted in total length from the hoist connection 424 to the fixed connection 420. Additionally, as noted above, the carriage 412 includes two pairs of guide elements 418 (418*a*, 418*b*). It will be appreciated that the two pairs of guide elements 418*a*, 418*b* define paths for the suspension element 416 that are arranged at different vertical positions within the carriage 412 such that the suspension member 416 does not interfere with itself as it passes through the carriage 412 along the two separate axes defined by the two pairs of guide elements 418*a*, 418*b*.

In the embodiment of FIG. 4, the load lifting system 400 is a 2-axis, 2 guide elements per axis arrangement along with a hoist connection 424 that enables extension and retraction of the suspension member 416 on which the carriage 412 rides. The hoist connection 424 provides the ability to lower a load and load pick up means (e.g., hooks, connectors, or the like), the ability to retract and store the stabilization system 414 close to or against a load lifting structure, and the ability to change, adjust, or control the damping characteristics of the load lifting system 400 by changing the angle that the individual sections of the suspension member 416 make with the gravitational vertical 406 as the carriage 412 is lowered or raised relative to the load lifting structure. The more the suspension member 416 is extended, the smaller the angle with the gravitational vertical 406. The reduced angle will result in the system approaching a functionality similar to a simple pendulum and thus subject to more pendulum-like characteristics. As such, using a longer length of suspension member can result in less damping and control, but may provide benefits for carrying of loads (e.g., control for placement, extension of the load pendant 408, extra length for rescue operations, etc.). As such, an operator can control the position of parts of the load lifting system 400 or a load suspended therefrom. Such control may be provided by a hoist motor controller 430 that is part of the hoist connection 424 and operably connected to the spool 426 to extend or retract lengths of the suspension member 416.

Although FIG. 4 illustrates the hoist connection 424 arranged along the first axis 402*a*, such position is not required. The hoist connection 424 may be positioned at a desired location, and an appropriate set of suspension member guides and/or redirect guides may be provided to have, at least, the suspension member guide 428 arranged along the first axis 402*a* such that the suspension member 416 forms the defined axes 402*a*, 402*b*.

Although the above described embodiments employ pulley-type structures, particularly for the suspension member redirect elements, such pulleys are not to be limiting, and other structures may be used without departing from the scope of the present disclosure. For example, in some embodiments, rather than using a rotating body (i.e., a pulley), in some embodiments a sliding surface configuration may be employed.

Referring now to FIGS. 5A-5E, schematic illustrations of a load lifting system 500 in accordance with an embodiment of the present disclosure are shown. The load lifting system 500 may be attached to a load lifting structure and configured to suspend a load therefrom (load lifting structure and load not shown for clarity). The load lifting system 500 of FIG. 5 is a 2-axis system using a suspension member redirect element 502*a*, 502*b* aligned with each axis, similar to the embodiments described above. A load pendant 504 (e.g., cable, wiring, roping, bands, rod, etc.) is releasably suspended or attached to a cargo hook 506, which in turn is attached to a carriage 508 of a stabilization system 510. The stabilization system 510, in this embodiment, includes the carriage 508 that is configured to slide, run, or move along a suspension member 512 in a three-dimensional movement about the first and second axes.

Figure 5A:
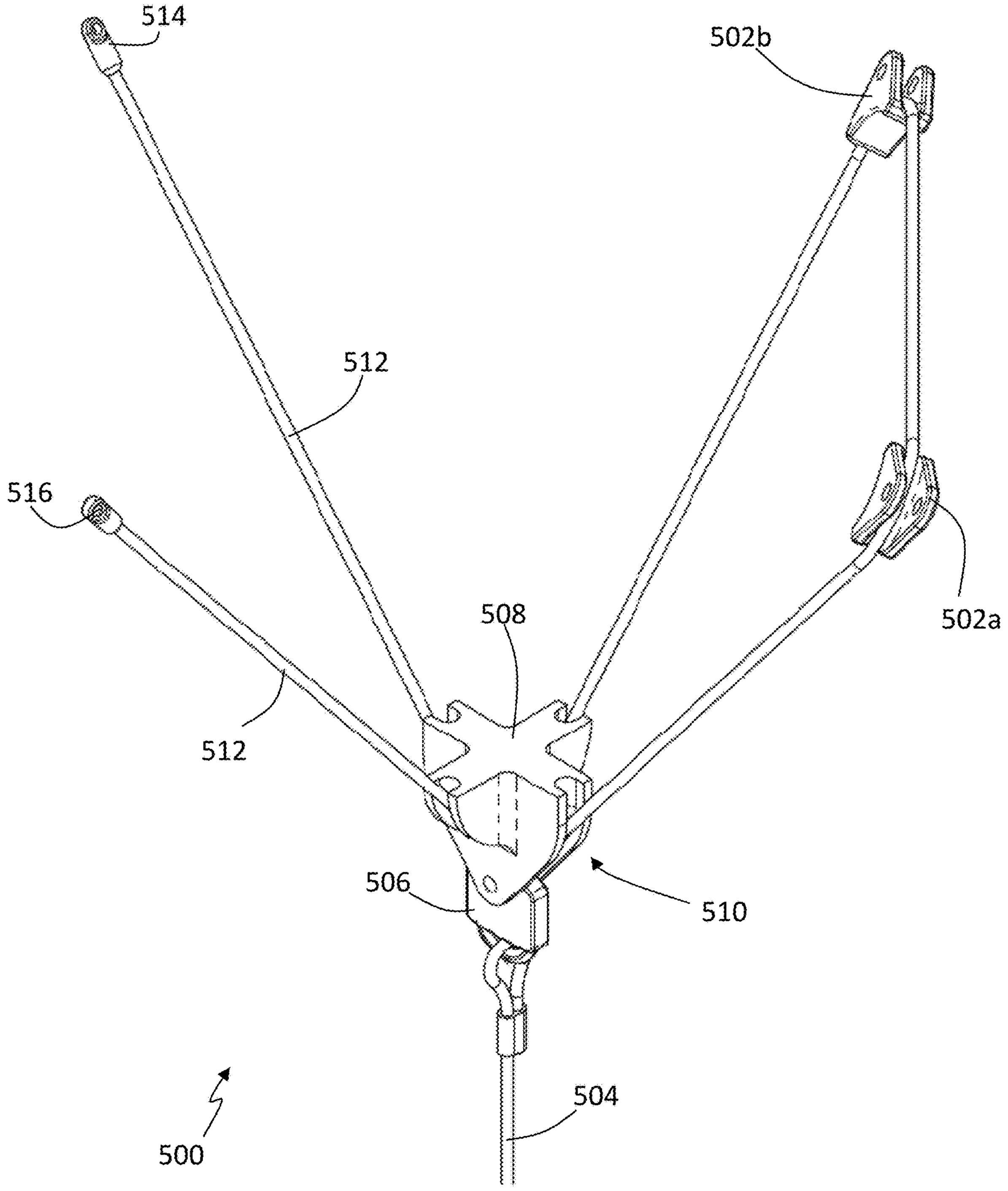
FIG. 5A is a schematic illustration of a load lifting system in accordance with an embodiment of the present disclosure.

In this non-limiting embodiment, the carriage 508 is arranged as a sliding carriage, as compared to a rolling carriage as shown and described above. The suspension member 512 is a cable, roping, belt, band, or the like that is attached to the load lifting structure. In this embodiment, the suspension member 512 is supported on the load lifting structure at four distinct locations. As shown in FIG. 5A, the attachment of the stabilization system 510 to the load lifting structure by the suspension member 512 is at four attach points including a first fixed connection 514, two adjustable connections in the form of the suspension member redirect elements 502*a*, 502*b*, and a second fixed connection 516.

Figure 5B:
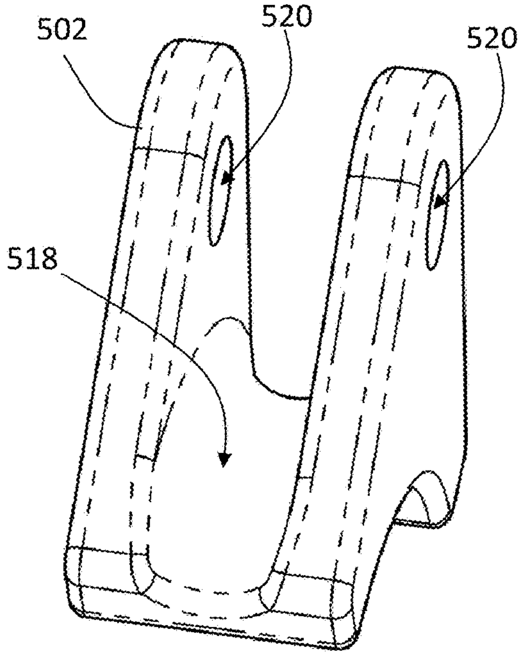
FIG. 5B is a schematic illustration of a guide element of the load lifting system of FIG. 5A.

As noted, a sliding configuration is employed in this embodiment. FIG. 5B illustrates an enlarged illustration of a suspension member redirect element 502 (representative of either suspension member redirect elements 502*a*, 502*b*). As shown in FIG. 5B, the suspension member redirect element 502 has a sliding surface 518 that is sized, shaped, and contoured to allow the suspension member 512 to slide substantially frictionlessly or with minimal frictional contact across the sliding surface 518. The suspension member redirect element 502 may be affixed or attached to a load lifting structure through one or more attachment apertures 520. In some embodiments, the attachment of the suspension member redirect element 502 to the load lifting structure may be in a manner such that the suspension member redirect element 502 can move relative to the load lifting structure, thus allowing adjustment of the angle at which the suspension member 512 is redirected from one axis to another. In other embodiments, the suspension member redirect element 502 may be fixedly attached to the load lifting structure in a fixed manner and the angle of adjustment or redirect of the suspension member 512 may be static in such embodiments.

Figure 5C:
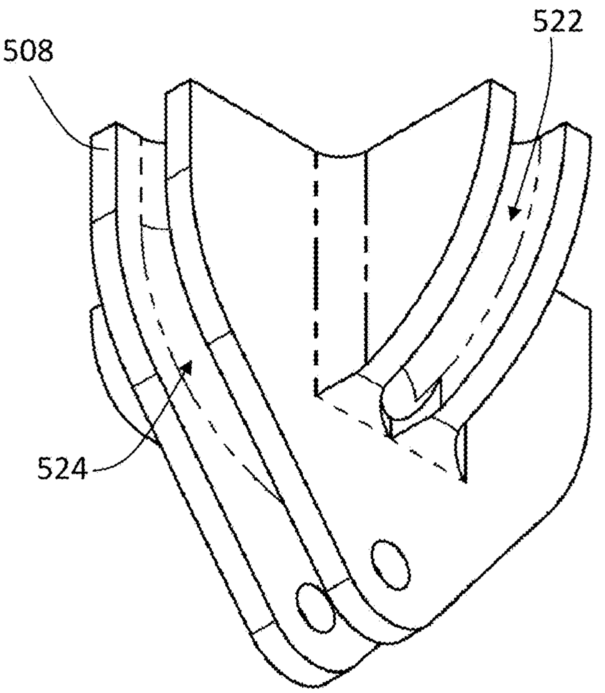
FIG. 5C is a perspective illustration of a carriage of the load lifting system of FIG. 5A.
Figure 5D:
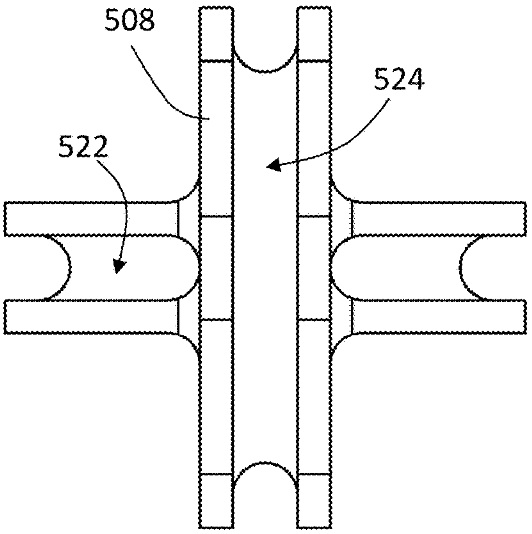
FIG. 5D is a bottom-up plan view of the carriage of FIG. 5C.
Figure 5E:
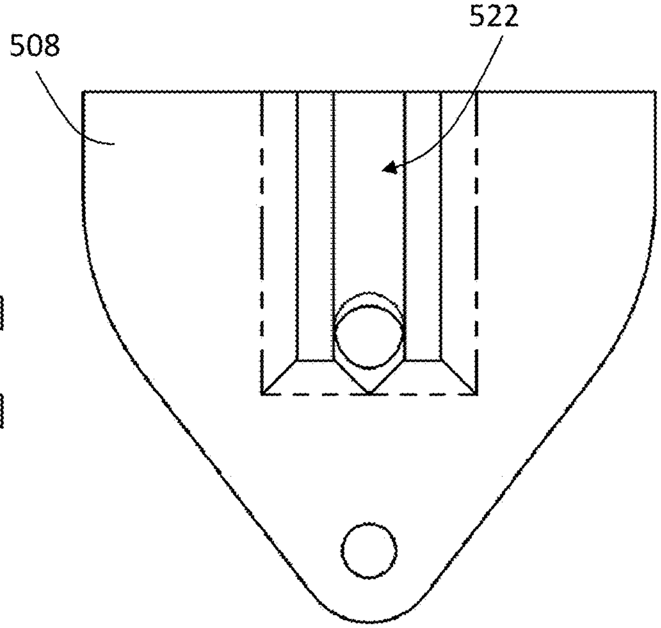
FIG. 5E is a side elevation view of the carriage of FIG. 5C.

Additionally, in this embodiment, the carriage 508 also includes sliding surfaces rather than rolling elements (e.g., pulleys) or the like. Schematic views of the carriage 508 having sliding surfaces is shown in FIGS. 5C-5E. FIG. 5C is a perspective view of the carriage 508, FIG. 5D is a bottom-up plan view of the carriage 508, and FIG. 5E is a side elevation view of the carriage 508. The carriage 508 includes a first sliding path 522 and a second sliding path 524. The two sliding paths 522, 524 of the carriage 508 define paths along which the suspension member 512 may slide or move. Stated another way, the carriage 508 may slide, move relative to, or along the suspension member 512 along the two sliding paths 522, 524. The two sliding paths 522, 524 can be arranged normal to each other and help define the axes of movement of the carriage 508 relative to the load lifting structure. It will be appreciated that the two sliding paths 522, 524 are arranged at different vertical positions within the carriage 508 such that they do not interfere with each other.

It will be appreciated that combinations of sliding surfaces and pulley-like components may be used in combination without departing from the scope of the present disclosure. For example, in some non-limiting embodiments, the carriage may retain the rolling configuration and the redirect elements may be sliding. In other embodiments, the redirect elements may be rolling configurations and the carriage may be a sliding configuration. Further, in some embodiments, a combination of rolling and sliding redirect elements may be employed, without departing from the scope of the present disclosure. For example, at the first change in axis, a sliding redirect element may be employed and at the second change in axis, a rolling redirect element may be employed. It will be appreciated that the opposite configuration may also be employed without departing from the scope of the present disclosure.

Figure 6:
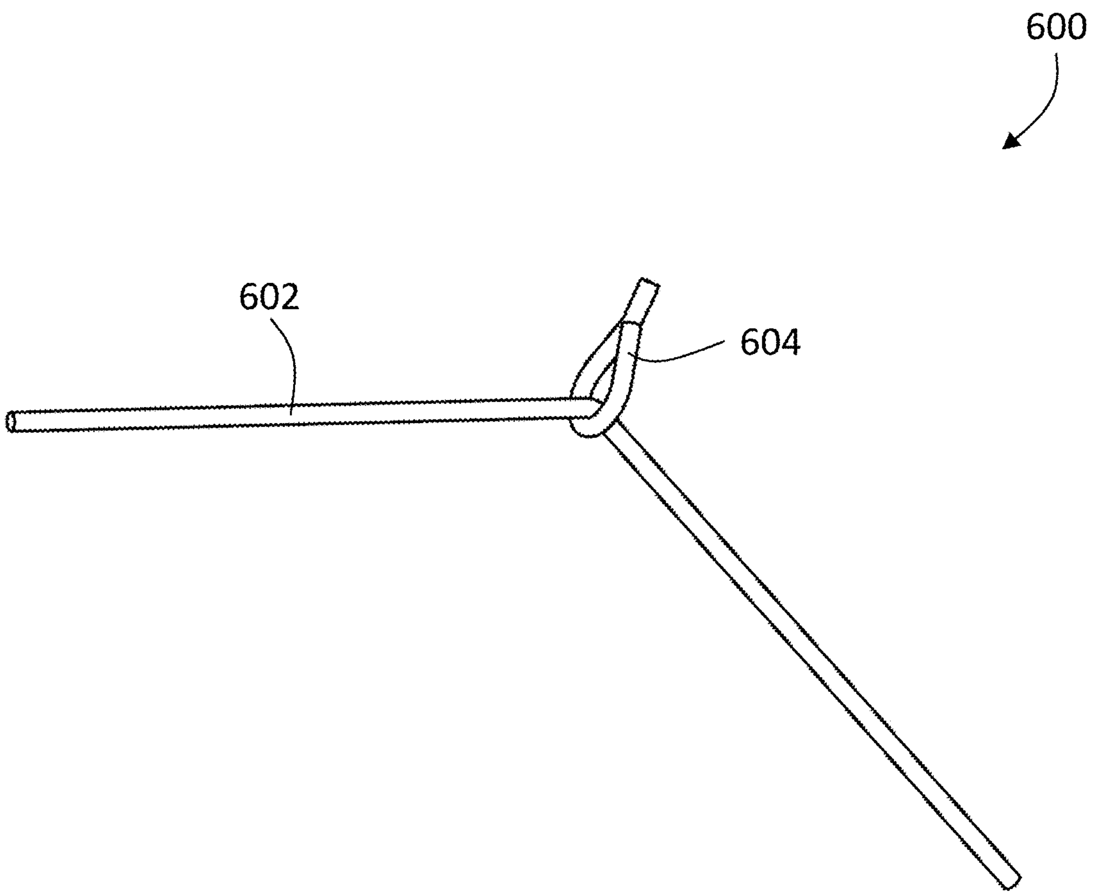
FIG. 6 is a schematic illustration of a portion of a load lifting system in accordance with an embodiment of the present disclosure.

Turning now to FIG. 6, an alternative version of a non-rolling element in accordance with an embodiment of the present disclosure is shown. FIG. 6 illustrates a portion of a load lifting system 600, showing only a suspension member 602 and a suspension member redirect element 604. In this configuration, the suspension member redirect element 604 is an eyelet or loop configuration which can attach to a load lifting structure (not shown). FIG. 6 provides illustration of one non-limiting configuration of a non-rolling element for redirecting the orientation of the suspension member 602. It will be appreciated that other types of redirect elements may be employed without departing from the scope of the present disclosure.

In the above described embodiments, the carriage is a passive system that rides along (slides, translates, etc.) the suspension member of the system. Such systems may still be subject to some amount of oscillation and it may be advantageous to have further reduction in oscillations and swinging. Such additional reduction may be provided, in some embodiments, through a hoist connection, as shown in FIG. 4. However, additional control may be provided by having an actively operated carriage that is configured to drive rollers or the like such that a swing may be counteracted actively by the system.

Figure 7A:
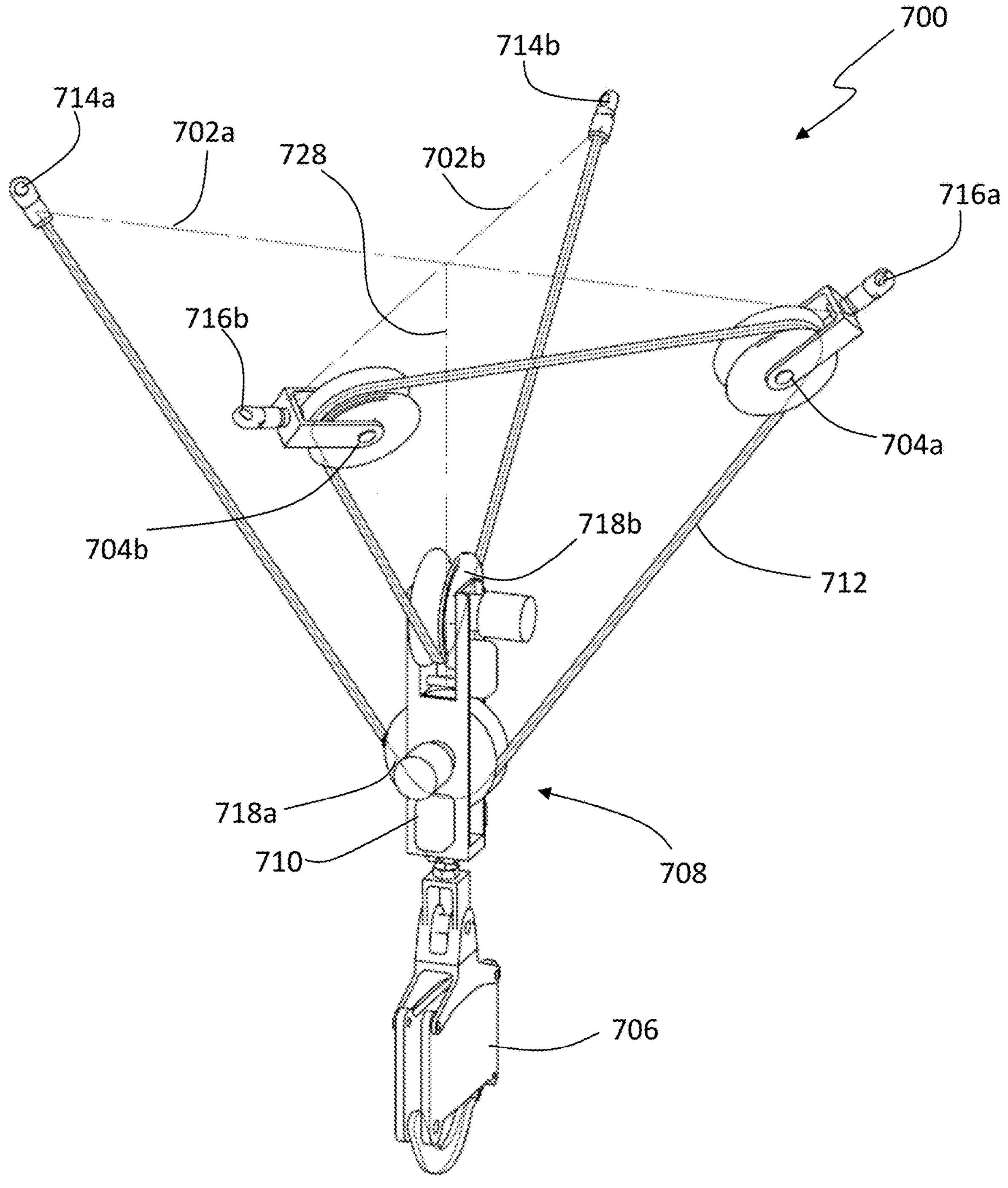
FIG. 7A is a schematic illustration of a load lifting system in accordance with an embodiment of the present disclosure.
Figure 7B:
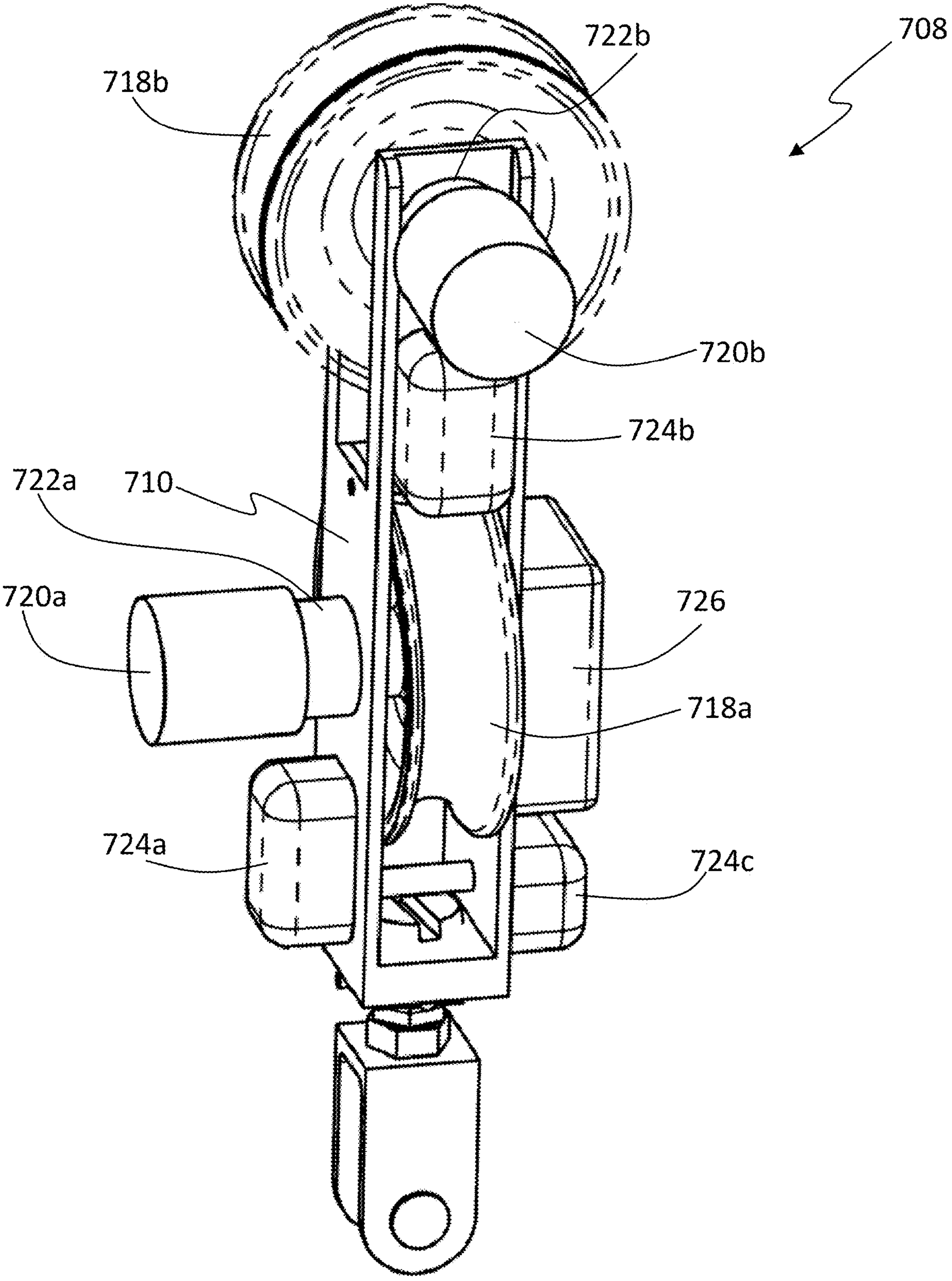
FIG. 7B is a schematic illustration of a stabilization system of the load lifting system of FIG. 7A.

For example, referring now to FIGS. 7A-7B, schematic illustrations of a load lifting system 700 in accordance with an embodiment of the present disclosure are shown. FIG. 7A illustrates the load lifting system 700 configured to attach to a load lifting structure and suspending a load therefrom. The load lifting system 700 of FIGS. 7A-7B is a 2-axis (702*a*, 702*b*) system using a suspension member redirect element 704*a*, 704*b* aligned with each axis 702*a*, 702*b*. A load may be connected to the load lifting system 700 through a load pendant (e.g., cable, wiring, roping, bands, rod, etc.) that is releasably attached to a cargo hook 706. In this embodiment, the cargo hook 706 is attached to the load lifting structure through a stabilization system 708. The stabilization system 708, in this embodiment, includes an active carriage assembly 710 that is configured to slide, run, or move along a suspension member 712 in a three-dimensional movement about the first and second axes 702*a*, 702*b*. The suspension member 712 is a cable, rope, belt, or the like and may have elastic properties (i.e., stretchable). The suspension member 712, in this embodiment, extends through four attach points from a first fixed connection 714*a*, through the carriage 710 to a first suspension member redirect element 704*a* of a first adjustable connection 716*a* along the first axis 702*a*, to a second suspension member redirect element 704*b* of a second adjustable connection 716*b*, through the carriage 710 again along the second axis 702*b* to a second fixed connection 714*b*.

In this non-limiting embodiment, the carriage 710 of the stabilization system 708 includes a first guide element 718*a* and a second guide element 718*b* which are configured to move along the suspension member 712. FIG. 7B illustrates an enlarged view of the stabilization system 708. As noted, the stabilization system 708 is an active system. To achieve the active nature, in this non-limiting embodiment, the guide elements 718*a*, 718*b* may be driven elements, such as by a motor or the like. For example, as shown in FIG. 7B, the first guide element 718*a* may be operably connected to a first carriage motor 720*a* through a first clutch 722*a*, with the first carriage motor 720*a* receiving power from a first power supply 724*a*. Similarly, the second guide element 718*b* may be operably connected to a second carriage motor 720*b* through a second clutch 722*b*, with the second carriage motor 720*b* receiving power from a second power supply 724*b*. The carriage motors 720*a*, 720*b* may be operationally driven and controlled by a carriage controller 726 which may be powered from a respective third power supply 724*c*. It will be appreciated that the number and position of the power supplies 724*a-c* may be varied based on the specific configuration of the stabilization system 708 and/or of the load lifting system 700. For example, in some embodiments, a single power supply may be used to power the various electrical/electronic components of the stabilization system 708.

In operation, the carriage motors 720*a*, 720*b* drive rotation of the guide elements 718*a*, 718*b*. As such, the carriage 710 may be actively moved along the suspension member 712 along either axis 702*a*, 702*b* or a combination thereof (i.e., in a non-axial direction along the axes 702*a*, 702*b*). The clutches 722*a*, 722*b* enable controlled rotation and can enable a gearing system to be implemented to ensure a desired torque is applied to the guide elements 718*a*, 718*b* such that the position of the carriage 710 can be controlled. Further, the carriage motors 720*a*, 720*b* and/or clutches 722*a*, 722*b* can include one or more sensors that are configured to provide a pendulum angular position, velocity, acceleration, and carriage attitude information. The sensors may be embedded within the various components/elements, and may include angular and/or linear sensors, encoders, inductive sensors, optical sensors, gyroscopes, etc., as will be appreciated by those of skill in the art.

The active stabilization system 708 illustrated in FIGS. 7A-7B enables additional controlled positioning of the carriage relative to a load lifting structure to damp, minimize, or eliminate adverse swinging or oscillations of a load. For example, the carriage controller 726 may be a controller that ensures that the carriage 710 stays slightly ahead of pendulum motions of a load pendant by sensing accelerations of the carriage 710 induced by the swing of a load suspended therefrom. By driving the motors 720*a*, 720*b* in proportion and in response to sensed changes in acceleration, the carriage controller 726 can control the amount of load swing and corresponding potential energy stored in an angular rotation of the load relative to the carriage 710. As such, pendulum motions may be eliminated or significantly reduced by translating those motions into translational motion along the suspension member 712. The carriage controller 726 can then provide varying electrical current to the motors 720*a*, 720*b* to add measured or predetermined resistance to the motors 720*a*, 720*b* to slow the translational motion without inducing angular pendulum type motions of the load. For example, if the carriage 710 starts to swing along the first axis 702*a*, the carriage controller 726 may prompt operation of the first carriage motor 720*a* to drive rotation of the first guide element 718*a* in the same direction of motion to keep the load pendant from establishing any angular momentum (i.e. pendulum motion), and keep the motion mostly translational along the suspension member 712, and gradually slow the translation by providing counteracting torque to the motor 720*a* and the guide element 718*a*. Such control may include operation of both the first and second carriage motors 720*a*, 720*b* simultaneously due to the three dimensional nature of the motion of the carriage 710 during use.

Figure 8A:
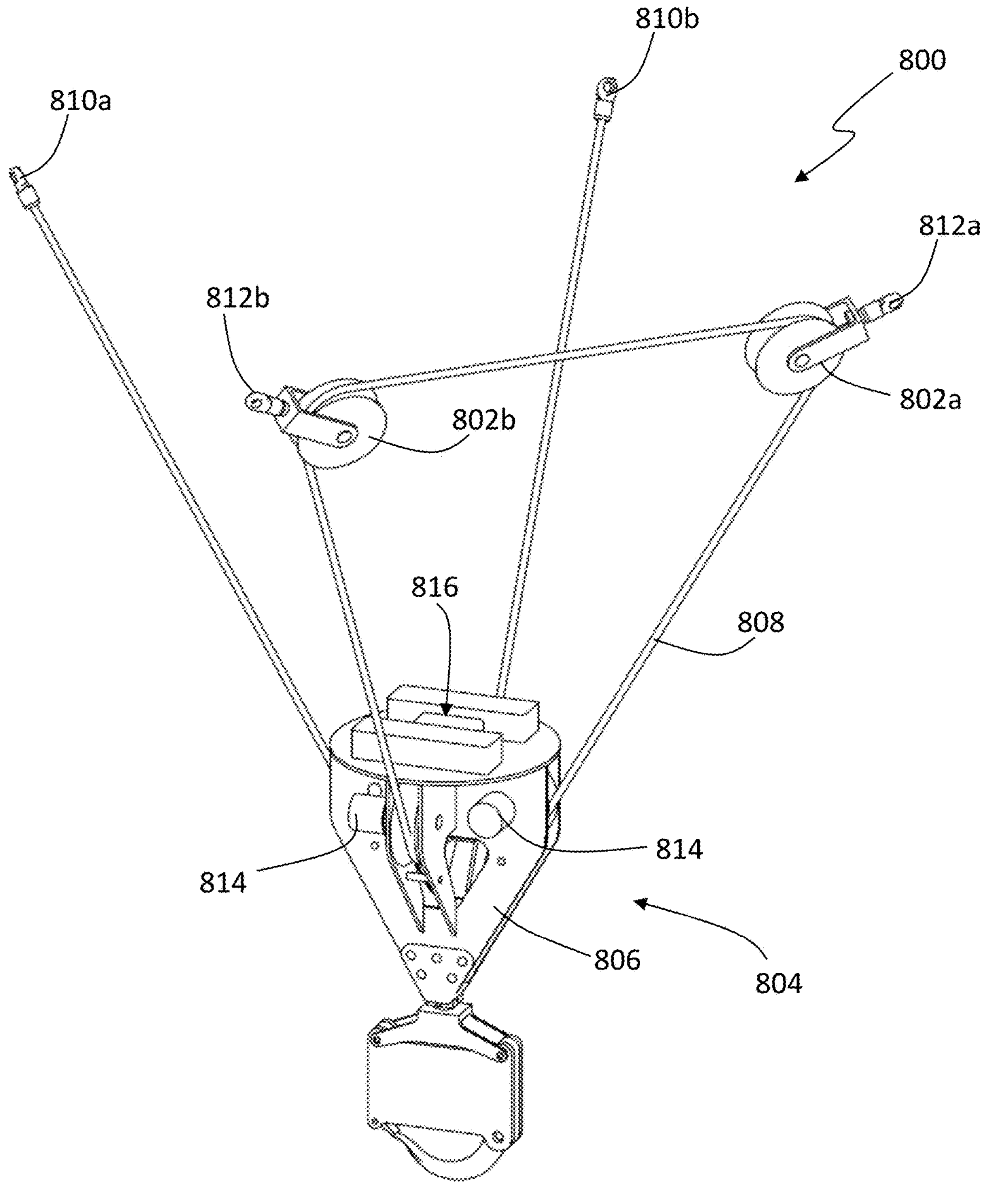
FIG. 8A is a schematic illustration of a load lifting system in accordance with an embodiment of the present disclosure.
Figure 8B:
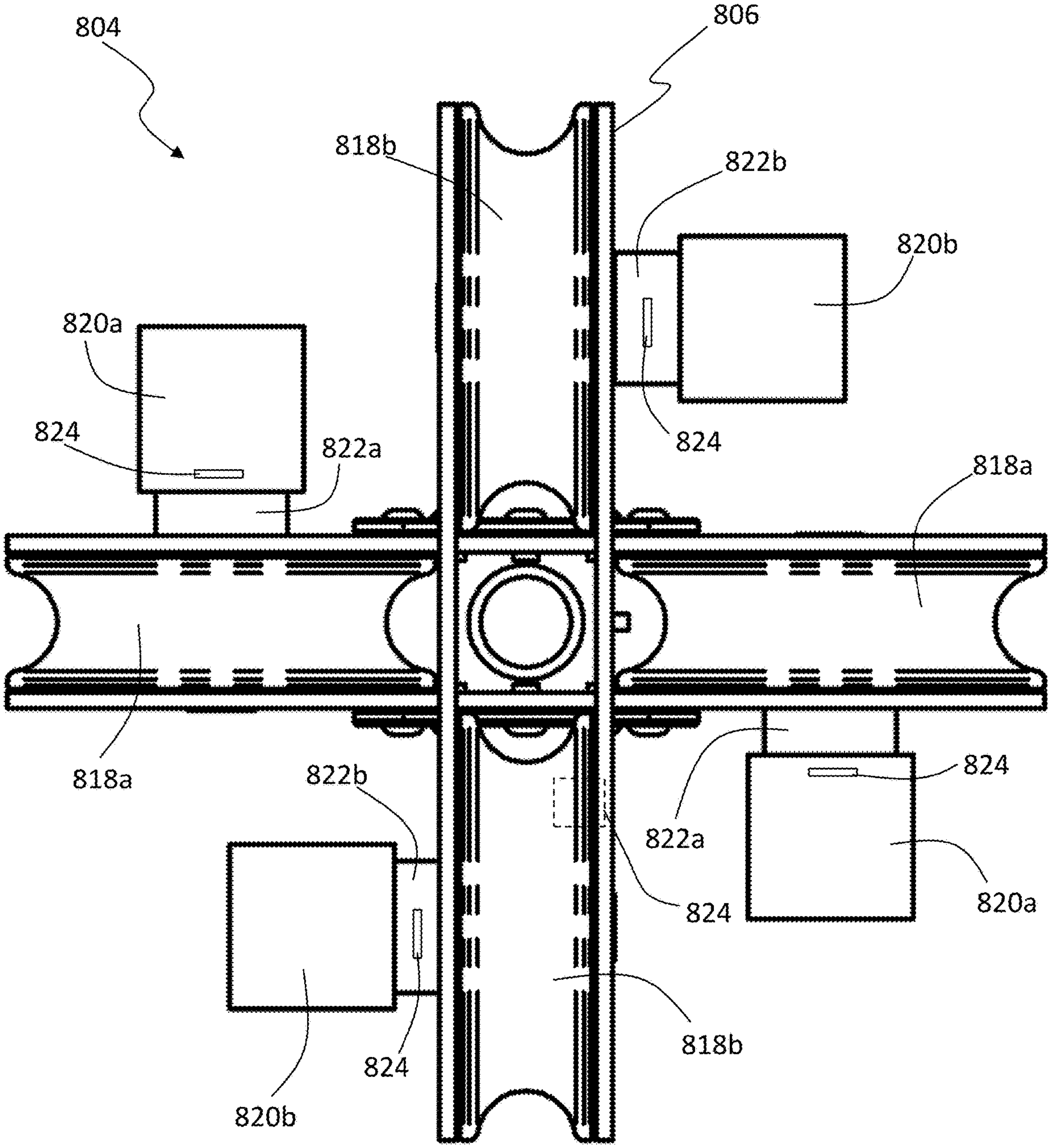
FIG. 8B is a schematic illustration of a carriage of the load lifting system of FIG. 8A.

Referring now to FIGS. 8A-8B, schematic illustrations of a load lifting system 800 in accordance with an embodiment of the present disclosure are shown. The load lifting system 800 is configured to attach to a load lifting structure and suspend a load therefrom. The load lifting system 800 is a 2-axis system using a suspension member redirect element 802*a*, 802*b* aligned with each axis, as described above. A load may be connected to a stabilization system 804 of the load lifting system 800 through a load pendant that is releasably attached to a cargo hook that is attached to a carriage 806. The stabilization system 804, in this embodiment, includes an active carriage assembly that is configured to slide, run, or move along a suspension member 808 in a three-dimensional movement about two axes. The suspension member 808, in this embodiment, extends through four attach points from a first fixed connection 810*a*, through the carriage 806 to a first suspension member redirect element 802*a* of a first adjustable connection 812*a* along a first axis, to a second suspension member redirect element 802*b* of a second adjustable connection 812*b*, through the carriage 806 again along a second axis to a second fixed connection 810*b*.

The carriage 806 can include one or more guide elements that are actively driven, similar to that described with respect to FIGS. 7A-7B. The illustrative configuration in FIG. 8 has a different geometry and arrangement of components but operates substantially similar to that shown and described above. In this configuration, the carriage 806 includes two sets of guide elements, such as rollers or the like, with each roller driven by a respective carriage motor 814 (see, e.g., load lifting system 400 of FIG. 4, illustrating a similar carriage arrangement with passive guide elements). Similar to the embodiment of FIG. 7, the stabilization system 804 is an active system and can include an electronics package 816, which can include one or more power supplies, sensors, control electronics, and the like.

FIG. 8B illustrates a schematic illustration of the carriage 806 of the stabilization system 804 in more detail. The carriage 806 includes two sets or pairs of guide elements. As shown, a first pair of guide elements 818*a* are arranged along a first axis and a second pair of guide elements 818*b* are arranged along a second axis that is orthogonal to the first axis. Each of the guide elements 818*a*, 818*b* may be rotationally controlled or driven by respective carriage motors 820*a*, 820*b* which are coupled to the respective guide elements 818*a*, 818*b* through respective clutches 822*a*, 822*b*. The carriage motors 820*a*, 820*b* and/or the respective clutches 822*a*, 822*b* can include respective position and/or movement/motion sensors, such as encoders, accelerometers, gyroscopes, etc., as will be appreciated by those of skill in the art. Such sensors, clutches, and/or carriage motors may be operationally coupled to the electronics package 816 (e.g., for power, sensing, control, and/or data communication). Various locations of such sensors are indicated at position(s) 824. In some embodiments, the sensors may be integrated directly into the carriage motors, clutches, and/or guide elements, and/or be contained within the electronics package 816.

Figure 9:
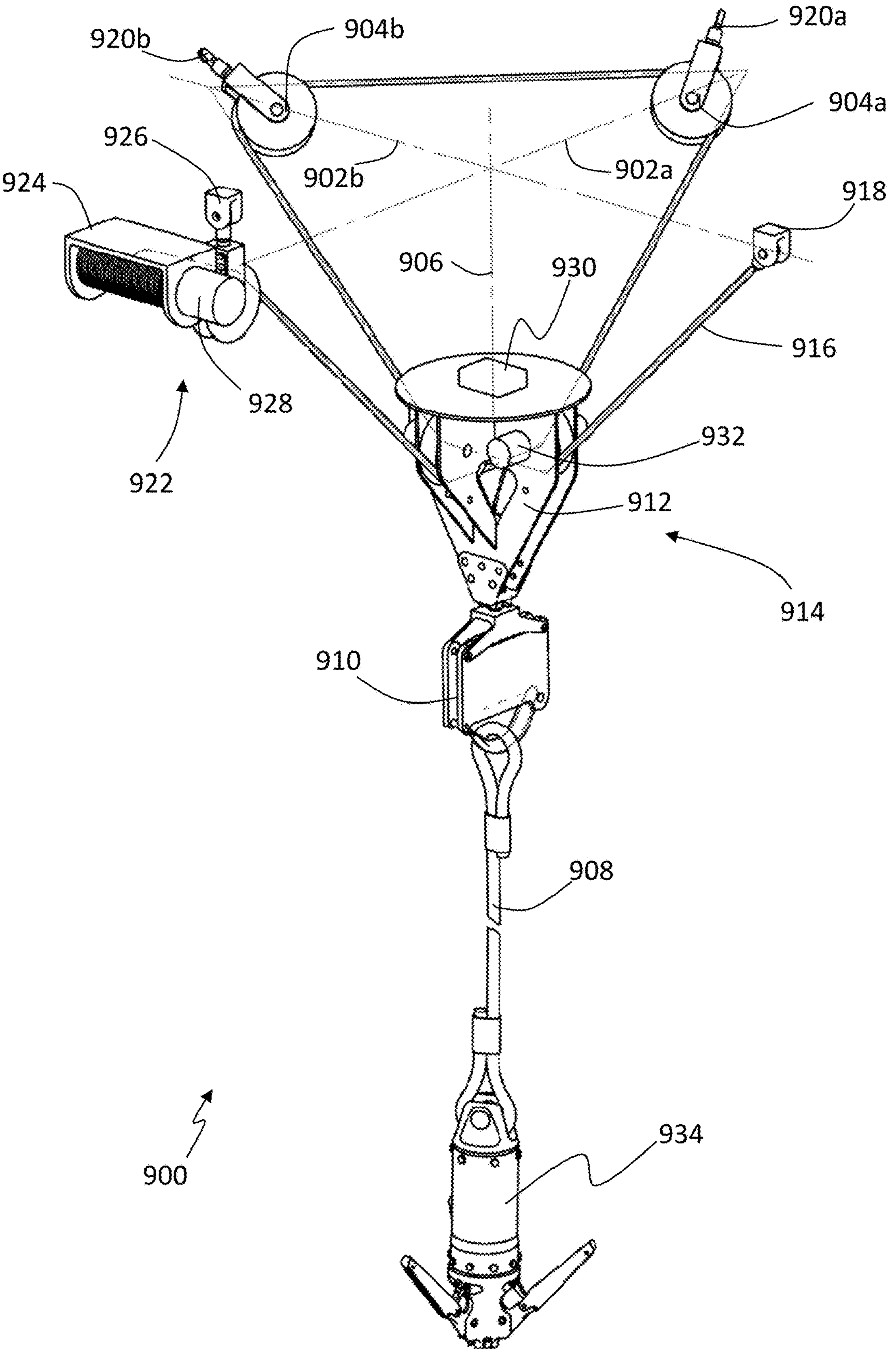
FIG. 9 is a schematic illustration of a load lifting system in accordance with an embodiment of the present disclosure.

Referring now to FIG. 9, a schematic illustration of a load lifting system 900 in accordance with an embodiment of the present disclosure is shown. The load lifting system 900 is attached to a load lifting structure and configured to suspend a load therefrom (load lifting structure and load not shown for clarity). The load lifting system 900 of FIG. 9 is a 2-axis (902*a*, 902*b*) system using a suspension member redirect element 904*a*, 904*b* aligned with each axis 902*a*, 902*b*. In this embodiment, an intersection of a first axis 902*a* with a second axis 902*b* intersects with a gravitational vertical 906. A load pendant 908 (e.g., cable, wiring, roping, bands, rod, etc.) is releasably suspended or attached to a cargo hook 910, which in turn is attached to a carriage 912 of a stabilization system 914. The stabilization system 914, in this embodiment, includes the carriage 912 that is configured to slide, run, or move along a suspension member 916 in a three-dimensional movement about the first and second axes 902*a*, 902*b*.

In this non-limiting embodiment, the carriage 912 includes a first set of guide elements and a second set of guide elements that provide rolling engagement with and movement along the suspension member 916. In this embodiment, the suspension member 916 is supported on the load lifting structure at four distinct locations. As shown in FIG. 9, the attachment of the stabilization system 914 to the load lifting structure by the suspension member 916 has four attach points including a fixed connection 918, two adjustable connections 920*a*, 920*b*, and a hoist connection 922. The suspension member redirect elements 904*a*, 904*b* are provided at the adjustable connections 920*a*, 920*b* to enable a sliding or adjustable engagement of the suspension member 916 between the load and the load lifting structure. The hoist connection 922 includes a spool 924 and a suspension member guide 926. A portion, section, or length of the suspension member 916 may be wound about the spool 924 to allow for additional length of the suspension member 916 to be included (i.e., not a fixed length suspension member). As such, the length of the suspension member 916 may be adjustable within the load lifting system 900.

In the embodiment of FIG. 9, the stabilization system 914 includes a motorized or controlled carriage 912 with a motorized hoist connection 922 that enables extension and retraction of the suspension member 916 on which the carriage 912 rides. A hoist motor controller 928 that is part of the hoist connection 922 is provided to operably control the spool 924 to extend or retract lengths of the suspension member 916. Additionally, the carriage 912 includes an electronics package 930 and a set of motorized controllers 932 operably connected thereto. The motorized controllers 932 may include a motor, clutch, and sensor(s) similar to the configurations described above. As such, a fully motorized and driven configuration (of both carriage and suspension member) may be provided in accordance with some embodiments of the present disclosure.

In this embodiment, the load lifting system 900 includes a controllable capture device 934. The controllable capture device 934 may be controllable by an operator or may be configured for automatic capture and engagement with a load. Such controllable capture devices are described in commonly owned U.S. Pat. No. 9,132,995, entitled Apparatus, System and Method for Controllable Grappling Hook, issued Sep. 15, 2015, and U.S. Pat. No. 9,758,353, entitled Wireless Controllable Carousel Independently Releasable Grappling Hooks, issued Sep. 12, 2017, the contents of which are incorporated herein in their entireties. Although these two prior patents provide examples of such controllable capture devices, those of skill in the art will appreciate that other types of capture devices, controllable or not, may be employed without departing from the scope of the present disclosure.

As described above, the systems illustratively shown in FIGS. 7A-9 are directed to active stabilization systems. To provide for active load stabilization, carriage motor(s), clutch(es), control electronics, and power source(s) may be added to the load lifting systems. The carriage motors, in such embodiments, are configured to engage with the guide elements via the respective clutches. The control electronics may contain a MEMS (Micro-Electro-Mechanical System) sensor package that is configured to monitor the attitude, rate of change of attitude, and attitude acceleration on multiple axes. The axes of the sensors are configured to align with the axes of the system (e.g., axis defined by the suspension member and/or attach points). As the load swings away from vertical, the output signals from the sensors are fed into a controller (e.g., PID (Proportional-Integral-Derivative) controller) which provides the motors with corrective action to drive the sensor outputs toward zero, thus creating a constant feedback loop to drive the load pendant angle with the vertical toward zero. The resultant motion of the load is driven toward a stable vertical position with the carriage constantly adjusting to zero out or cancel out any cable swing angle. By keeping the carriage ahead of the swing, very little pendulum energy is permitted to build up and thus a stable vertical cable angle can be maintained.

The clutch(es) allow the motors to disengage from the guides elements and permit a free-running system during periods where active stabilization is not required. Such periods may be determined by an operator or software (e.g., automatically) that relies on additional inputs such as vehicle speed, ambient wind speeds, proximity detectors configured to detect things near the load, etc. For example, when a helicopter is traveling from one place to another, such as in a flight from point A to point B, active load stabilization is not required due to steady state flight conditions. The clutch(es) may then be activated to engage with the guide elements to allow for controlled or active damping of swing/oscillations when the load is close to a dropping destination or the like. In some configurations, the clutch(es) can remain engaged, and the system can be switched from active to passive mode to allow the motors to act as generators and recharge the power supplies (e.g., batteries) when it is not critical to actively control the swing of the load.

Figure 10:
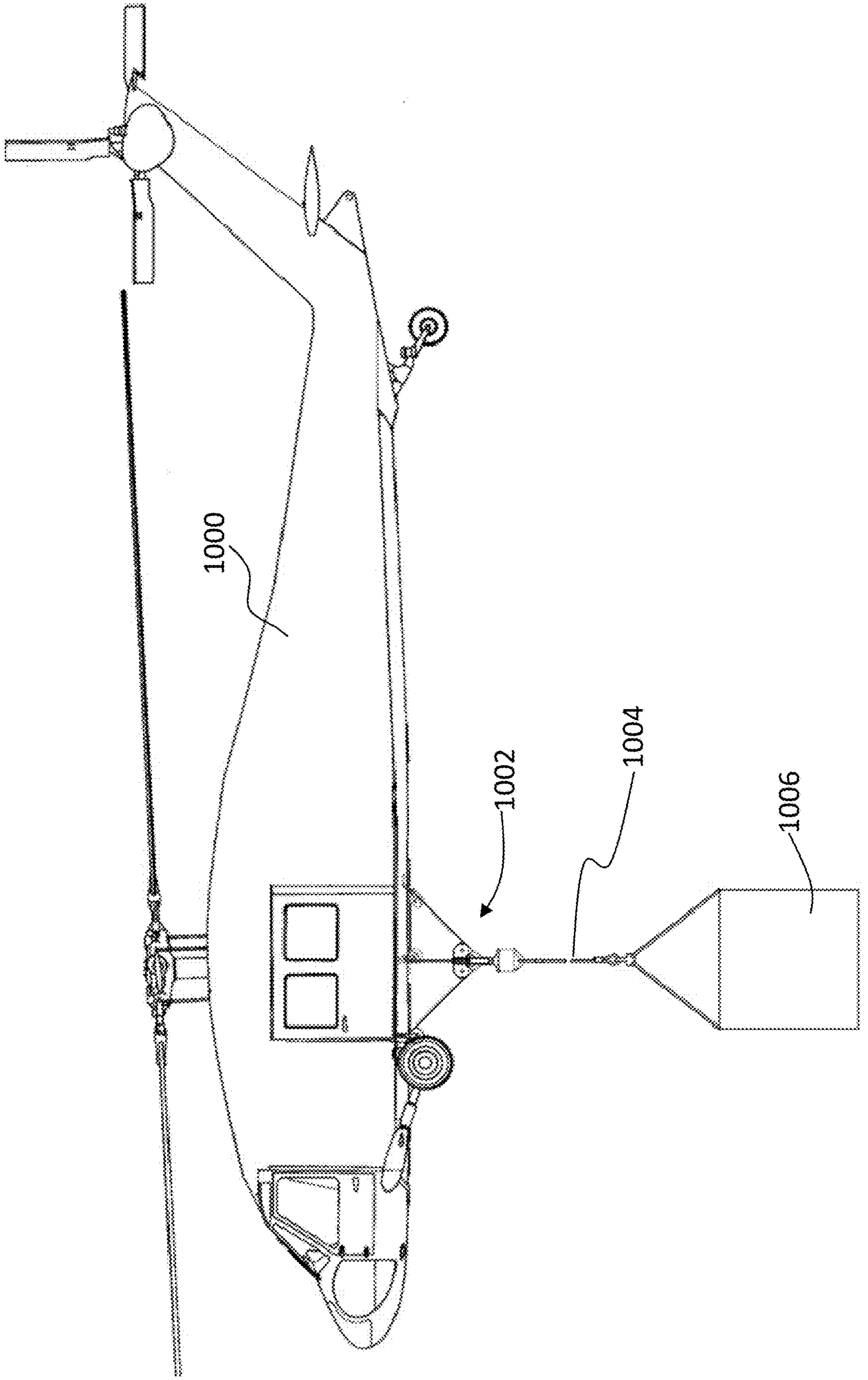
FIG. 10 is a schematic illustration of a load lifting system in accordance with an embodiment of the present disclosure as installed on an aircraft.

Turning now to FIG. 10, a schematic illustration of an aircraft 1000 having a load lifting system 1002 installed thereon, in accordance with an embodiment of the present disclosure, is shown. The aircraft 1000, in this illustration, is a helicopter. However, it will be appreciated that other aircraft, such as fixed wing craft, drones, unmanned vehicles, and the like may be configured with load lifting systems as described herein. The aircraft 1000 is a load lifting structure, and in this case, the fuselage of the aircraft 1000 operates as the load lifting structure. The load lifting system 1002 is installed to a bottom of the aircraft 1000. A load pendant 1004 is suspended from the load lifting system 1002, and in this embodiment, a load 1006 is suspended from the load pendant. The load lifting system 1002 may be an active or passive system, and in this configuration is illustrated as a 2-axis system. The load lifting system 1002 may be configured and arranged as one of the above described embodiments or variation thereon.

Figure 11A:
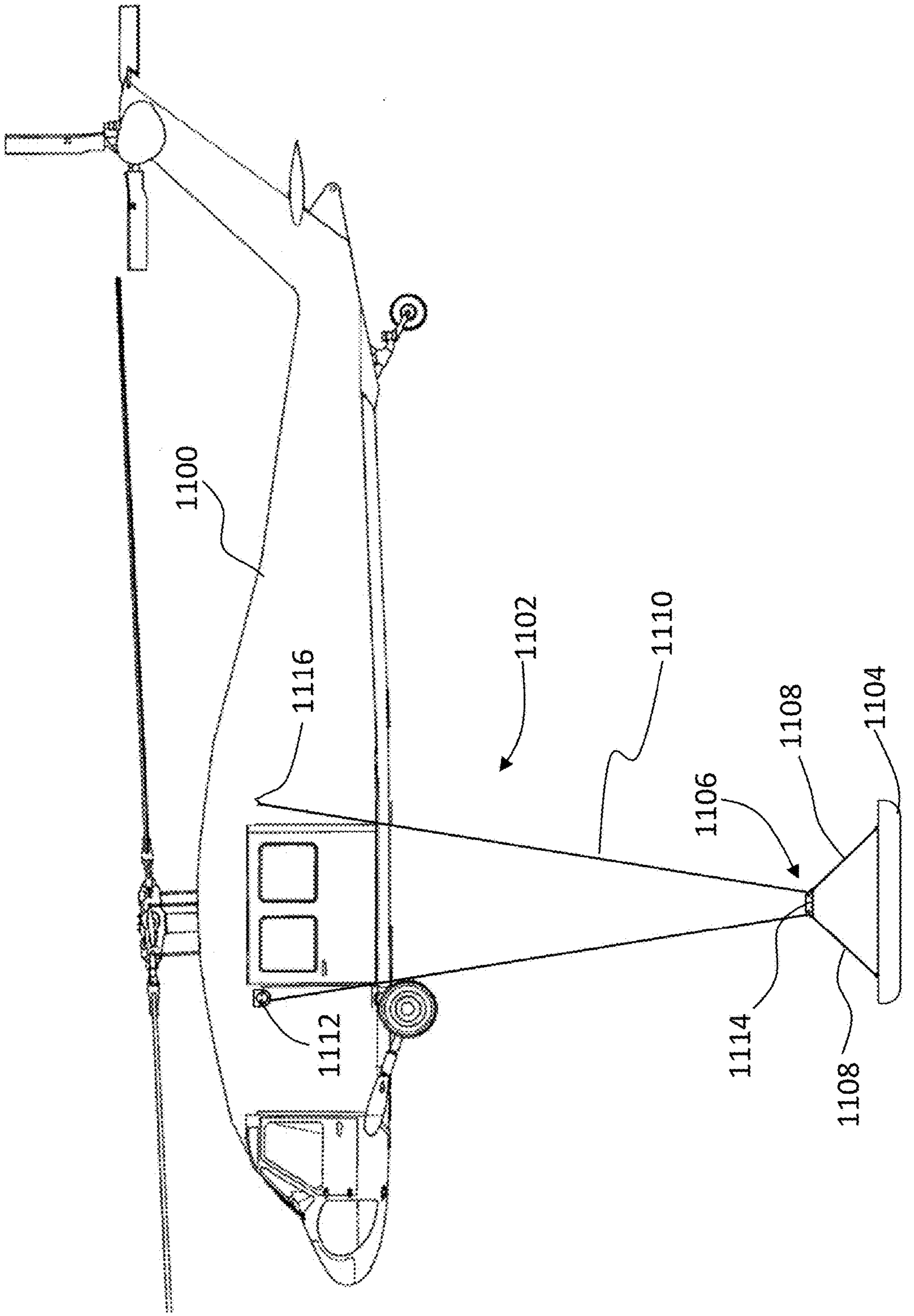
FIG. 11A is a schematic illustration of a load lifting system in accordance with an embodiment of the present disclosure as installed on an aircraft.
Figure 11C:
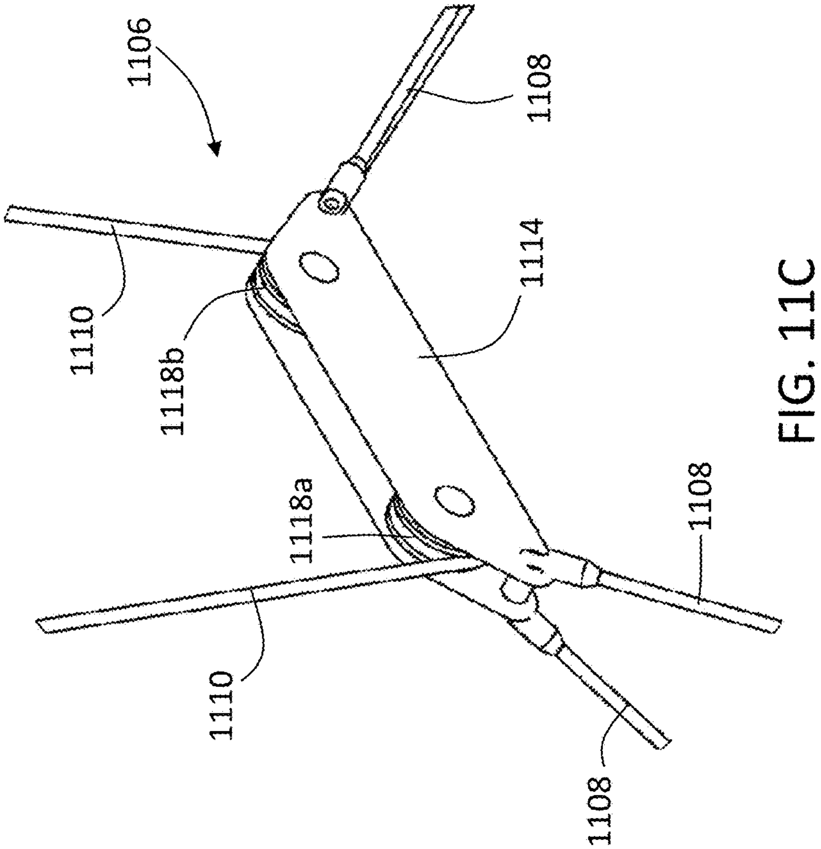
FIG. 11C is an enlarged schematic illustration of a portion of the load lifting system of FIG. 11A.
Figure 11B:
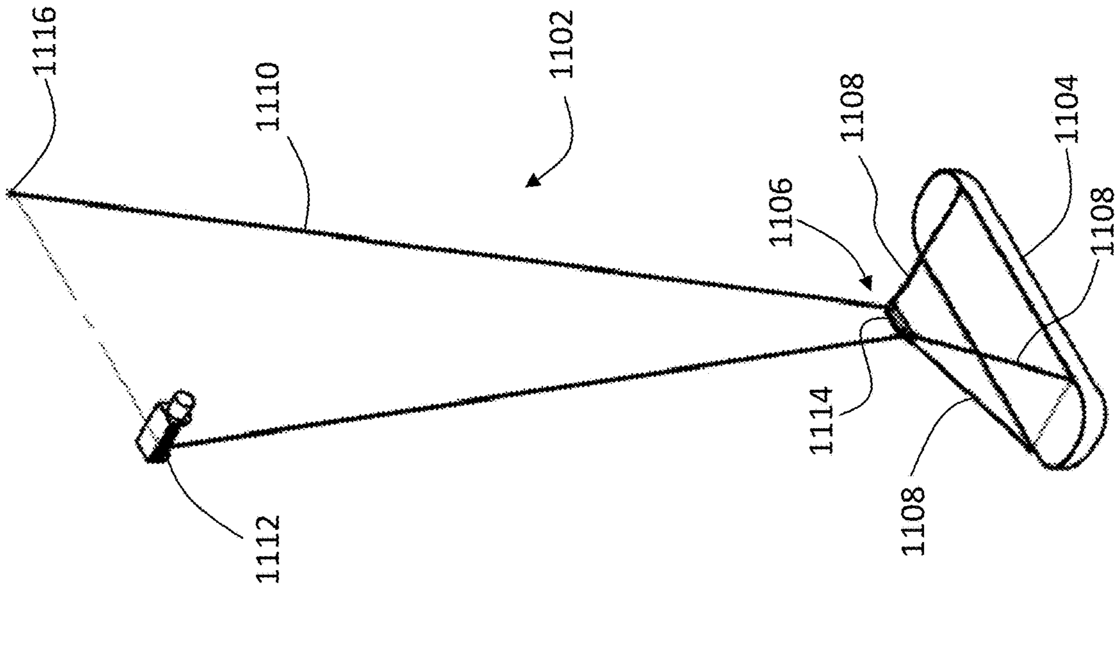
FIG. 11B is an enlarged schematic illustration of the load lifting system of FIG. 11A.

Referring now to FIGS. 11A-11C, schematic illustrations of an aircraft 1100 having a load lifting system 1102 installed thereon, in accordance with an embodiment of the present disclosure, are shown. The aircraft 1100 is a load lifting structure, and in this case, the fuselage of the aircraft 1100 operates as the load lifting structure. The load lifting system 1102 is installed, in this embodiment, to a side of the aircraft 1100. In this configuration, a load 1104 is suspended from the aircraft 1100 by a stabilization system 1106 of the load lifting system 1102. In this case, the load 1104 is a litter for carrying a person (e.g., for emergency transport). The load 1104 is connected to the stabilization system 1106 by one or more load pendants 1108. The stabilization system 1106 includes a suspension member 1110 that connects to the aircraft 1100 at two points (i.e., a single axis configuration). As shown, the suspension member 1110 connects to the aircraft 1100 at two attach points including a first connection 1112, extends through a carriage 1114 of the stabilization system 1106, and back to a second connection 1116. The first connection 1112 may include a hoist, spool, or the like (e.g., similar to hoist connection 424 of FIG. 4) and the second connection 1116 may be a fixed or latching type connection.

As shown in FIG. 11C, the stabilization system 1106 includes the carriage 1114 with the suspension member 1110 passing through first and second guide elements **1118*a*, 1118*b*. At rest and without any rotation, the two guide elements 1118*a-b* within the carriage 1114 are arranged along an axis that is parallel with the axis drawn between the first connection 1112 and the second connection 1116. The load pendants 1108 extend from the carriage 1114 to the load 1104 (i.e., the litter). Due to the adjustable length and multiple connection/contact points, the load lifting system 1102 may prevent undesirable rotation of the load 1104**, similar to that described above.

Figure 12:
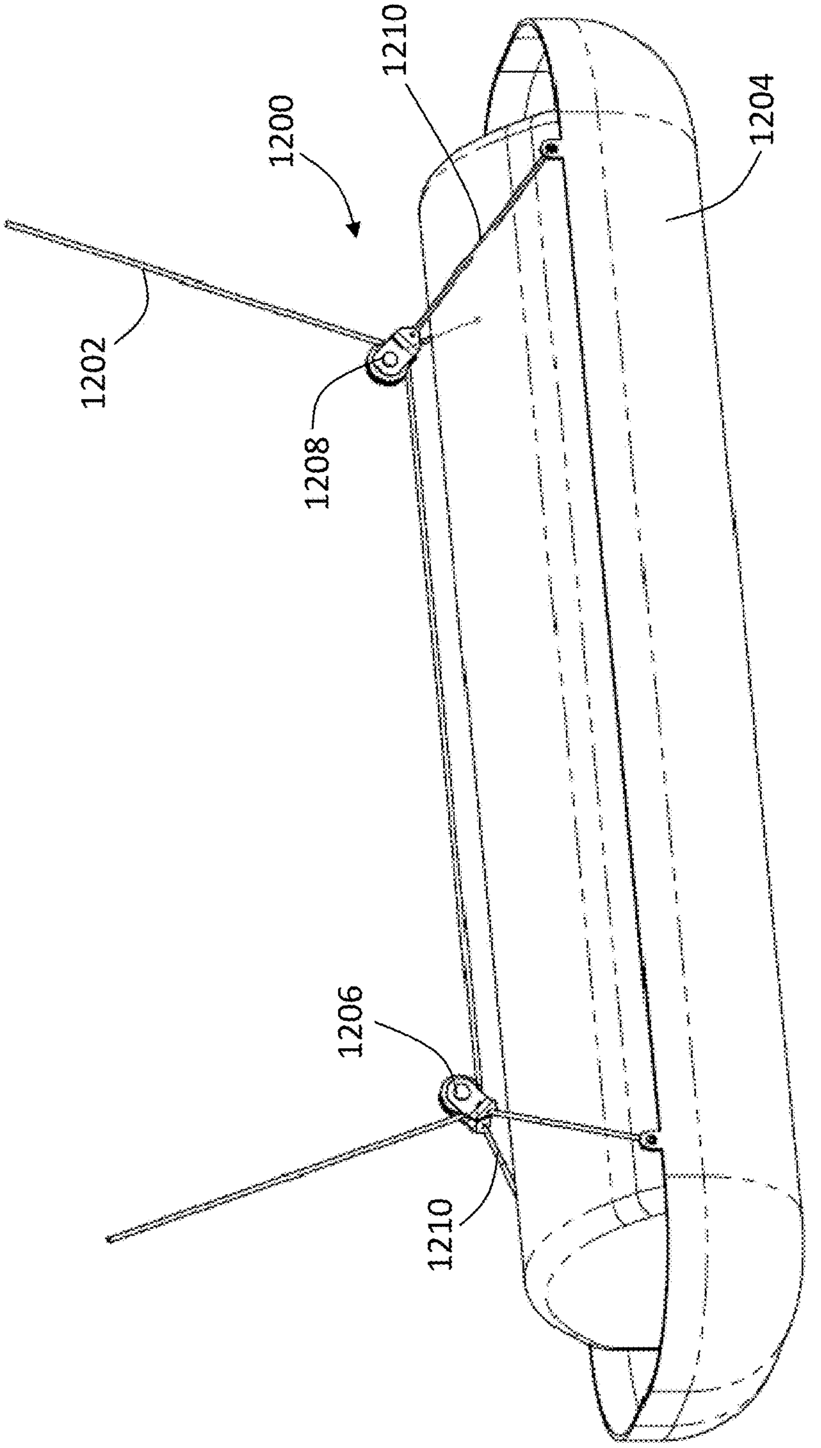
FIG. 12 is a schematic illustration of a portion of a load lifting system in accordance with an embodiment of the present disclosure.

FIG. 12 illustrates a similar system as that shown in FIGS. 11A-11C, but in this configuration of a stabilization system 1200, the carriage is part of the load or the load connection elements (e.g., load pendants). For example, as shown in FIG. 12, a suspension member 1202 is used to suspend a load 1204 from a load lifting structure. The suspension member 1202 is routed through a first guide element 1206 and a second guide element 1208 arranged along an axis (i.e., single axis configuration). The suspension member 1202 will extend to the load lifting structure and connect at two points (e.g., similar to suspension member 1110 shown in FIG. 11B). The guide elements 1206, 1208 are directly connected to the load pendants 1210. This configuration may provide advantages for rescue operation configurations, as shown, in that fewer components are used and the imposed single-axis is used to control (i.e., reduce) rotation and oscillation of the load 1204.

Figure 13:
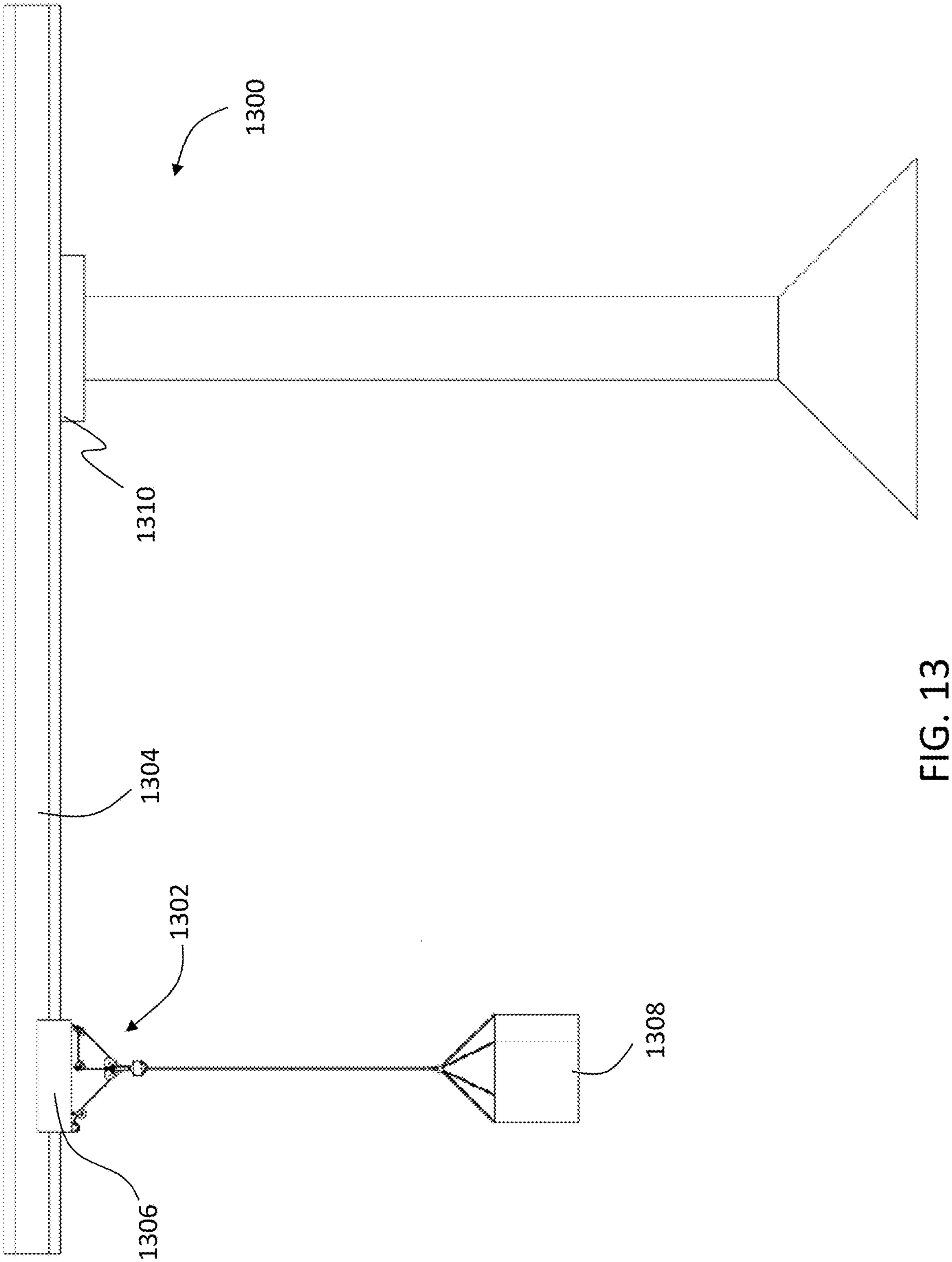
FIG. 13 is a schematic illustration of a load lifting system in accordance with an embodiment of the present disclosure as installed on a crane.

FIG. 13 illustrates a crane 1300 having a load lifting system 1302 installed thereon. The crane 1300 includes an arm 1304 with a trolley 1306 movable along the arm 1304. The load lifting system 1302 is attached to the trolley 1306. In this illustrative configuration, the load lifting system 1302 is a 2-axis system, although a single-axis system could be employed without departing from the scope of the present disclosure. The load lifting system 1302, as shown, supports a load 1308 therefrom. In this crane configuration, the load 1308 may be translated along the length of the arm 1304 and the load lifting system 1302 can provide anti-rotation and stability to the load 1308 during movement both along the arm 1304, vertically relative to the arm 1304, and as the arm rotates about a pivoting base 1310 of the crane 1300.

Although shown and described with respect to a helicopter and a crane, it will be appreciated that other configurations may employ embodiments disclosed herein. For example, in the realm of aircraft, fixed wing aircraft and rotary aircraft may be configured to use the systems described herein. Moreover, both manned and unmanned aircraft may take advantage of such systems. Additionally, static, stationary, or semi-static systems may incorporate the load lifting systems described herein. For example, cranes, as shown in FIG. 13, but also loads suspended from the top of buildings (e.g., window washing cages), from the side of watercraft (e.g., boats, ships, etc.), from trucks or the like. Such examples are not intended to be limiting, but rather provide examples of the versatility of the load lifting systems described herein.

Figure 14A:
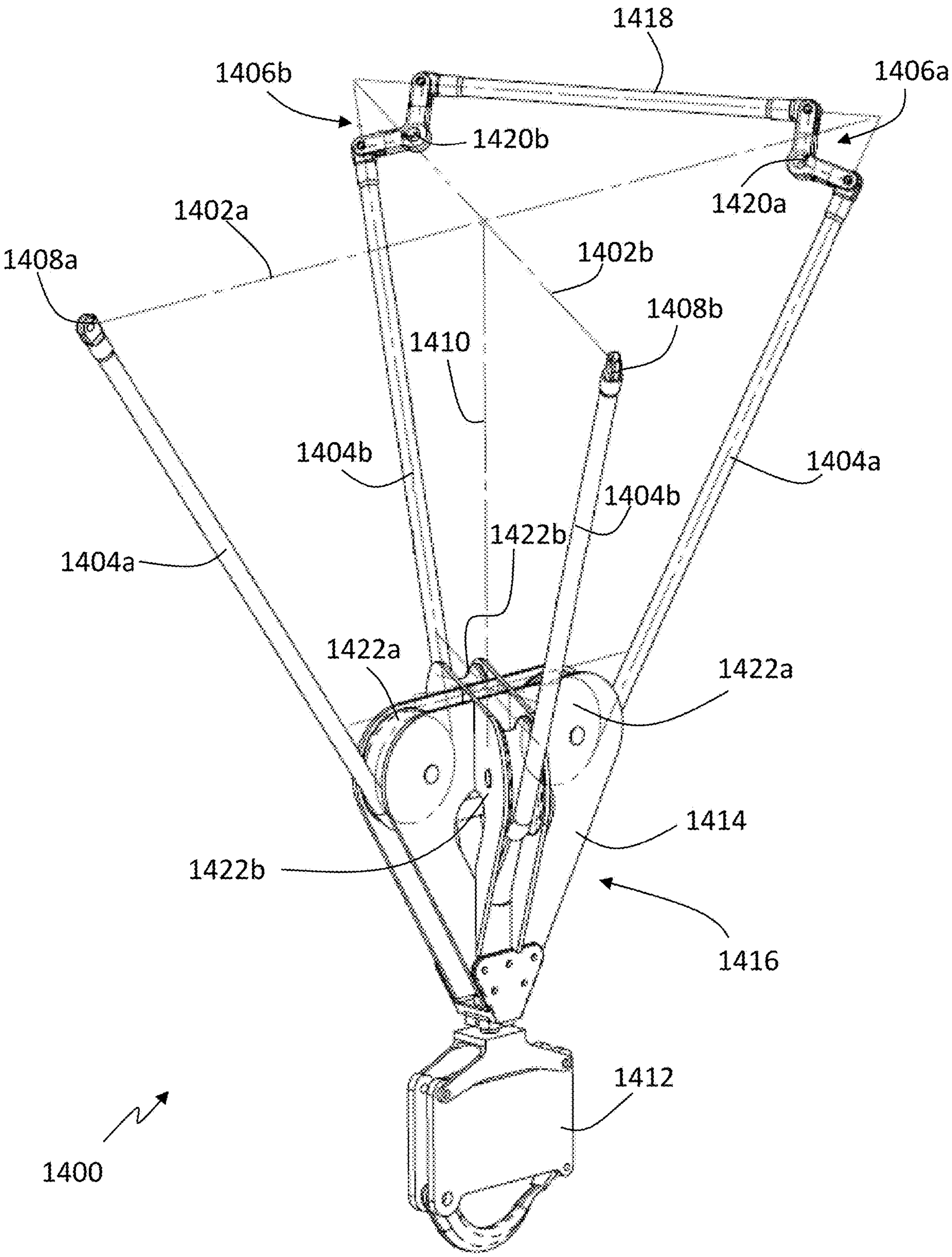
FIG. 14A is a schematic illustration of a load lifting system in accordance with an embodiment of the present disclosure.
Figure 14B:
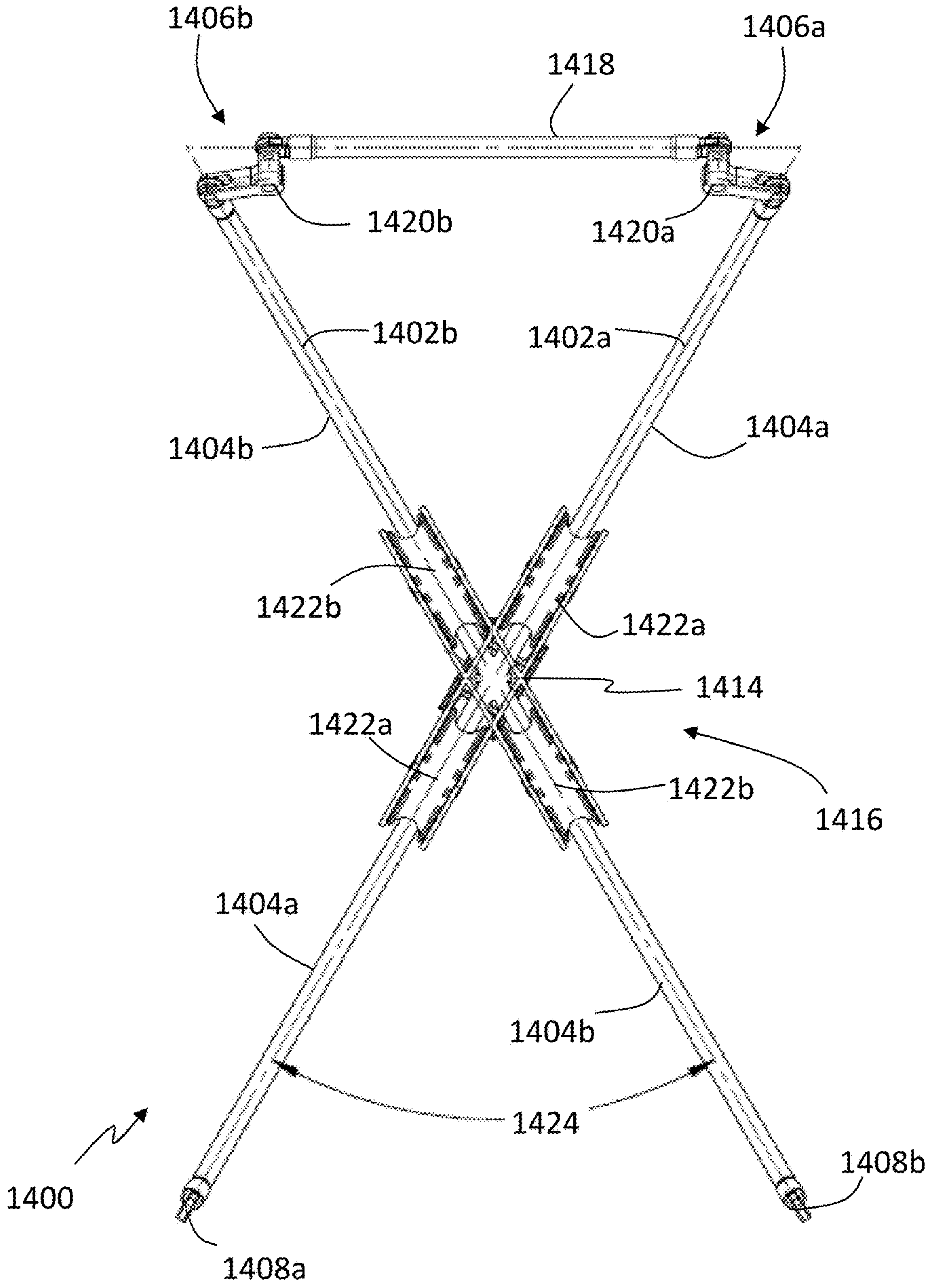
FIG. 14B is a top down plan view of the load lifting system of FIG. 14A.

Turning now to FIGS. 14A-14B, schematic illustrations of a load lifting system 1400 in accordance with an embodiment of the present disclosure are shown. The load lifting system 1400 is attachable to a load lifting structure and configured to suspend a load therefrom (load lifting structure and load not shown for clarity). The load lifting system 1400 of FIGS. 14A-14B is a 2-axis (**1402*a*, 1402*b*) system using two separate suspension members 1404*a*, 1404*b*. A first suspension member 1404*a* extends between two attach points along the first axis 1402*a*, when at rest, from a first adjustable connection 1406*a* to a first fixed connection 1408*a*. Similarly, a second suspension member 1404*b* extends between two attach points along the second axis 1402*b*, when at rest, from a second adjustable connection 1406*b* to a second fixed connection 1408*b*. In this embodiment, an intersection of the first axis 1402*a* with the second axis 1402*b* intersects with a gravitational vertical 1410. A cargo hook 1412 is attached to a carriage 1414 of a stabilization system 1416. The stabilization system 1416, in this embodiment, includes the carriage 1414 that is configured to slide, run, or move along the suspension members 1404*a*, 1404*b* in a three-dimensional movement about the first and second axes 1402*a*, 1402*b*** (e.g., a three-dimensional curvilinear path).

In this embodiment, as noted, the load lifting system 1400 includes separate or distinct suspension members **1404*a*, 1404*b* arranged along the two axes 1402*a*, 1402*b*. The two suspension members 1404*a*, 1404*b* are operably connected by an interconnect member 1418. Further, in this embodiment, each of the adjustable connections 1406*a*, 1406*b* are configured as a crank that is adjustable or rotatable about a respective crank pivot 1420*a*, 1420*b*. The crank pivots 1420*a*, 1420*b* provide for a fixed connection with a load lifting structure, with each crank rotatable about the respective crank pivot 1420*a*, 1420*b*. The interconnect member 1418 may be a fixed length rod or connector that is moved or translated as the adjustable connections 1406*a*, 1406*b* rotate about the respective crank pivots 1420*a*, 1420*b*. As the cranks of the adjustable connections 1406*a*, 1406*b* rotate about the crank pivots 1420*a*, 1420*b*, the respective suspension members 1404*a*, 1404*b* will be adjusted in length. As such, each individual suspension member 1404*a*, 1404*b* of this embodiment is individually adjustable in relative length to provide for the three-dimensional curvilinear path of the carriage 1414 and the cargo hook 1412** to provide stabilization thereto.

The illustrations of FIGS. 14A-14B also illustrate a non-perpendicular configuration for the load lifting system 1400. To achieve this, the carriage 1414 also has a non-perpendicular construction such that the suspension members **1404*a*, 1404*b* are aligned with the axes 1402*a*, 1402*b* and twisting of the suspension members 1404*a*, 1404*b* is avoided as they pass through the carriage 1414. Similar to the other embodiments described above, the carriage 1414 of the load lifting system 1400 has two guide elements 1422*a*, 1422*b* arranged along each axis 1402*a*, 1402*b* to movingly support the respective suspension members 1404*a*, 1404*b*. FIG. 14B illustrates a top down plan view of the load lifting system 1400. As shown, rather than a perpendicular or 90° configuration between the axes 1402*a*, 1402*b*, in this embodiment, the two axes 1402*a*, 1402*b* are arranged in a non-perpendicular configuration. An angle 1424 between the two axes 1402*a*, 1402*b* may be any non-perpendicular angle. In some embodiments, and for example only and without limitation, the angle 1424 may be any angle less than 90° (e.g., 15°, 30°, 45°, etc.). It is noted that the smaller the angle 1424**, the closer to a single axis configuration the load lifting system will become. However, based on limitations or constraints of the load lifting structure, the attach points, type of suspension member, specific application, etc., such a small angle with two axes may be employed without departing from the scope of the present disclosure.

It will be appreciated that the non-perpendicular axes and/or the crank-type adjustable connections may be employed and/or implemented with features of the other above described embodiments. More particularly, the non-perpendicular axis configuration is not inextricably linked to the crank-type configuration for the adjustable connections, and various other arrangements are possible without departing from the scope of the present disclosure. In operation, the cranks operate similar to the above described pulleys, except the cranks have limited travel range, and may reach a limit of rotation (e.g., an inherent "stop"). The purpose of the crank and the pulley is to allow the length of the suspension member (e.g., cables) to automatically adjust on both axes to keep the suspension member on each axis engaged in load sharing. As the carriage moves along one axis, the suspension member on the other axis would keep the carriage from following the "elliptical" path if the suspension members are not continuous and/or not connected by the cranks, depending on the particular configuration.

In the case of a crank-type configuration, the carriage would follow a circular path, the radius of which would be controlled by the suspension member on the other axis, if the suspension members are not connected via the cranks (i.e., if the lengths of the two suspension members were fixed). As the carriage wants to follow the elliptical path along one axis, the suspension member on the other axis must give some length to continuously extend an arc to meet the elliptical path of the other. This extra length of suspension member is provided by the elliptical path suspension member because the length along the elliptical path would go slack, meaning there would be no tension in it, and that is impossible because the suspension members are connected via the cranks. Thus, as the carriage travels along one axis of an elliptical path, that path (length of suspension member) is actually shortened because length is paid out to extend the arc of the other suspension member. The lengths of the suspension members can only be shared by as much as the radius of the crank arm and an angular travel of the crank (before it starts to want to wind up the suspension member around itself). In accordance with some embodiments, the crank(s) can be sized by making the arms of the cranks as long as a particular application requires.

It will be appreciated that combinations of cranks, pulleys, sliding surface structures and the like may be combined to achieve a desired stabilization. The combination of various intermixed features may be a result of the load lifting structure, specific applications, clearance, length of suspension member, etc. For example, cranks could be used to route the suspension member around obstructions. As such, a combination of cranks and pulleys could be used if a vehicle or other load lifting structure was so obstructed such that a straight run of suspension member (e.g., along the axes of the system) is not viable or possible.

Figure 15A:
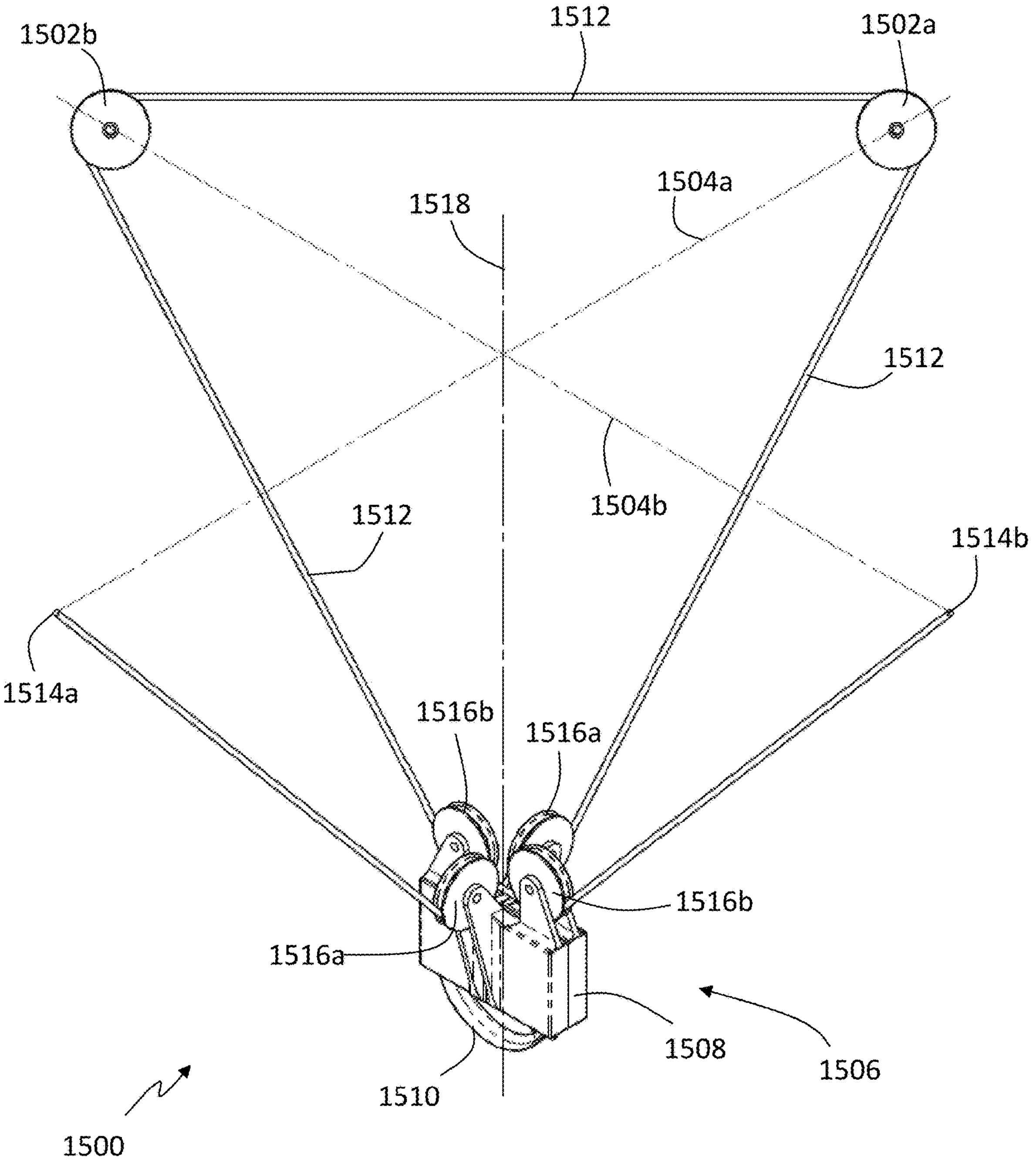
FIG. 15A is a schematic illustration of a load lifting system in accordance with an embodiment of the present disclosure.
Figure 15B:
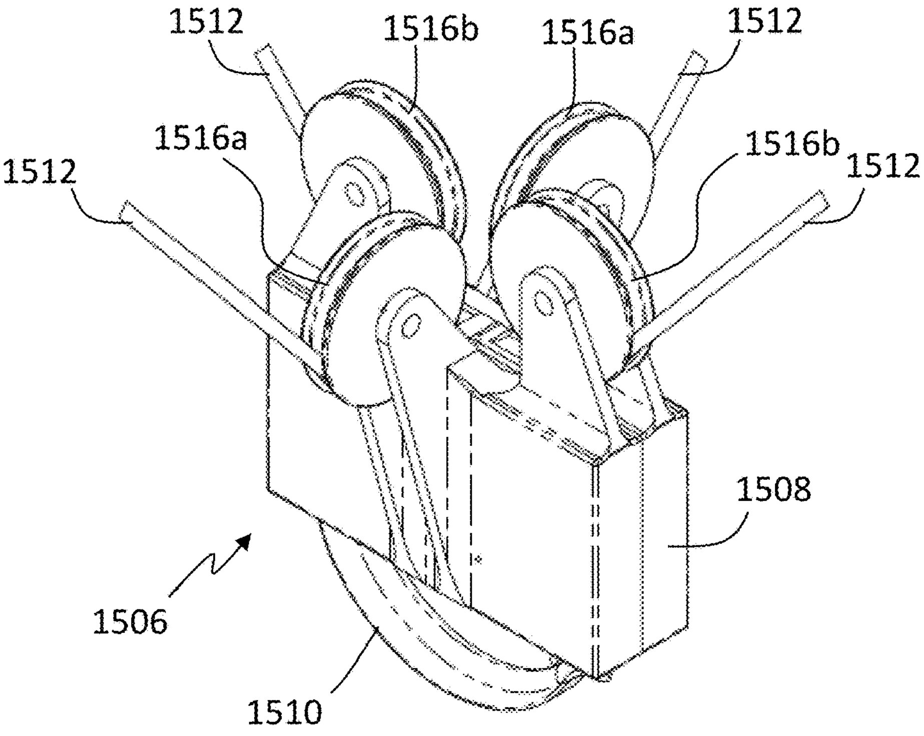
FIG. 15B is a schematic illustration of a portion of the load lifting system of FIG. 15A.
Figure 15C:
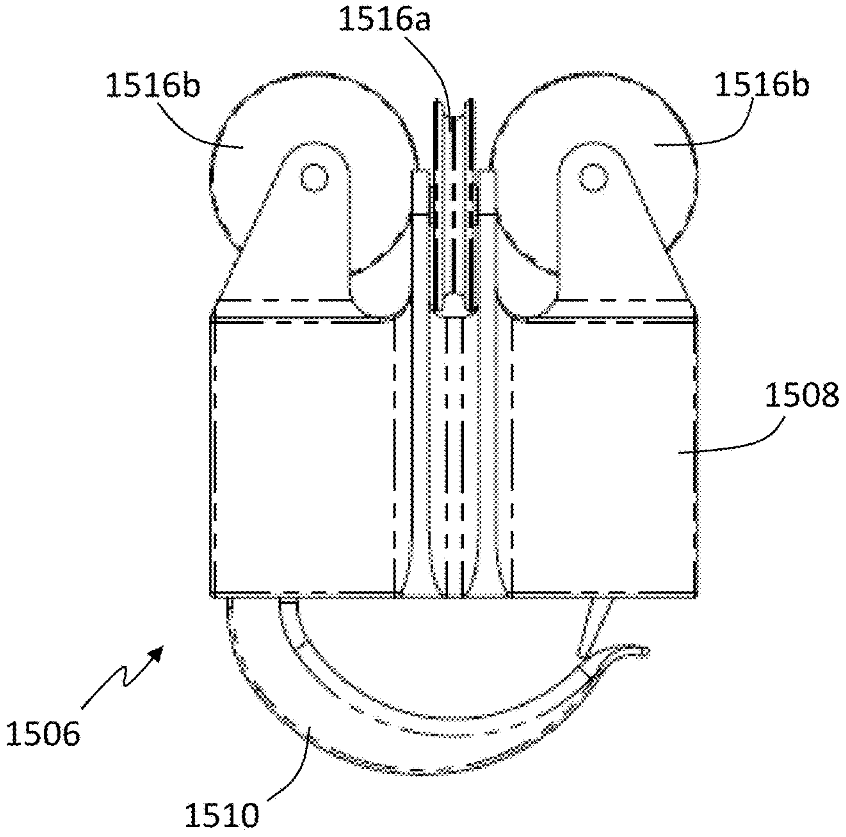
FIG. 15C is an elevation view of the carriage of the load lifting system shown in FIG. 15B.

Turning now to FIGS. 15A-15C, schematic illustrations of a load lifting system 1500 in accordance with an embodiment of the present disclosure are shown. The load lifting system 1500 is configured to attach to a load lifting structure and suspend a load therefrom. The load lifting system 1500 is a 2-axis system using a suspension member redirect element 1502*a*, 1502*b* aligned with each axis 1504*a*, 1504*b*, as described above. A load may be connected to a stabilization system 1506 of the load lifting system 1500. In this embodiment, the stabilization system 1506 includes a carriage 1508 having an integrated cargo hook 1510 attached, connected, or otherwise mounted to, on, or in the carriage 1508. The carriage 1508 is configured to slide, run, or move along a suspension member 1512 in a three-dimensional movement about the two axes 1504*a*, 1504*b* in a three-dimensional curvilinear path. The suspension member 1512, in this embodiment, extends between four attach points from a first fixed connection 1514*a*, through the carriage 1508 to the first suspension member redirect element 1502*a* of a first adjustable connection along the first axis 1504*a*, to the second suspension member redirect element 1502*b* of a second adjustable connection, through the carriage 1508 again along the second axis 1504*b* to a second fixed connection 1514*b*.

In this non-limiting embodiment, the carriage 1508 includes a first set of guide elements 1516*a* and a second set of guide elements 1516*b*. The suspension member 5112 is a cable, roping, belt, band, or the like that is attached to the load lifting structure through the attach points 1502*a*, 1502*b*, 1514*a*, 1514*b*. The carriage 1508 is movable along both the first axis 1504*a* and the second axis 1504*b* as the first and second sets of guide elements 1516*a*, 1516*b* are movable along the suspension member 1512. Because the suspension member 1512 is flexible and continuous from the first fixed connection 1514*a* to the second fixed connection 1514*b*, through the adjustable connections 1502*a*, 1502*b* and the guide elements 1516*a*, 1516*b* of the carriage 1508, the stabilization system 1506 is movable in three dimensions relative to a gravitational vertical 1518. The result is a non-circular, non-spherical movement path, such as a curvilinear path or a curved path having a continuously varying radius of curvature based on the attach points (e.g., connections at attach points 1502*a*, 1502*b*, 1514*a*, 1514*b*). The movement of the carriage may trace a curvilinear path whose line of action is above the attach points (e.g., connections at attach points 1502*a*, 1502*b*, 1514*a*, 1514*b*). The line of action may be a line normal to the curvilinear path as it traverses the suspension member 1512 with a focus above the attach points 1502*a*, 1502*b*, 1514*a*, 1514*b* (e.g., closer to a center of gravity of the system). Due to this quasi-ellipsoid movement path, the load vector focal point locations through the movement is closer to the center of gravity (or equivalent thereof) of the load lifting structure, and thus moments about the center of gravity will be naturally reduced, as previously described.

As noted, and as shown in FIGS. 15A-15C, the carriage 1508 may include the cargo hook 1510. In such embodiments, a pendant may be eliminated or at least not required (e.g., a pendant could be suspended from the cargo hook 1510). In this configuration, a load may be directly supported and attached at the carriage 1508 of the stabilization system 1506.

As described above, at rest, a carriage of any disclosed embodiment will generally be positioned below the center of gravity (or equivalent) of the load lifting structure. Further, as described, the movement of the carriage may traverse an elliptical or quasi-elliptical path or some other curved or curvilinear path. Such curvilinear paths, in some embodiments, may be defined as having a curved path having a continuously varying radius of curvature movement path. An axis of symmetry of the three-dimensional path shape may be defined, substantially, along the gravitational vertical. As such, in some embodiments, the disclosed and discussed gravitational vertical may also be referred to as the axis of symmetry of the system. The axis of symmetry aids in defining the normal to the curvature (e.g., normal to a tangent line from the curvature of the path). This normal line to the curvature intersects the axis of symmetry at a point above the axis (or plane) defined by the attach points. That is, the attach points of the disclosed systems will typically be arranged substantially in the same plane, and in a two-axis system, such two axes will define a plane. The normal line, in a direction from the curved path toward the load lifting structure, will intersect with this axis of symmetry at a point that is closer to the center of gravity (or equivalent thereof) than the plane defined by the attach points (e.g., as shown in FIG. 2B).

In addition to providing stabilization with respect to vibrations, oscillations, and the like, along the suspension members, some embodiments of the present disclosure may provide additional anti-rotation or anti-spin capability. Such anti-spin characteristics may be employed in single-axis or multi-axis embodiments of the present disclosure. For explanatory purposes, a single-axis configuration will be used to describe the spin (and anti-spin) characteristics of some embodiments of the present disclosure. In a single-axis arrangement, the suspension member may be prone to twisting upon itself if too much twisting force (e.g., rotor downwash or bumping into something to cause the load to want to spin) is present/applied. For example, in a litter configuration (e.g., FIGS. 11A-11C), the downwash from the rotors of the aircraft may generate a rotational force upon the litter when it is suspended below the aircraft. As applied, the configuration illustrated above will substantially prevent oscillations and the like along the axis of the system, and some amount of anti-rotation will be achieved. However, this anti-rotation may be improved upon in certain applications and configurations.

Figure 16:
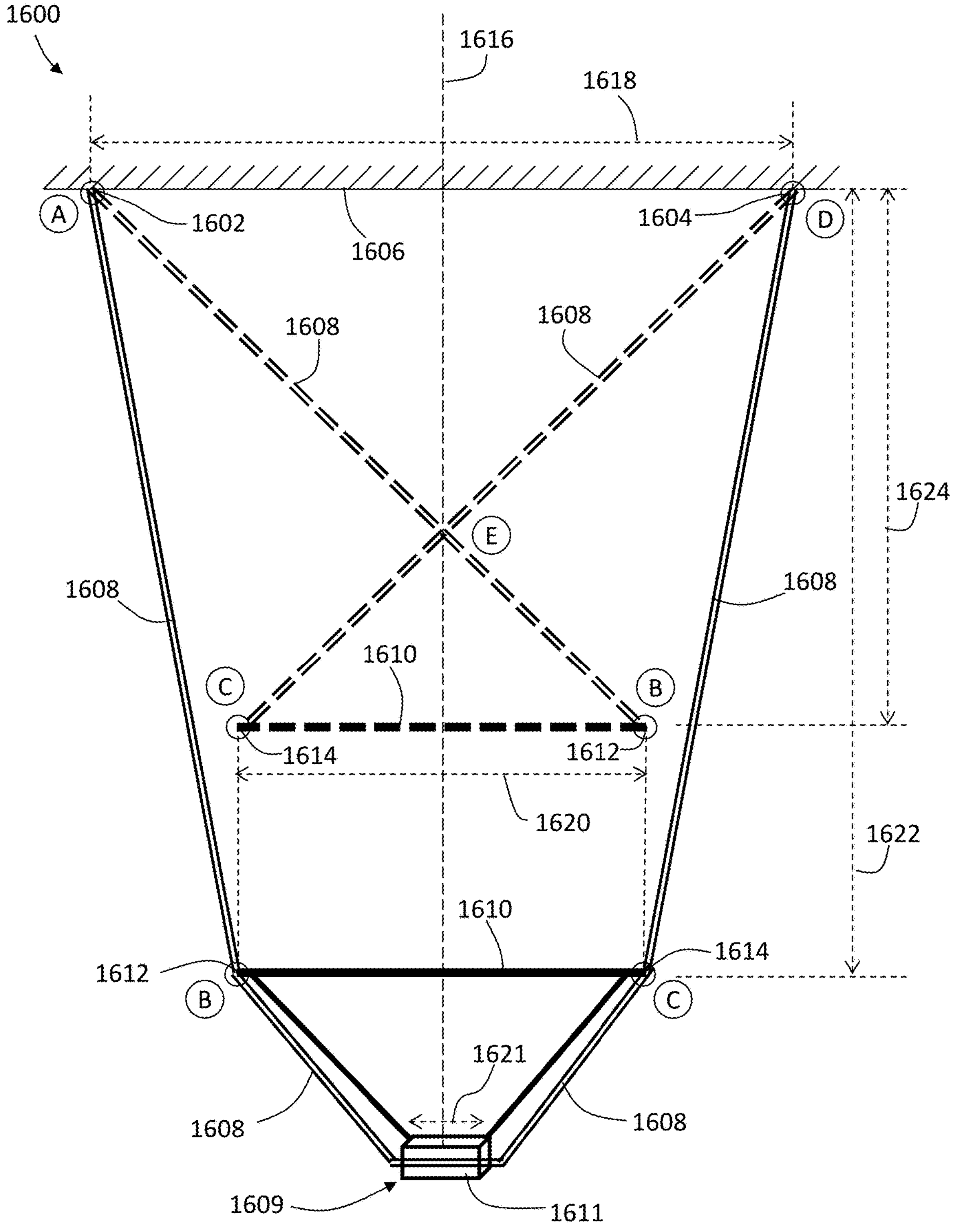
FIG. 16 is a schematic diagram of a load lifting system having an increased anti-rotation aspect in accordance with an embodiment of the present disclosure.

For example, referring now to FIG. 16, a schematic illustration of a portion of a load lifting system 1600 in accordance with an embodiment of the present disclosure is shown. The load lifting system 1600, in this illustrative configuration, is a single-axis system having two attach points 1602, 1604 on a load lifting structure 1606 with a suspension member 1608 extending therebetween. The suspension member 1608 is a fixed length, continuous suspension member that extends from a first attach point 1602 to a second attach point 1604 and a load may be suspended from a stabilization system 1609, using a carriage 1611 or the like as discussed above. In this illustration, the stabilization system 1609 provides both stabilization, as discussed above, through use of the carriage 1611 and includes additional rotation/anti-rotation functionality.

As shown, the suspension member 1608 engages with an anti-rotation element 1610 of the stabilization system 1609 at a first guide element 1612 and a second guide element 1614. The suspension member 1608 extends between the first guide element 1612 and the second guide element 1614 through the carriage 1611. In some embodiments, the first and second guide elements 1612, 1614 may include guide elements similar to that shown and described above as part of a carriage system. The anti-rotation element 1610 is part of the stabilization system 1609 and is fixedly connected to the carriage 1611. As such, the anti-rotation element 1610 defines an upper portion of the stabilization system 1609 and the carriage 1611 defines a lower portion of the stabilization system 1609. The anti-rotation element 1610 is a fixed length structure (e.g., a rod, beam, or the like) that is configured to extend parallel with an axis defined between the first attach point 1602 and the second attach point 1604 (e.g., in the plane of the page of FIG. 16).

The anti-rotation element 1610 is thus part of the stabilization system 1609 that is configured to ensure pendulum damping in a plane formed by the attach points 1602, 1604, the suspension member 1610, and the guide elements 1612, 1614 (e.g., plane of the page of FIG. 16). The anti-rotation element 1610 is configured to improve anti-spin characteristics about a vertical axis 1616 (e.g., coincident with a gravitational vertical in some configurations). As described herein, a horizontal length 1620 of the anti-rotation element 1610 (horizontal distance between first guide element 1612 and second guide element 1614) is defined to be longer than a horizontal length 1621 of the carriage 1611. The greater length 1620 of the anti-rotation element 1610 will improve anti-spin characteristics of the stabilization system 1609 while the shorter length 1621 of the carriage 1611 ensures the pendulum damping characteristics described above, and the elliptical movement path thereof.

As shown in FIG. 16, Points A and D represent the attach points of the suspension member 1608 to the load lifting structure 1606 and are aligned with the first and second attach points 1602, 1604, respectively. Points B and C represent points where the suspension member 1608 is guided about the anti-rotation element 1610 of the stabilization system 1609 (e.g., at guide elements at ends of the anti-rotation element 1610). As noted above, the suspension member 1608 has a fixed length extending from the first attach point 1602 (Point A) to the second attach point 1604 (Point D). The suspension member 1608 extends about the ends of the anti-rotation element 1610 at the guide elements 1612 (Point B), 1614 (Point C) and through the carriage 1611 therebetween.

A first path (Path A-B-C-D shown in solid line) represents the path of the suspension member 1608 in an untwisted state. A second path (Path A-B-C-D dashed line) represents the path of the same suspension member 1608 twisted 180 degrees about the vertical axis 1616. The second path (dashed line) does not include the lower portion of the stabilization system 1609 (e.g., a portion of the suspension member 1608 and the carriage 1611) for clarity of illustration. As shown, the first guide element contact 1612 (Point B) and the second guide element 1614 (Point C) have switched orientation relative to the attach points 1602 (Point A), 1604 (Point D) due to the twisting of the suspension member 1608 about the vertical axis 1616.

An attach point separation distance 1618 defines the fixed separation distance between the first attach point 1602 and the second attach point 1604 at the point where the suspension member 1608 attaches to the load lifting structure 1606. An upper guide element separation distance 1620 is a fixed separation distance between the first guide element 1612 and the second guide element 1614 and is substantially equal to the length of the anti-rotation element 1610. As shown, in the untwisted state (solid line), the anti-rotation element 1610 is positioned at a first vertical distance 1622 from the load lifting structure 1608. In contrast, in the twisted state (dashed line), the anti-rotation element 1610 is positioned at a second vertical distance 1624 from the load lifting structure 1608 that is different from the first vertical distance 1622. As illustrated, the second vertical distance 1624 is less than the first vertical distance 1622.

Because the suspension member 1608 is of fixed length, and the separations distances 1618, 1620 are fixed, it follows that the length of the solid-line path A-B-C-D (untwisted state) is equal to the length of the dashed-line path A-B-C-D (twisted state) in order for the fixed length of the suspension member 1608 to remain the same. As a result of the twisting of the suspension member 1608 about the vertical axis 1616, the first vertical distance 1622 must decrease from the untwisted state to the twisted state and result in the second vertical distance 1624. This is a result of the switch in position of Points B, C during the twist, where the lengths A-B, C-D in the untwisted state are the same as the lengths A-B, C-D in the twisted state, yet the position of Points B, C are horizontally further from the respective attach points A, B, and consequently vertically closer to the load lifting structure (in order for the lengths A-B and C-D to remain the same). This means that the stabilization system 1609 is lifted upward against gravity (i.e., toward the load lifting structure 1606) during a twist event. It will be appreciated that the greater the guide element separation distance 1620, the greater the distance that the stabilization system 1609 is lifted because the change in horizontal distance of the suspension member from an attach point 1602, 1604 to a respective guide element 1612, 1614 increases with increasing guide element separation distance 1620.

In order to lift the stabilization system 1609 against gravity and twist it 180 degrees about the vertical axis 1616, there must be an applied force great enough to add enough rotational energy to the stabilization system 1609 in order to raise its potential energy by the amount equal to the weight of the stabilization system 1609 (e.g., in combination with a weight of a suspended load) multiplied by the change in vertical distance or height (i.e., the change in potential energy). Therefore, the greater the guide element separation distance 1620 (i.e., length of the anti-rotation element 1610) for a given attach point separation distance 1618, the greater the force needed to twist the stabilization system 1609. The 180 degree point is critical because once that level of twist is reached, the suspension member 1608 will continue to twist about Point E (crossing of the suspension member 1608 due to twisting) with little additional effort. In view of this, the stabilization system 1609 and features thereof (e.g., the anti-rotation member) may be designed with sufficient resistance to known twisting forces. Such forces may include, for example and without limitation, twisting rotorwash under a helicopter, spinning which results from load contact with an external structure, rotational forces imparted by wind, or the like.

The twisting or spinning may be avoided by controlling the guide element separation distance 1620 and the attach point separation distance 1618 for a given first vertical distance 1622 (i.e., based on the vertical distance of the untwisted state). For example, in general, rotorwash swirl velocity decreases with increasing distance from the rotor plane, and the amount of this swirl velocity can be approximated by those skilled in the art. Because the anti-rotation capability of the above described embodiment increases with decreasing vertical distance (untwisted first vertical distance 1622), the stabilization system 1609 naturally increases the resistance to spin as the forces driving it to spin increases, thus the challenge resides only in establishing the guide element separation distance 1620 to adequately address a given twisting force, given there will be practical limitations on the attach point separation distance 1618. In accordance with embodiments of the present disclosure, the horizontal length 1621 of the carriage 1611 should be less than the guide element separation distance 1620, and sufficiently less than the attach point separation distance 1618 to substantially create a quasi-elliptical movement path of the carriage in order to provide pendulum-like motion damping.

Figure 17A:
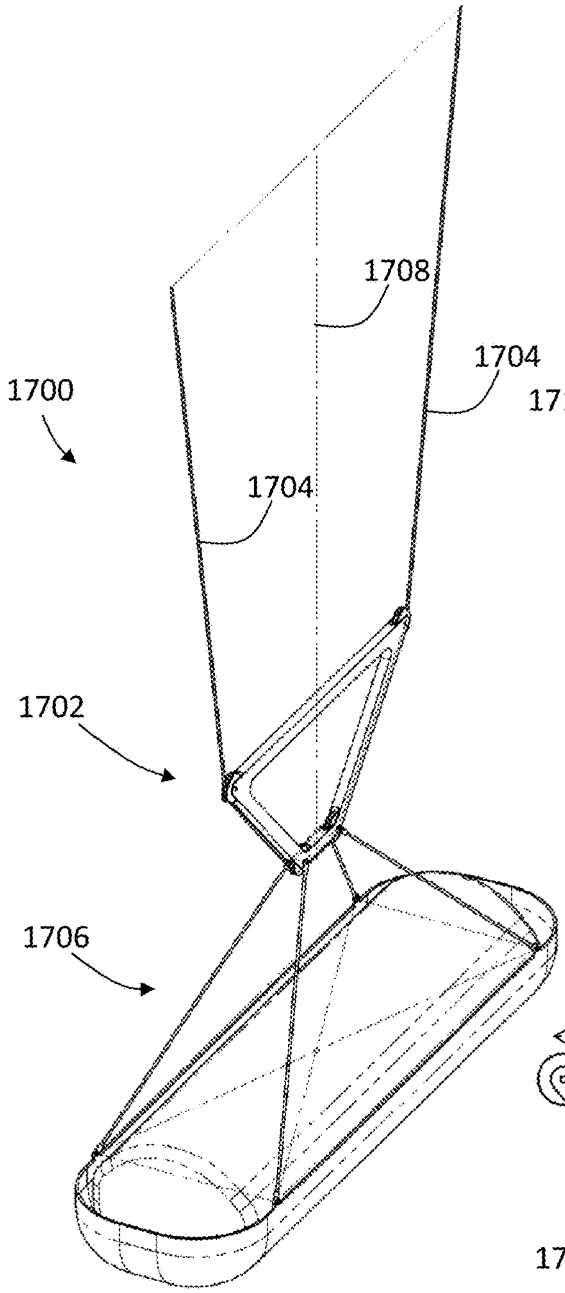
FIG. 17A is a schematic illustration of a load lifting system having an increased anti-rotation aspect in accordance with an embodiment of the present disclosure.
Figure 17B:
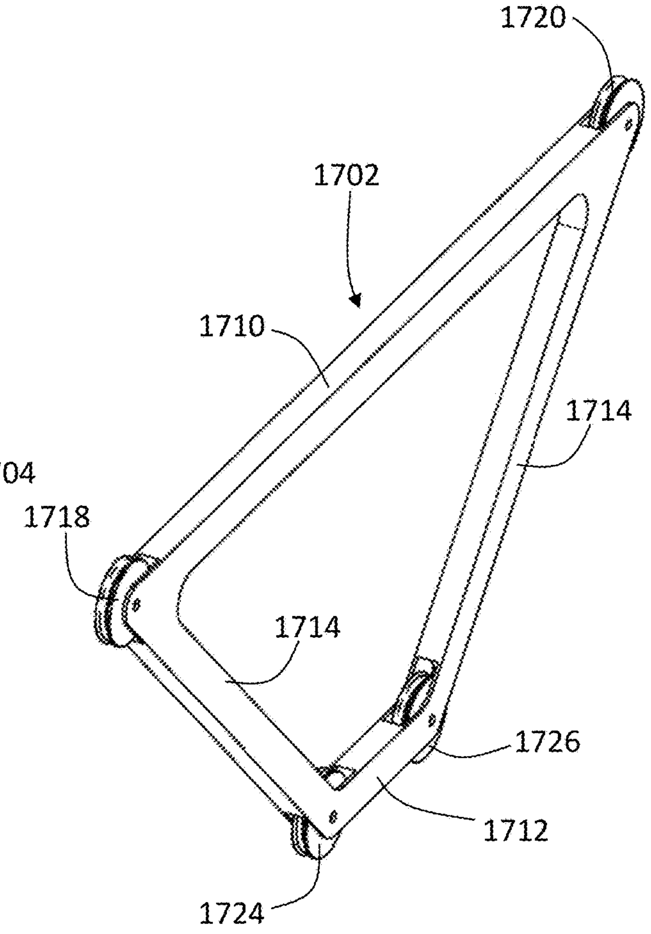
FIG. 17B is a perspective view of the carriage of the load lifting system of FIG. 17A.
Figure 17C:
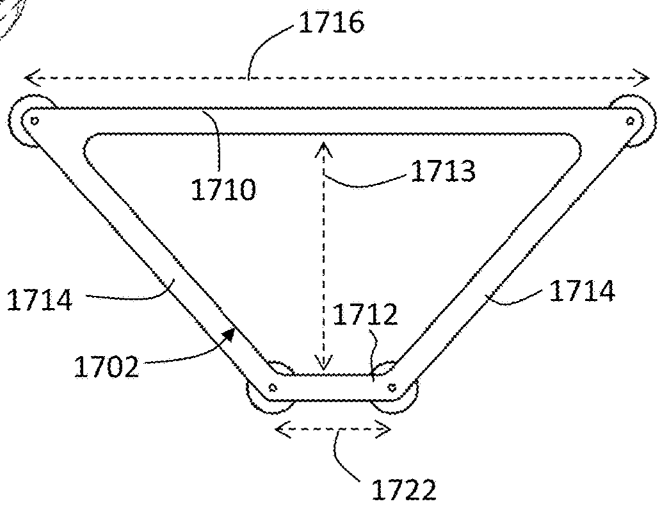
FIG. 17C is a front elevation view of the carriage of the load lifting system of FIG. 17A.

Referring now to FIGS. 17A-17C, schematic illustrations of a load lifting system 1700 having a stabilization system 1702 in accordance with an embodiment of the present disclosure are shown. The stabilization system 1702 is suspended on and movable along a suspension member 1704, similar to that shown and described above. The stabilization system 1702 of this embodiment is configured to provide oscillations and motion damping along with increased anti-rotation functionality to prevent a load 1706 (e.g., a litter configuration is illustrated) from rotating and/or twisting about a vertical axis 1708, as described above.

The stabilization system 1702 defines a carriage having an upper member 1710 (e.g., anti-rotation element as discussed above) and a lower member 1712 arranged parallel to each other and separated by a carriage separation distance 1713. The upper member 1710 is arranged in fixed connection with the lower member 1712. As shown, the upper member 1710 is connected to the lower member 1712 by one or more joining members 1714. Although shown with two joining members 1714, other configurations of the stabilization system are possible without departing from the scope of the present disclosure. For example, a single vertical bar or similar structure may join the upper and lower members, or a continuous sheet of material, or multiple (e.g., more than two) joining members may span between the upper and lower members of the stabilization systems in accordance with embodiments of the present disclosure, provided the connecting members are arranged to prevent the upper member from pitching toward or away from the lower member (i.e., the remain substantially parallel).

The upper member 1710 defines an upper length 1716 between a first upper guide element 1718 and a second upper guide element 1720 arranged at opposing ends of the upper member 1710. The first and second upper guide elements 1718, 1720 may be guide elements, such as rollers or sliding elements, to permit motion along the suspension member 1704. Similarly, the lower member 1712 defines a lower length 1722 between a first lower guide element 1724 and a second lower guide element 1726 arranged at opposing ends of the lower member 1712. The first and second lower guide elements 1724, 1726 may be rollers, sliding elements, or the like, to permit motion along the suspension member 1704. It will be appreciated that in some embodiments, only a single lower guide element may be employed, without departing from the scope of the present disclosure.

The lower member 1712 may be configured to connect to and suspend the load 1706 therefrom, as described above. The lower length 1722 will be less than the upper length 1716 and thus the suspension member 1704 will be forced to stay apart for a greater vertical distance from a load lifting structure than in other embodiments described above. After the suspension member 1704 passes through the first and second upper guide elements 1718, 1720, the suspension member 1704 will converge inward toward the first and second lower guide elements 1724, 1726. The larger length of the upper member 1710 will impart an increased anti-rotation or anti-twist moment to the system, as described above with respect to FIG. 16. Although FIGS. 17A-17C illustrate a single axis configuration, the increased anti-rotation properties may also be implemented in a multi-axis stabilization system in accordance with embodiments of the present disclosure.

Figure 18:
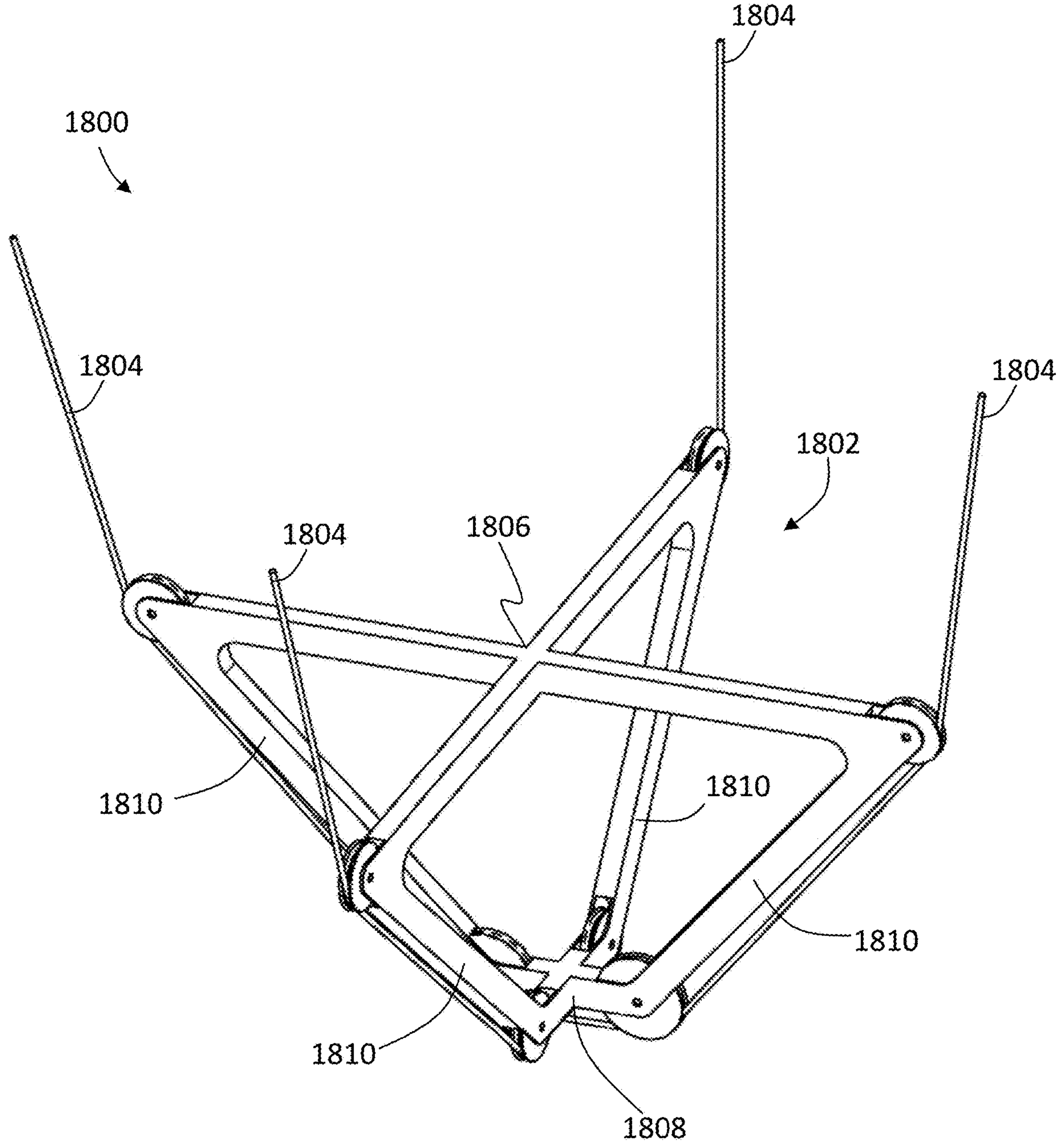
FIG. 18 is a schematic illustration of a multi-axis load lifting system having an increased anti-rotation aspect in accordance with an embodiment of the present disclosure.

For example, referring now to FIG. 18, a load lifting system 1800 having a multi-axis stabilization system 1802 having increased anti-rotation characteristics in accordance with an embodiment of the present disclosure is shown. The multi-axis stabilization system 1802 is essentially two of the stabilization systems 1702 joined in a multi-axis configuration. As shown, a suspension member 1804 is configured to pass through the stabilization system 1802 along two axes, and fixed and/or adjustable connections and associated redirect members can be employed to connect the suspension member 1804 to a load lifting structure, as shown and described above. The stabilization system 1802 includes a multi-axis upper member 1806 and a multi-axis lower member 1808 separated by a carriage separation distance with the upper and lower members 1806, 1808 connected together by one or more joining members 1810. The assembled structure forms a carriage that provides both oscillation stabilization along with increased anti-rotation functionality, which is achieved as described above.

Although the illustrations of FIGS. 17A-17C and 18 illustrate a unitary body forming the stabilization system/carriage, such single body is not to be limiting. For example, the various members may be separate components that can assembled to form the same structure, through various fastening mechanisms (e.g., detent pins, screws, bolts, clips, and the like). The joining may be a temporary joining for assembly/disassembly of the stabilization system or may be more permanent. In the unitary body configurations, the body may be welded together, cast or machined, additively manufactured, or the like. The stabilization systems of the present disclosure that include an increased anti-rotation feature generally include a carriage assembly with an upper and lower set of guide elements arranged at opposing ends of fixed length rods, arms, or the like. The upper portion is provided for increased anti-spin and the lower portion for in-plane pendulum motion damping by maintaining the quasi-ellipsoid path described above.

Figure 19:
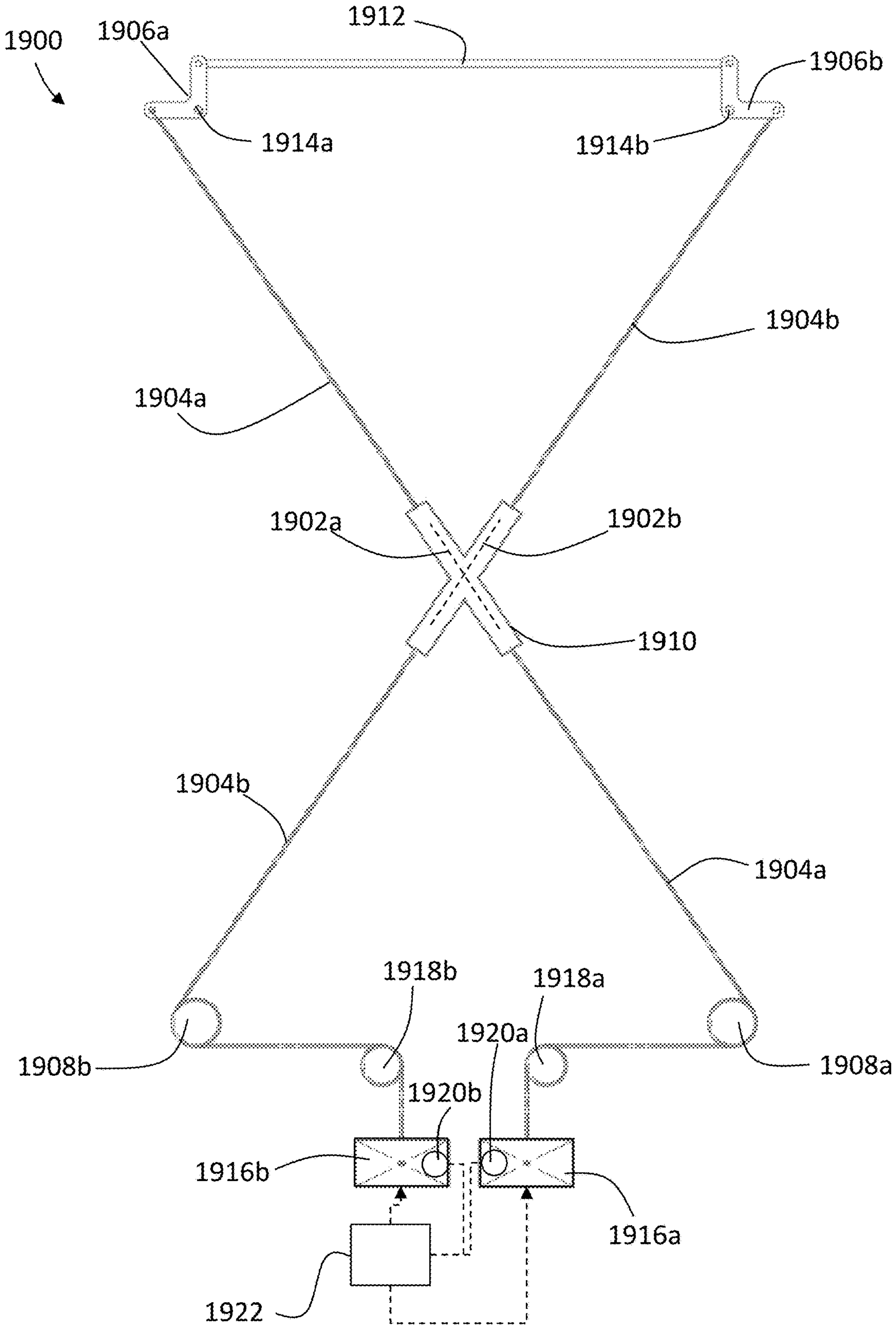
FIG. 19 is a schematic illustration of a load lifting system having an active feedback control system in accordance with an embodiment of the present disclosure.

Turning now to FIG. 19, a schematic illustration of a load lifting system 1900 in accordance with an embodiment of the present disclosure is shown in a top-view perspective, similar to FIG. 14, but with a hoist configuration in combination with a crank system. The load lifting system 1900 is attachable to a load lifting structure and configured to suspend a load therefrom (load lifting structure and load not shown for clarity). The load lifting system 1900 of FIG. 19 is a 2-axis (**1902*a*, 1902*b*) system using two separate suspension members 1904*a*, 1904*b*. A first suspension member 1904*a* extends between two attach points along the first axis 1902*a*, when the system is at rest. As shown, the first suspension member 1904*a* extends between a first adjustable connection 1906*a* and a first guide element 1908*a*. Similarly, a second suspension member 1904*b* extends between two attach points along the second axis 1902*b*, when the system is at rest. As shown, the second suspension member 1904*b* extends between a second adjustable connection 1906*b* and a second guide element 1908*b*. In this embodiment, an intersection of the first axis 1902***a* with the second axis 1902*b* intersects with a gravitational vertical, similar to that shown and described above. A carriage 1910, of a stabilization system, is suspended from the two suspension members 1904*a*, 1904*b* as shown and described above. The carriage 1910 is configured to slide, run, or move along the suspension members 1904*a*, 1904*b* in a three-dimensional movement about the first and second axes 1902*a*, 1902*b* (e.g., a three-dimensional curvilinear path).

In this embodiment, as noted, the load lifting system 1900 includes separate or distinct suspension members 1904*a*, 1904*b* arranged along the two axes 1902*a*, 1902*b*. The two suspension members 1904*a*, 1904*b* are operably connected by an interconnect member 1912. Further, in this embodiment, each of the adjustable connections 1906*a*, 1906*b* are configured as a crank that is adjustable or rotatable about a respective crank pivot 1914*a*, 1914*b*. The crank pivots 1914*a*, 1914*b* provide for a fixed connection with a load lifting structure, with each crank rotatable about the respective crank pivot 1914*a*, 1914*b*. The interconnect member 1912 may be a fixed length rod or rigid connector, an adjustable length rod or rigid connector, or a flexible member connector that is moved or translated as the adjustable connections 1906*a*, 1906*b* rotate about the respective crank pivots 1914*a*, 1914*b*. As the cranks of the adjustable connections 1906*a*, 1906*b* rotate about the crank pivots 1914*a*, 1914*b*, the respective suspension members 1904*a*, 1904*b* will be adjusted in length. As such, each individual suspension member 1904*a*, 1904*b* of this embodiment is individually adjustable in relative length to provide for the three-dimensional curvilinear path of the carriage 1910 and a cargo hook suspended therefrom to provide constant load sharing between the suspension members 1904*a*, 1904*b*. Thus, each suspension member 1904*a*, 1904*b* provides active load stabilization along their respective axes, maintaining three-dimensional load stabilization.

The load lifting system 1900 is configured in a non-perpendicular configuration, similar to that shown in FIGS. 14A-14B. To achieve this, the carriage 1910 also has a non-perpendicular construction such that the suspension members 1904*a*, 1904*b* are aligned with the axes 1902*a*, 1902*b* and interference of the suspension members 1904*a*, 1904*b* is avoided as they pass through the carriage 1910 through vertical relative displacement of the carriage guide elements, as described above. Similar to the other embodiments described above, the carriage 1910 of the load lifting system 1900 may have one or more guide elements arranged along each axis 1902*a*, 1902*b* to movingly run along the respective suspension members 1904*a*, 1904*b*. FIG. 19 illustrates a top-down plan view of the load lifting system 1900. As shown, rather than a perpendicular or 90° configuration between the axes 1902*a*, 1902*b*, in this embodiment, the two axes 1902*a*, 1902*b* are arranged in a non-perpendicular configuration. In some embodiments, and for example only and without limitation, the angle between the axes 1902*a*, 1902*b* may be any angle (e.g., 15°, 30°, 45°, 90°, etc.). It is noted that the smaller the angle, the closer to a single axis configuration the load lifting system will become. However, based on limitations or constraints of the load lifting structure, the attach points, type of suspension member, specific application, etc., such a small angle with two axes may be employed without departing from the scope of the present disclosure.

As illustrated, the load lifting system 1900 includes a hoist system. The hoist system of this embodiment includes a first hoist connection 1916*a* having a respective spool and a first suspension member guide 1918*a*. Similarly, a second hoist connection 1916*b* having a respective spool and a second suspension member guide 1918*b* are provided. The first suspension member 1904*a* is associated with the first hoist connection 1916*a* and the second suspension member 1904*b* is associated with the second hoist connection 1916*b*. The first suspension member 1904*a* may be wound about a spool of the first hoist connection 1916*a* and pass through or along the first suspension member guide 1918*a*, to the first guide element 1908*a*, directed through the carriage 1910, and fixedly attached to the first adjustable connection 1906*a*. Similarly, the second suspension member 1904*b* may be wound about a spool of the second hoist connection 1916*b* and pass through or along the second suspension member guide 1918*b*, to the second guide element 1908*b*, directed through the carriage 1910, and fixedly attached to the second adjustable connection 1906*b*. The interconnect member 1912 provides a mechanism for response or interaction of the two suspension members 1904*a*, 1904*b* to maintain active load sharing of the load on the carriage 1910, as described above.

In this configuration, the length of the suspension members 1904*a*, 1904*b* is not fixed (e.g., in contrast to the configuration of FIGS. 14A-14B). The length of the suspension members 1904*a*, 1904*b* may be adjusted by winding or unwinding the suspension members 1904*a*, 1904*b* from the respective hoist connections 1916*a*, 1916*b*. The hoist connections 1916*a*, 1916*b* are configured to pay-out (or shorten) the length of the respective suspension members 1904*a*, 1904*b* along their individual paths (e.g., axes 1902*a*, 1902*b*) of the load lifting system 1900, effectively raising or lowering the carriage 1910 and a load attached thereto. In some embodiments, the hoist connections 1916*a*, 1916*b* may be automated or operated or configured to perform a feedback loop that ensures that when one suspension member 1904*a*, 1904*b* pays out (e.g., increases in length), the other suspension member 1904*a*, 1904*b* pays out in equal amounts, effectively lowering, or raising, the carriage 1910 and a load attached thereto. That is, for example, when a first suspension member 1904*a* is increased in length, a second suspension member 1904*b* is increased in length in equal amounts to ensure that a load suspended from the carriage 1910 is evenly shared between the two suspension members 1904*a*, 1904*b* and that the adjustable connections 1906*a*, 1906*b* (e.g., cranks) remain in an active range of travel.

In accordance with some non-limiting configurations, a feedback process may be provided to ensure the lengths of the suspension members 1904*a*, 1904*b* are maintained for load sharing and damping purposes. Such feedback process may be implemented in any number of different ways. Regardless of specific implementation, the purposes of such feedback process is to ensure each suspension member 1904*a*, 1904*b* remains engaged in sharing the load suspended from the carriage 1910 and that the adjustable connections 1906*a*, 1906*b* (e.g., cranks) remain centered within a predetermined range of motion of the adjustable connections 1906*a*, 1906*b* when the carriage 1910 is in a neutral (vertical) position. Accordingly, the hoist connections 1916*a*, 1916*b* may be configured to ensure enough range of motion is provided with the adjustable connections 1906*a*, 1906*b* to allow the suspension members 1904*a*, 1904*b* to continue to remain "active" in load sharing as the carriage 1910 moves to various positions. Such feedback process may be achieved by active spooling and unspooling of the suspension members 1904*a*, 1904*b* about the hoist connections 1916*a*, 1916*b*. Thus, the load lifting system 1900 of FIG. 19 is configured to provide an active ability to damp pendulum motion in the direction of each suspension member 1904*a*, 1904*b* while also allowing the lowering and raising of the carriage 1910 and a load suspended therefrom. Such a capability is advantageous, for example, in storing the carriage 1910 closer to, or further from, the load lifting structure. Such adjustments may be used, for example, to ensure the carriage 1910 and/or a load attached thereto is positioned appropriately with respect to the load lifting structure. For example, in the case that the load lifting structure is a helicopter, the position of the carriage 1910 and/or a load attached thereto is maintained for operations such as landing, or to lower a load for delivery and/or raise up a load after pickup.

In some embodiments, the hoist connections 1916*a*, 1916*b* may include respective sensors 1920*a*, 1920*b* that are configured to monitor, sense, or otherwise detect a length of the respective suspension members 1904*a*, 1904*b* and/or a delta change in length (e.g., not necessarily total length being monitored). The suspension member 1904*a*, 1904*b* may be encoders, optical sensors, mechanical wheels or gauges, or the like, that may be arranged to measure a change in length of the respective suspension members 1904*a*, 1904*b*. Although illustrated as integrated into the hoist connections 1916*a*, 1916*b*, in other configurations the sensors 1920*a*, 1920*b* may be arranged external to the hoist connections 1916*a*, 1916*b*, and may be positioned at any location and arranged to monitor or measure, at a minimum, a change in length of the suspension members 1904*a*, 1904*b*. In some embodiments, and as shown in FIG. 19, the sensors 1920*a*, 1920*b* may be arranged in communication with a controller 1922. The controller 1922 may be configured to receive signals from the sensors 1920*a*, 1920*b* and process such signals to make decisions regarding operation of one or both of the hoist connections 1916*a*, 1916*b*. The controller 1922 may be operably connected to the hoist connections 1916*a*, 1916*b* to provide control commands to the hoist connections 1916*a*, 1916*b*. The control commands may be used to pay out length (unwind) of a respective suspension member 1904*a*, 1904*b* or spool up length (wind) of a respective suspension member 1904*a*, 1904*b*.

Although shown with the controller 1922 arranged separate from the hoist connections 1916*a*, 1916*b*, such configuration is not intended to be limiting. For example, in some embodiments, the controller 1922 may be integrated into one of the hoist connections 1916*a*, 1916*b*, and in communication with the sensor 1920*a*, 1920*b* of that same hoist connection 1916*a*, 1916*b* and with the sensor 1920*a*, 1920*b* of the other hoist connection 1916*a*, 1916*b*. In other embodiments, each hoist connection 1916*a*, 1916*b* may include a dedicated controller embedded therein, and the controllers may be in communication with each other to perform an active balancing of the suspension members 1904*a*, 1904*b*.

In the configuration of FIG. 19, the suspension members 1904*a*, 1904*b* extend from the respective hoist connections 1916*a*, 1916*b*, through or around the suspension member guides 1918*a*, 1918*b*, through or around the guide elements 1908*a*, 1908*b*, through the carriage 1910, and to fixedly attach with the adjustable connections 1906*a*, 1906*b*. In other configurations, some components may be omitted or combined, or other attach points, connections, or the like may be provided. For example, in some embodiments, the guide elements 1908*a*, 1908*b* and the suspension member guides 1918*a*, 1918*b* may be combined into a single connection/attach point (e.g., similar to the configuration of FIG. 9). As such, the illustrative configuration of an active feedback system, as shown in FIG. 19, is not intended to be limited to the specific arrangement of components illustrated.

Advantageously, in view of the teachings herein, embodiments of the present disclosure provide means for moving loads suspended from load bearing line(s) attached to a vehicle or other load lifting structure that dampens oscillations of a swinging load to reduce the time and control requirements of the vehicle in delivering the load and improving accuracy of load placement. Further, advantageously, embodiments of the present disclosure enable damping of pendulum oscillations and mitigate spinning of rescue platforms during rescue operations using cable systems extending from a rescue vehicle.

Furthermore, embodiments of the present disclosure can reduce the moments on an air vehicle carrying a load on a load bearing line attached to the air vehicle to reduce the forces reacted by the vehicle from the swinging load and focus the line of action of the forces through a point closer to the center of gravity of the vehicle. Such movement of the primary focal point of forces from the load can minimize pilot control requirements and reduce pilot workload and skill level requirements to control the air vehicle-load combination and reduce the likelihood of pilot induced oscillations that amplify the magnitude of the oscillations that endanger the pilot and ground personnel.

Additionally, advantageously, embodiments of the present disclosure can reduce moments on an unmanned air vehicle carrying a load on a load bearing line attached to the unmanned air vehicle. Such reduced movements can enable quick damping of the load oscillations and reduce forces reacted by the vehicle from a swinging load and focus the line of action of the forces through a point closer to the center of gravity of the vehicle. This can minimize auto-pilot control requirements and related software necessary for safe transportation of the external loads and increase speed of delivery by reducing the time needed for load stabilization during approach and drop off, for example. Advantageously, embodiments of the present disclosure can transfer or move control requirements from an autopilot of a manned or unmanned air vehicle to the load lifting system and stabilization systems thereof to avoid complex modifications to the auto-stabilization control system of the air vehicle itself and/or autopilot to reduce development time and cost and provide a more universal method of attaching and carrying external loads, reduce flight time, and deliver loads more safely.

In accordance with some embodiments of the present disclosure, load carrying apparatuses, systems, and methods for air vehicles to pick up external loads, without the need for ground personnel are provided. Such systems may enable accurate placement of the load pickup device onto or into the load pickup mechanism. This can reduce cost, time, effort, and improve safety in picking up and dropping off external loads. Further, embodiments described herein enable a means for carrying external loads on an air vehicle that dampens oscillations of the swinging load while reducing the control requirements for external load stabilization that does not require major modifications to the air vehicle and does not add substantial weight and complexity. Additionally, external load stabilization for an air vehicle in the lateral, longitudinal, or both directions simultaneously is enabled to provide a tailorable apparatus, system, and method for stabilizing the external load to address specific axis requirements for a particular air vehicle and/or load application.

Advantageously, embodiments of the present disclosure provide a means for carrying external loads on load lifting structure that dampens oscillations of a swinging load while reducing control requirements for external load stabilization.

In some such embodiments, the system can be lowered or raised relative to the load lifting structure to minimize ground and obstacle clearance requirements for the load lifting structure. Further, in some embodiments, a variable length system can be used to extend to address loads in obstacle ridden environments while keeping the load lifting structure (e.g., vehicle) above the obstacles and in a clear operating environment. Advantageously, this can minimize space needed for air vehicle operation and allow load pickup and delivery in congested environments or the like. These and other advantages are provided by embodiments of the present disclosure.

The use of the terms "a", "an", "the", and similar references in the context of description (especially in the context of the following claims) are to be construed to cover both the singular and the plural, unless otherwise indicated herein or specifically contradicted by context. The modifier "about" used in connection with a quantity is inclusive of the stated value and has the meaning dictated by the context (e.g., it includes the degree of error associated with measurement of the particular quantity). All ranges disclosed herein are inclusive of the endpoints, and the endpoints are independently combinable with each other. As used herein, the terms "about" and "substantially" are intended to include the degree of error associated with measurement of the particular quantity based upon the equipment available at the time of filing the application. For example, the terms may include a range of ±8%, or 5%, or 2% of a given value or other percentage change as will be appreciated by those of skill in the art for the particular measurement and/or dimensions referred to herein.

While the present disclosure has been described in detail in connection with only a limited number of embodiments, it should be readily understood that the present disclosure is not limited to such disclosed embodiments. Rather, the present disclosure can be modified to incorporate any number of variations, alterations, substitutions, combinations, sub-combinations, or equivalent arrangements not heretofore described, but which are commensurate with the scope of the present disclosure. Additionally, while various embodiments of the present disclosure have been described, it is to be understood that aspects of the present disclosure may include only some of the described embodiments. Accordingly, the present disclosure is not to be seen as limited by the foregoing description but is only limited by the scope of the appended claims.

What is claimed is:

1. A load lifting system comprising:

a first flexible suspension member configured to attach to a load lifting structure at a first connection at a first end of the first flexible suspension member and attach to the load lifting structure at a first adjustable connection at a second end of the first flexible suspension member;

a second flexible suspension member configured to attach to the load lifting structure at a second connection at a first end of the second flexible suspension member and attach to the load lifting structure at a second adjustable connection at a second end of the second flexible suspension member;

an interconnect member extending between and connecting the first adjustable connection and the second adjustable connection; and a carriage movingly suspended on both the first flexible suspension member and the second flexible suspension member, wherein the carriage is configured to have a load suspended therefrom, wherein the first connection and the first adjustable connection define a first axis therebetween and the second connection and the second adjustable connection define a second axis therebetween, and wherein the carriage is configured to move relative to and along the first flexible suspension member and the second flexible suspension member in directions along the first and second axes such that the carriage follows a curved path having a continuously varying radius of curvature.

2. The load lifting system of claim 1, wherein the interconnect member is adjustable in length between the first adjustable connection and the second adjustable connection.

3. The load lifting system of claim 1, wherein the interconnect member is a fixed length element.

4. The load lifting system of claim 1, wherein the first adjustable connection is a first crank and the second adjustable connection is a second crank.

5. The load lifting system of claim 4, wherein:

the first crank comprises a first crank pivot and the second crank comprises a second crank pivot, and adjusting the first crank about the first crank pivot adjusts a length of the first flexible suspension member and adjusting the second crank about the second crank pivot adjusts a length of the second flexible suspension member.

6. The load lifting system of claim 1, wherein the first axis is non-parallel with the second axis.

7. The load lifting system of claim 1, wherein the first axis is perpendicular to the second axis.

8. The load lifting system of claim 1, wherein the carriage comprises at least one first guide element configured to direct the carriage along the first flexible suspension member and at least one second guide element configured to direct the carriage along the second flexible suspension member.

9. The load lifting system of claim 1, further comprising a motor operably coupled to the carriage and configured to drive the carriage along the first flexible suspension member and the second flexible suspension member.

10. The load lifting system of claim 9, further comprising an electronics package configured to control operation of the motor.

11. The load lifting system of claim 9, further comprising a clutch arranged between the motor and the carriage.

12. The load lifting system of claim 1, wherein:

the first connection is a first hoist connection, wherein the first flexible suspension member is configured to be spooled about the first hoist connection and adjusted in length therefrom; and the second connection is a second hoist connection, wherein the second flexible suspension member is configured to be spooled about the second hoist connection and adjusted in length therefrom.

13. The load lifting system of claim 12, further comprising a controller arranged in operable communication with each of the first hoist connection and the second hoist connection, wherein the controller is configured to perform a feedback operation to ensure equal lengths of each flexible suspension member are dispensed or retracted.

14. A load lifting system comprising:

a first flexible suspension member configured to attach to a load lifting structure at a first connection at a first end of the first flexible suspension member and attach to the load lifting structure at a first adjustable connection at a second end of the first flexible suspension member;

a second flexible suspension member configured to attach to the load lifting structure at a second connection at a first end of the second flexible suspension member and attach to the load lifting structure at a second adjustable connection at a second end of the second flexible suspension member;

an interconnect member extending between and connecting the first adjustable connection and the second adjustable connection; and a carriage movingly suspended on both the first flexible suspension member and the second flexible suspension member, wherein the carriage is configured to have a load suspended therefrom, and wherein the interconnect member is adjustable in length between the first adjustable connection and the second adjustable connection.

15. The load lifting system of claim 14, wherein the first adjustable connection is a first crank and the second adjustable connection is a second crank.

16. The load lifting system of claim 14, wherein the carriage comprises at least one first guide element configured to direct the carriage along the first flexible suspension member and at least one second guide element configured to direct the carriage along the second flexible suspension member.

17. The load lifting system of claim 14, further comprising a motor operably coupled to the carriage and configured to drive the carriage along the first flexible suspension member and the second flexible suspension member.

18. The load lifting system of claim 14, wherein:

the first connection is a first hoist connection, wherein the first flexible suspension member is configured to be spooled about the first hoist connection and adjusted in length therefrom; and the second connection is a second hoist connection, wherein the second flexible suspension member is configured to be spooled about the second hoist connection and adjusted in length therefrom.

19. A load lifting system comprising:

a first flexible suspension member configured to attach to a load lifting structure at a first connection at a first end of the first flexible suspension member and attach to the load lifting structure at a first adjustable connection at a second end of the first flexible suspension member;

a second flexible suspension member configured to attach to the load lifting structure at a second connection at a first end of the second flexible suspension member and attach to the load lifting structure at a second adjustable connection at a second end of the second flexible suspension member;

an interconnect member extending between and connecting the first adjustable connection and the second adjustable connection; and a carriage movingly suspended on both the first flexible suspension member and the second flexible suspension member, wherein the carriage is configured to have a load suspended therefrom, and wherein the first adjustable connection is a first crank and the second adjustable connection is a second crank.

20. The load lifting system of claim 19, wherein:

the first crank comprises a first crank pivot and the second crank comprises a second crank pivot, and adjusting the first crank about the first crank pivot adjusts a length of the first flexible suspension member and adjusting the second crank about the second crank pivot adjusts a length of the second flexible suspension member.

* * * * *